United States Patent
Elsheemy

(10) Patent No.: US 10,121,370 B2
(45) Date of Patent: Nov. 6, 2018

(54) COMPREHENSIVE TRAFFIC CONTROL SYSTEM

(71) Applicant: Mohamed Roshdy Elsheemy, Akron, OH (US)

(72) Inventor: Mohamed Roshdy Elsheemy, Akron, OH (US)

( * ) Notice: Subject to any disclaimer, the term of this patent is extended or adjusted under 35 U.S.C. 154(b) by 195 days.

(21) Appl. No.: 14/544,801

(22) Filed: Feb. 20, 2015

(65) Prior Publication Data

US 2015/0243165 A1 Aug. 27, 2015

Related U.S. Application Data

(60) Provisional application No. 62/053,117, filed on Sep. 20, 2014.

(51) Int. Cl.

| G08G 1/07 | (2006.01) |
|---|---|
| G08G 1/087 | (2006.01) |
| G08G 1/08 | (2006.01) |
| B60R 25/00 | (2013.01) |
| G08B 21/02 | (2006.01) |
| G08G 1/005 | (2006.01) |
| G08G 1/01 | (2006.01) |
| G08G 1/017 | (2006.01) |
| G08G 1/0962 | (2006.01) |
| G08G 1/0965 | (2006.01) |
| G08G 1/0967 | (2006.01) |

(52) U.S. Cl.
CPC ............ *G08G 1/087* (2013.01); *B60R 25/00* (2013.01); *G08B 21/0202* (2013.01); *G08G 1/005* (2013.01); *G08G 1/017* (2013.01); *G08G 1/0112* (2013.01); *G08G 1/0133* (2013.01); *G08G 1/0141* (2013.01); *G08G 1/08* (2013.01); *G08G 1/0965* (2013.01); *G08G 1/09623* (2013.01); *G08G 1/09626* (2013.01); *G08G 1/096716* (2013.01); *G08G 1/096758* (2013.01); *G08G 1/096775* (2013.01)

(58) Field of Classification Search
CPC ............ G08G 1/07; G08G 1/01; G08B 21/02
USPC ........................................ 340/906, 907, 916
See application file for complete search history.

(56) References Cited

U.S. PATENT DOCUMENTS

| 6,133,854 A * | 10/2000 | Yee | ........................... G08G 1/07 340/907 |
|---|---|---|---|
| 7,821,422 B2 * | 10/2010 | Hutchison | ................ G08G 1/07 340/907 |
| 2006/0066472 A1 * | 3/2006 | Janssen | ................... G01S 13/92 342/104 |

(Continued)

*Primary Examiner* — Phung Nguyen

(57) ABSTRACT

The present invention provides a system that utilizes radio signals, cellular network and GPS technologies to provide a multi task system that deals with a variety of traffic related aspects such as intersection design systems, in-car traffic light systems, in-car traffic light system app for both drivers and pedestrians, roadside assistance and safety alert systems, high speed chase systems, roadway radar systems, law enforcement safety systems, emergency vehicles preemption systems, vehicle location logging systems, security and crime-fighting systems, missing person search systems and children in vehicles safety systems. The system consists of a number of electronic units, each one of these units perform a number of programmed functions. Examples of these units are: Police Vehicle Unit, Emergency Vehicle Unit, Vehicle Unit and Roadway Intersection Unit.

11 Claims, 30 Drawing Sheets

(56) References Cited

U.S. PATENT DOCUMENTS

| | | | |
|---|---|---|---|
| 2009/0248222 A1* | 10/2009 | McGarry | G08G 1/052 701/2 |
| 2013/0009760 A1* | 1/2013 | Washlow | G01S 7/003 340/425.5 |
| 2013/0069799 A1* | 3/2013 | Ma | G08G 1/07 340/907 |
| 2016/0163194 A1* | 6/2016 | Dauneria | G08G 1/087 340/906 |

* cited by examiner

S = SHORT RANGE SIGNAL
L = LONG RANGE SIGNAL
C = COMMANDS

Table Section_Location

| LatA | LonA | Location_ID |
|---|---|---|
| 416 | 812 | 44114 |
| 415 | 812 | 44114 |
| 415 | 813 | 44114 |
| ...... | ...... | ......... |
| 415 | 821 | 44114 |
| 414 | 812 | 44114 |
| ...... | ...... | ......... |
| 414 | 821 | 44114 |
| 413 | 812 | 44114 |
| ...... | ...... | ......... |
| 413 | 821 | 44114 |
| 412 | 812 | 44308 |
| ...... | ...... | ......... |
| ...... | ...... | ......... |
| 410 | 815 | 44308 |
| ...... | ...... | ......... |
| ...... | ...... | ......... |
| 409 | 817 | 44308 |
| ...... | ...... | ...... |

FIG.41

Table 44308

| LatB | LonB | Cycle_ID |
|---|---|---|
| 7558 | 2278 | 2011100060000 |
| ...... | ...... | ......... |
| ...... | ...... | ......... |
| 7629 | 2229 | 2011100060000 |
| 7639 | 2222 | 2011100060000 |
| 7647 | 2216 | 2011100060000 |
| 7654 | 2211 | 0000000000000 |
| 7659 | 2208 | 2050000021200 |
| 7669 | 2201 | 2050000021200 |
| ...... | ...... | ......... |
| ...... | ...... | ......... |
| 7809 | 2103 | 2050000021200 |
| 7829 | 2089 | 2050000021200 |
| ...... | ...... | ......... |
| ...... | ...... | ......... |
| 7874 | 2059 | 2050000021200 |
| ...... | ...... | ......... |
| 7683 | 2286 | 1031300000000 |
| 7674 | 2266 | 1031300000000 |
| ...... | ...... | ......... |
| ...... | ...... | ......... |
| 7659 | 2226 | 1031300000000 |
| 7657 | 2220 | 1031300000000 |
| 7647 | 2192 | 1230000041400 |
| 7639 | 2172 | 1230000041400 |
| ...... | ...... | ......... |
| ...... | ...... | ......... |
| 7615 | 2112 | 1230000041400 |
| 7611 | 2102 | 1230000041400 |

FIG.42

Table Cycle_Phases

| Cycle_ID | Phases |
|---|---|
| 01 | 0000606096 |
| 02 | 0150606096 |
| 03 | 0810606096 |
| 04 | 0960606096 |
| .... | ................... |
| .... | ................... |
| 11 | 0000096147 |
| 12 | 0660096147 |
| 13 | 0810096147 |
| 14 | 1470096147 |
| ..... | ................... |
| .... | ................... |
| 29 | 0000000999 |
| 30 | 0000009000 |

FIG.43

Table Freeways

| LatC | LonC | Freeway_ID |
|---|---|---|
| 41241 | 81006 | I 80 |
| 41241 | 81010 | I 80 |
| 41241 | 81014 | I 80 |
| ........ | ......... | ............ |
| ........ | ......... | ............ |
| 41096 | 81824 | I 71 |
| 41100 | 81820 | I 71 |
| 41106 | 81818 | I 71 |
| ........ | ......... | ............ |
| ........ | ......... | ............ |

FIG.46

Table 44308Ped

| LatB | LonB | Ped_Cycle ID |
|---|---|---|
| 7654 | 2211 | 01 Exchange |
| 7655 | 2212 | 02 Main |
| ........ | ........ | ........................ |
| ........ | ........ | ........................ |
| ........ | ........ | ........................ |

FIG.44

Table Ped Cycle_Phases

| Ped_Cycle ID | Ped_Phases |
|---|---|
| 01 | 02020142 |
| 02 | 10120142 |
| ........ | ........................ |
| ........ | ........................ |
| ........ | ........................ |

FIG.45

COMPREHENSIVE TRAFFIC CONTROL SYSTEM

This Application is related to: Internation Application Number (PCT/US14/56695) Filed by Mohamed Elsheemy on 20 Sep. 2014 and Provisional Application Number (62/053,117) Filed by Mohamed Elsheemy on 20 Sep. 2014.

FIELD OF THE INVENTION

The present invention relates generally to traffic control systems and more particularly it covers a variety of traffic related aspects such as intersection design systems, in-car traffic light systems, roadside assistance and safety alert systems, high speed chase systems, roadway radar systems, law enforcement safety systems, emergency vehicles preemption systems, vehicle location logging systems, security and crime-fighting systems, missing person search systems and children safety systems.

BACKGROUND AND SUMMARY OF THE INVENTION

Since the present invention creates a system which is related to a number of systems that perform different traffic aspects and functions. It is better to start with components of the present invention to have a good understanding of how it works.

The present invention provides a system that utilizes radio signals and cellular network technologies along with GPS technology. The system consists of a number of electronic units, each one of these units performs a number of programmed functions to achieve a preferred overall operation of the system.

These units are: THE POLICE VEHICLE UNIT, THE EMERGENCY VEHICLE UNIT, THE ORDINARY VEHICLE UNIT "VEHICLE UNIT", THE ROADWAY INTERSECTION UNIT "INTERSECTION UNIT", THE PEDESTRIANS UNIT, THE LOGGING UNIT and RFID ACTIVE TAGS.

The Vehicle Unit

This unit uses a long range radio frequency transceiver module, preferably (one to two mile) range, and a short range radio frequency transceiver module, preferably (0.1 mile range), along with a cellular-network circuit board, antenna, a thermal module and a GPS receiver module. The circuit board is considered the brain component of the unit, it runs the entire system of the unit, the circuit board consist of a few computer chips. There are both digital-to-analog and analog-to-digital conversion computer chips within the circuit board. They convert audio signals going out from analog to digital, and then they convert the audio signals from digital back into analog.

The flash memory and ROM components of the unit circuit board serve as a storage location for the unit. They store the vehicle identification number "VIN" code, cellphone codes, the GPS digital map application, the GPS readings; "coordinates, speed, heading and date/time", the RFID active tag readings "tag number and date/time", and the in-car traffic light cycle application which is a component of the in-car traffic light system, as well as the entire operating system.

The microprocessor is in charge of dealing with all the tasks that are to be performed by the unit. It also focuses on the unit's control signals (to and from the base station) and command options. It helps to interconnect all of the terminal display main functions.

The liquid crystal display (LCD), is a terminal display and connected to the unit through a Universal Serial Bus (USB) cable and comprises a number of LED indicators, microphone, speaker, a camera and a number of buttons.

The vehicle unit is configured in a manner to disturb the vehicle "engine control unit" when the vehicle unit is being removed or tampered with. In another embodiment, the vehicle unit is integrated with the engine control unit to be more difficult to be removed.

The camera of the liquid crystal display (LCD) is used in creating the accident report file, the camera is configured to face the roadway and provides at least 10 minutes of recorded video to be used as an evidence in case of an accident or insurance dispute.

The Police Unit

This unit comprises similar electronic components as the vehicle unit, but its terminal display is a touch screen interface and capable of displaying colored pictures. The police unit can communicate with the vehicle unit via the long range or the short range radio frequency, also the police unit can communicate with the vehicle unit via the cellular network. In addition, the police unit can communicate with the intersection unit via the long range radio signal.

Furthermore, the police unit stores the "control operating system" which is responsible for all the control commands needed to manipulate the vehicle unit. The police unit also stores the preemption codes, and the vehicle model, type and class category application which is used in the high_speed pursuit and radar systems.

The Emergency Vehicle Unit

This unit comprises similar electronic components as the police vehicle unit, it can communicate with the intersection unit via the long range radio frequency signal. The emergency vehicle unit stores the preemption codes.

The Intersection Unit

This unit uses a long range (0.60 mile to 0.80 mile) radio frequency transceiver module to communicate with the emergency vehicle unit. Also it uses a short range (0.1 mile) transmitter to alert all of the non emergency vehicles close to the intersection. The intersection circuit board also comprises a microprocessor and memory chips, the memory stores all the preemption codes, the fixed time (for a single intersection) traffic light cycles and "activating and deactivating" codes. The intersection unit also comprises a GPS receiver module, and a rechargeable backup battery. This unit is synchronized via Global Positioning System (GPS) timing signals.

The Pedestrians Unit

This unit uses a radio frequency receiver module, to receive a trigger signal contains real-time transmitted by the intersection unit, this unit comprises a number of LED clusters of two different colors and a rechargeable backup battery. The "walk/don't walk" fixed time cycle is programmed in this unit.

The Logging Unit

This unit uses the short range (0.1 mile) radio frequency transceiver module to communicate with the vehicle unit, and comprises a memory to store the data transmitted by the vehicle unit. There are two types of logging units, the first type is "traffic logging unit", and the second type is security or monitoring logging unit "spot logging unit".

RFID Active Tags

Radio-frequency identification (RFID) active tags use a very short range preferably (2 to 3 meter) radio frequency to communicate with the vehicle unit over its short range frequency transceiver.

The Vehicle Model, Type and Class Category Application

Auto manufacturers worldwide produce variety of vehicles, which come in different sizes and body shapes each year, therefore each vehicle is defined by its make, model, body shape, year of built and its identification number. All of these characteristics may be summarized in a unique code, which is called VEHICLE IDENTIFICATION NUMBER code (VIN).

A VIN code, is a unique code including a serial number, used by the automotive industry to identify individual motor vehicles, as defined in ISO 3833.

The vehicle descriptor section of the VIN code is used to identify the vehicle type, the model and the body style. While, vehicle identifier section of the VIN is used to identify the individual vehicle.

The present invention creates the vehicle type/model file by reading the VIN to determine the make and model of the vehicle and by having a set of pictures taken from different angles for each vehicle model and store them in a file, the vehicles in the file are arranged in a list of categories, each category contains the vehicles that share the same body shape and size. The pictures in this file can take any desired color to resemble the color of a target vehicle. The vehicle type/model file could be updated and uploaded into the police unit on predetermined dates.

Cellular Communication Codes

CELL-PHONE CODES: All cell phones have special codes associated with them. These codes are used to identify the phone. But in the present invention these codes will be transmitted from the police unit to the vehicle unit to give the vehicle unit a temporary ability to connect to the cellular network. Each one of the police vehicles is assigned a number of sets of "Cell-phone Codes or SIM card data" to enable the police vehicle unit to lend the vehicle unit the necessary codes that are required for cellular communication.

Electronic Serial Number (ESN): a unique 32-bit number programmed into the phone when it is manufactured. Mobile Identification Number (MIN): a 10-digit number derived from any phone's number. System Identification Code (SID): a unique 15-bit number that is assigned to each carrier by the Federal Communications Commission (FCC).

When someone powers up his cellphone, his cellphone looks for the System Identification Code (SID), on the cellphone control channel. And when the cellphone receives the SID, the phone compares it to the SID programmed into the phone. If the SIDs match, the phone knows that the cell it is communicating with is part of its home system.

Along with the SID, the phone also transmits a registration request, and the Mobile Telephone Switching Office (MTSO) keeps track of the phone's location in a database. This way, the MTSO knows which cell he is in when it wants to call his phone. Therefore, the records of where his cellphone is located give a pretty good idea of where he is. The cellphone carrier, for example (AT&T) stores these records in a database and this may raise serious privacy concern issues if a third party such as National Security Agency (NSA), or other authority agency gets hold of these records without a search warrant. Normally the cellphone carriers charge the cellphone owner monthly fees for the subscribed service.

Presently many vehicle's location registration systems' utilize the cellular network technology to keep the vehicle's location continually recorded in a database, for monitoring, security purposes and traffic related matters. These systems require a permanent cellular subscribed service, which is very costly process when it deals with millions of vehicles, in addition to the violation of the vehicles' owners privacy.

The present invention creates an alternative method for, remotely, selectively and temporarily logging a motor vehicle to solve a specific matter, without compromising the privacy concerns of the innocent drivers. Also without the need for making them continually connected to the cellular network or paying for subscribed service.

The police vehicle unit communicates with the vehicle unit via a set of control commands to force it to execute a selected function or application. These control commands are listed and illustrated based on their purposes as following:

LOG command: Is used to log the VIN codes of the target vehicles into the police unit, the police unit transmits the LOG command combined with any of the following parameters "the target road name, the target direction, the vehicle position code, the police vehicle GPS coordinates, a reference speed, the target vehicle model, vehicle class category and the coordinates of a crime scene". The police unit uses the short range (0.1 mile) or the long range (1 to 2 mile) frequency to transmit this command. If the unit transmitted the log command without road name or direction or position, then it will log vehicles in all directions by using the short range signal.

When the vehicle unit receives the police unit's GPS coordinates (the origin coordinates), it will calculate the distance between its coordinates and the origin coordinates, and after few seconds (2 to 3 seconds), it will calculate the new distance between its new coordinates and the origin coordinates. If the new distance is smaller than the first distance, then the vehicle is approaching the police vehicle. Thus, the position code will be "approach" to represent approaching, and if the new distance is greater than the first distance, then the vehicle is departing the police vehicle, and the position code will be "depart" to represent departing.

SPOT LOG command: Is used to log the VIN codes of vehicles near to make a complete stop into the spot logging unit, the spot logging unit will transmit the SPOT LOG command via the short range (0.1 mile) frequency after it receives a log request from a vehicle.

TRAFFIC LOG command: Is used to log the VIN codes of vehicles into the traffic logging unit, the traffic logging unit will transmit the TRAFFIC LOG command via the short range (0.1 mile) frequency.

RADAR command: Is used to log the VIN codes and a (speed report) of vehicles that speed above a (reference speed), the police unit will transmit this command combined with the reference speed, road name, target direction, vehicle position code (approach) and police vehicle GPS coordinates (the origin coordinates) via the long range (1 to 2 mile) frequency. The reference speed is a selected comparing-speed to report all vehicles that speed above it.

The speed report will include the number of times and the length of time in which the vehicle was speeding above a (reference speed) in the last 30 minutes of vehicle's movement.

The GPS receiver of the vehicle unit determines coordinates, speed, heading and date and time at real-time status. The vehicle unit will keep a record of these data for at least the last (30 minutes) to be used for the speed report.

CLONE command: Is used to allow the vehicle unit to periodically re-transmit any specific command "target command" transmitted by the police unit via the long range frequency. Generally, the target command could be (VIN report command) or (RFID tag report command). The clone command is used to widely increase the number of vehicles that will do the scan search of a particular vehicle or a particular RFID tag, cloning is a process to multiply the number of vehicles that mimic police vehicles in performing a search process.

CONNECT command is used to connect the target vehicle to the cellular network, the police unit will transmit this command combined with the cell-phone codes (SIM card codes) and a local dispatch center phone number. The target vehicle will periodically send its location data. Also the police officer or the local dispatch center can call the target vehicle or send control commands to it. The local dispatch center will continue track down the movement of the target vehicle and communicate with the police vehicles in the vicinity of the target vehicle. The connecting process could occur in a different scenario as disclosed in the detailed description.

VIN report command: Is used to allow the target vehicle to connect to the cellular network and send (location report), which is used for vehicle search process. The police unit will transmit the VIN report command combined with the cell-phone codes and the local dispatch center's phone number. The location report contains the VIN code of the vehicle and real-time location of it.

RFID tag command: Is used to allow the vehicles' units to send a report about a particular tag number "target tag". The police unit will transmit the RFID tag command combined with the cell-phone codes, the local dispatch center's phone number, the target tag number and a time window.

Time window is a period of time in minutes, for example (60 or 120 minutes), to allow the vehicle unit to randomly select a time within the time window to connect to the cellular network and send the RFID tag report. This way if the tag was logged in a number of vehicles, each one of these vehicles can connect and report in different times without any possible interference.

FLASH command: Is used to flash the head and/or tail flashers of the target vehicle. The police unit will transmit this command over the short range or the long range frequency to the vehicle unit.

ALERT command: Is used to send an alert and warning text messages to the target vehicles and flashing the yellow LED indicator of them. The police unit will transmit this command over the short or long range frequency to the vehicle unit.

STOP command: Is used to slow down the target vehicle then stop it by disturbing the fuel system or the electric system of the target vehicle. The police unit will transmit this command over the short range or the long range frequency to vehicle unit. Also the police unit can send this command after connecting the target vehicle to the cellular network.

RELEASE command: Is used to release the target vehicle unit from the control commands of the police unit or the dispatch center, the command will tell the vehicle unit to delete the cellphone codes and disconnect with the cellular network.

The police vehicle unit and the emergency vehicle unit also communicate with the intersection unit via the preemption codes and ACTIVATING/DEACTIVATING command.

ACTIVATING/DEACTIVATING command: Is used to allow the intersection unit to use the fixed time traffic light cycles at predetermined time, the police unit or the maintenance crew will transmit this command over long range frequency to the intersection unit.

The Police LCD Unit Interfaces

The police liquid crystal display (LCD), is a touch screen terminal display, it is connected to the police unit through a Universal Serial Bus (USB) cable and comprises a number of LED indicators, microphone, speaker, a camera and a number of buttons. The display processor and software are responsible to interpret input from the touch-screen as commands. The police officer can access the control commands by either the touch screen input or by voice.

Voice recognition software designed to place each phoneme in a context based on the other phonemes in the software, which immediately picks up or registers from the police officer. The software program accomplishes this by running the phonemes through a statistical model based on mathematical computations called algorithms, and by comparing the phonemes with a library of command words, phrases and sentences it has stored. The voice recognition program then outputs the officer's words as text or executes the appropriate command. This way the police officer can comfortably use the police unit and focuses on driving his vehicle with a lot of concentration while driving in high speed. Thus, to achieve a high efficiency of the present invention.

Also the police LCD display comprises a number of buttons, one button for turning on/off the preemption system, by pressing on this button, the police vehicle unit transmits the preemption codes, another button to send the right-turning preemption request, another button to send the left-turning preemption request over the long range frequency, and another button to turn on/off the in-car traffic light system.

The Vehicle LCD Unit

This terminal display may be either touch-screen or non touch-screen, its main job is to display the alert messages that transmitted by the police unit, intersection unit or traffic logging unit, or in some cases to display alert messages related to the digital map. In some other embodiments the touch-screen display may be used for customized applications or programs such as some applications come with the cell phones. The display comprises a green LED indicator, a yellow LED indicator, a red LED indicator, a green right arrow LED indicator, and a green left arrow LED indicator. When the vehicle unit receives any alert message from; a police unit, a traffic logging unit or an intersection unit, the yellow LED indicator will start flashing. Generally, the LED indicators are used to illuminate the synchronized LED's in-car traffic light cycle.

Also the LCD display comprises a number of buttons, one button for help assistance, by pressing on this button, the vehicle unit transmits a help signal over the long range frequency, another button to turn on/off the in-car traffic light system. Furthermore, another button to turn on/off the in-car traffic (stop signs and the other traffic relevant alert messages).

Intersection Design

Intersection design can vary widely in terms of size, shape, number of travel lanes, and number of turn lanes. Basically, there are three types of at-grade intersections, determined by the number of intersecting legs, topography, traffic patterns, and the desired type of operation. Each roadway radiating from an intersection is called a "leg" Most intersections have four legs, which is generally accepted as the maximum recommended number for safety and capacity reasons. The three basic intersection types are: "T" intersection (three approach legs), Fourleg intersection, and Multileg intersection (five or more approach legs). The design for an intersection corner radius is based on the selection of a reasonable design vehicle for the specific location. Design vehicles can range from large (tractor-trailer combinations) to small vehicles. Therefore the need to determine the volume of traffic and the size of the vehicles which are crossing an intersection or making a right/left turning are vital for designing a safe and an efficient intersection.

The present invention provides a system and a method to determine the volume and the sizes of the vehicles to be used for an intersection design. The traffic logging unit is responsible for collecting the traffic data needed for the intersection design. By assigning a traffic logging unit for each one of the intersection legs, the traffic logging unit will periodically send a TRAFFIC LOG command via the short range (0.1 mile) frequency, all vehicles travelling on each leg will transmit the VIN codes. And by collecting the data stored in each one of the traffic logging unit, we can determine the volume of traffic and the size of the vehicles that crossing and turning at an intersection. When the traffic logging unit sends the traffic log command, the yellow LED indicator will start flashing and a (COLLECTING TRAFFIC DATA) alert message will appear on the screen of the vehicle's display.

The GPS Digital Map Application

The present invention creates a GPS digital map, in which the roadway intersection legs are defined as leg segments, these segments enable the vehicle unit to identify any specific leg or approach of any roadway intersection, the GPS receiver in the vehicle unit enables the unit to determine the coordinates, speed, heading and date/time at real-time status, by matching and comparing the GPS coordinates to the data from the GPS digital map, the unit can determine the exact leg segment. The segment could be a section of a road between two consecutive road-intersections, or it could be an intersection leg of a length lies between (0.1 mile and 0.5 mile).

Generally, each leg segment is identified by the name of its roadway and a serial number. Occasionally, some cities may have similar road names, therefore the GPS digital map uses special codes similar to the zip codes to identify different cities. The road names could be coded to eliminate any chance of having a repeated name for different roads.

The In-Car Traffic Light System

A typical two-road intersection generally has four legs, each intersection leg is represented by a leg segment. Traffic lights are used to control safety and regulate traffic at intersections, by alternating the right of way accorded to the moving vehicles.

The green light allows traffic to proceed, the yellow light indicating prepare to stop short of the intersection, and the red light prohibits any traffic from proceeding.

Flashing red: treated as a stop sign, also can signal the road is closed. Flashing yellow: caution, crossing or road hazard ahead. Flashing green: varies among jurisdiction; can give permission to go straight as well as make a left turn in front of opposing traffic (which is held by a steady red light), can indicate the end of a green cycle before the light changes to a solid yellow, or (as in some countries indicates the intersection is a pedestrian crosswalk).

The rapid growth in the developing countries has caused a problem with the demand of electricity. Rolling blackouts have been occurring on a regular basis, oil and gas companies cannot supply enough gas to meet the demand, and system failures have also plagued these countries. While going without power for a few hours once in a while is tolerable, it becomes very aggravating when it happens day after day, month after month. Also hurricanes and severe storms can knockout power-lines and cause blackout. Traffic light relies on electricity to illuminate its lamps or its displays to control the traffic in busy roads. Generally when a traffic light is non-operational, all drivers are required to stop at the intersection, take turns as if it were a four-way stop and proceed through with caution, but that does not always happen and car accidents are sadly a frequent result. Additionally, heavy fogs, snow storms and sandstorms may cause the vehicles' operators to lose the line-of-sight with the traffic light.

Presently, some systems utilize a mobile traffic light apparatus to be used temporarily at a dysfunctional intersection, but these systems proved unreliable when it takes long time to install these apparatus, or when the non-operational traffic lights cover a wide area, along with the high cost of these apparatus. Therefore the present invention creates in-car traffic light system to overcome the problems caused by the lack of traffic lights, the lack of traffic signs, the lack of line-of-sight with the road traffic light, or the non-operational traffic light.

Computer scientists at Carnegie Mellon University are working on a system that would replace conventional traffic lights with virtual ones—with stop and go signals appearing directly on the windshield or dashboard.

The Virtual Traffic Light project will use sensors in cars to co-ordinate their location.

'Our approach in this project will take advantage of the ability of vehicles to communicate with each other, thus creating a distributed and highly reliable system of in-vehicle virtual traffic lights (VTL)', they say.

The system works by using a leading vehicle that works as a temporary virtual infrastructure, stopping under a virtual red light at the entrance of the intersection and broadcasting virtual traffic light messages that are listened by the vehicles approaching the intersection.

The weaknesses of this system are that, the system not very efficient because of its complexity and that its traffic cycles are slower than the normal street traffic light cycles which may lead to intersection jams.

While the present invention creates in-car traffic light system that do not depend on vehicle to vehicle communication or intersection to vehicle communication with extremely high efficiency that mimics the actual street traffic lights performance. Also, the present invention creates in-car traffic light system that can work on smartphones and consumer-grade GPS receiver units.

Traffic signal timing is used to determine which approach has the right-of-way at an intersection, and how much green time the traffic light shall provide at an intersection approach, how long the yellow interval, how long the red light and how long green turning light, should be, and how long the pedestrian "walk" signal should be.

Intersections equipped with vehicle's detection devices are called 'actuated'. While intersections without detection are called 'fixed'. In the fixed operation, the intersection controller uses a set programmed time to alternate the right of way every cycle, the duration for each light is always the same. While in the actuated or semi-actuated operation, the light duration may change every cycle, based on the volume of the traffic on the proceeded approach. Many intersection controllers in the major cities use the semi-actuated system, which is suitable for a changeable traffic volume during the different hours of the day.

The present invention creates a fixed time cycle system. Wherein the traffic may vary during the different hours of the day at an intersection. Therefore, the present system divides the day into two or three hour-portions. One portion represents the high traffic hours, the second portion represents the medium traffic hours, and the third portion represents the low traffic hours. For each portion, the time duration for the green, yellow and red, turning and pedestrians, light signals will mimic the average time duration of the actuated timing, and each intersection leg segment will be represented by corresponding timing cycle.

By using the intersection types, the present invention creates a cycle file, in this file, all possible types of leg segments will be represented by the appropriate timing cycle. Additionally, each intersection unit will program its fixed time cycles for each one of its leg segments.

Since the vehicle unit uses the fixed time traffic light cycle file, in situations like weak visibility during fog storms, sandstorms. The intersection unit will activate the fixed time cycles which exactly match the fixed time cycles programmed in the vehicle unit to prevent any conflict between the in-car traffic light and the intersection traffic light. While in the other situations wherein, there is a dysfunctional intersection, or no traffic lights or no traffic signs there will not be any conflict.

The traffic maintenance crew or the police vehicles may activate/deactivate the intersection unit fixed time cycles by transmitting the activating/deactivating code at any reasonable time. The intersection unit receives the activating code and start the activation at a predetermined time such as 3:00 AM for example. After the weather allows the intersection traffic light to go back to the normal function, the traffic maintenance crew or the police vehicles transmit the deactivating code to the intersection units, the intersection unit will receive the deactivating code and end the activation at a predetermined time.

The pedestrians unit will program the "walk/don't walk" fixed time cycle, and when there will be power outage at the intersection, the intersection unit will use the backup battery to send a signal with the real-time to trigger the pedestrians unit to start displaying using its backup battery. Also the intersection unit will send a signal with the real-time to trigger the pedestrians unit to start displaying in the case of activating the intersection unit fixed time cycles.

When the vehicle's operator activates the in-car traffic light, the vehicle unit's GPS receiver determines the coordinates, speed, heading and date/time at real-time status, and by using the GPS digital map, the vehicle unit can determine the corresponding leg segment, the leg segment along with the direction will trigger the appropriate leg cycle. And the vehicle's LCD will illuminate the corresponding LED indicator. Moreover the GPS digital map file and fixed time cycles file could be updated and uploaded into the vehicle unit on predetermined dates.

Roadside Assistance

Roadside assistance is very important for many emergency situations. Vehicles may stuck on the side of the road with a flat tire, an empty gas tank or vehicle's mechanical issues. Also sudden health issues may cause the driver or the passengers to seek urgent help.

Presently cellular networks almost cover most of the cities, but in some unexpected areas drivers may suffer a loss cellular signal for many reasons, such as weak signal, unpaid cellular service fees, or an empty cellphone's battery.

The present invention provides an alternative method for the drivers to get roadside assistance in case of no cellular service in an area they may be stuck in. The driver can press on "help" button, or by using voice recognition, the vehicle unit will periodically transmit "help" signal over the long range frequency, and when any police vehicle travels by the area of the signal, the "help" alert will appear on its display along with the location of the vehicle that sent the help request.

Roadway Safety Alert

A traffic collision or traffic accident occurs when a vehicle collides with another vehicle, utility poles, concrete barricades on the freeway, or pedestrians. Traffic accidents may cause severe injuries, death, and property damage. The impact of the collisions may lead to psychological trauma, long lasting injury issues, or significant financial debts.

Most of the accidents take place due to a number of factors, which varies, from human errors (i.e. speeding, driving skill level or impairment.) to weather condition factors which may affect the roads by making them slippery due to snow fall or heavy rain.

The present invention provides a method to alert and warn the drivers of the upcoming accidents approach to guide them to pass safely thru an accident scene to avoid more collisions at the original accident site. When the police is notified about an accident on a freeway, the police can periodically transmit an "accident" alert message combined with instructions of how to safely approach the site of the accident by telling the drivers which lanes are safe to use and what speed is suitable. Also to direct the approaching traffic to follow a detour passage in case of road repair or traffic jam. The transmitted messages will be displayed on the vehicle LCD unit, also the yellow LED indicator will be flashing.

The Accident Report

Individuals involved in motor vehicle accidents can be held financially liable for the consequences of an accident, including property damage, injuries to passengers and drivers, and fatalities. Because these costs can easily exceed the annual income of the average driver, most US states require drivers to carry liability insurance to cover these potential costs. However, in the event of severe injuries or fatalities, victims may seek damages in civil court, often for well in excess of the value of insurance. Additionally, drivers who are involved in a collision frequently receive one or more traffic citations, usually directly addressing any material violations such as speeding, failure to obey a traffic control device, or driving under the influence of drugs or alcohol. In the event of a fatality, a charge of vehicular homicide is occasionally prosecuted, especially in cases involving alcohol. Therefore, the present invention provides a system to create (an accident report) to be used in accident cases. The vehicle unit's GPS receiver determines the coordinates, speed, heading and date/time at real-time status, these data will be continually recorded for at least 30 minutes. Then the last 5 minutes of the GPS recordings along with 10 minutes of recorded video of the roadway, wherein 5 minutes of the recorded video is recorded after the vehicle fully stopped. When the vehicle comes to a complete stop just after an accident, its speed will come to (zero) and the microprocessor of vehicle unit will trigger the memory to save the last 5 minutes of the video recording and to continue recording and saving the video for another 5 minutes after the speed becomes (zero). The law enforcement officer can download the accident report file by connecting his portable computer to the vehicle LCD display via a USB cable.

The High-Speed Pursuit

High-speed police pursuit is a very dangerous task for law enforcement and the public when a suspect uses a vehicle to escape from law enforcement attempting to stop or arrest him, the high-speed chase is considered as a road-safety problem, specially when innocent drivers not involved in the pursuit may be struck by the elusive suspect in his attempt to escape, or by the police vehicles during the chase.

A number of techniques used by police to end the chases, from pleading with the suspect, disabling the suspect's vehicle by shooting out tires, or the use of spike stripes, or boxing in the suspect's vehicle with police cruisers. All of the forceful methods may impose risk and harm to all involved as well as innocent bystanders.

Few attempts been made to remotely disabling the fleeing vehicles but those attempts face severe weaknesses or unreliable to achieve the goal of having low-risk and efficient systems.

Some of the remotely controlling systems such as U.S. Pat. No. 6,470,260 of Martens et al, the system utilize RF signals to send control commands to the target vehicle, after first identifying vehicles in the vicinity of the targeted vehicle, following the targeted vehicle until it is the only vehicle remaining of the originally identified vehicles, and then apprehending the targeted vehicle, also by identifying a select group of vehicles using vehicle descriptor limitations.

The weaknesses of this system are that, the system not very efficient when many vehicles share same descriptor limitations, or when the RF response signals come from other directions along with the target vehicle's direction, this will increase the number of the responding vehicles which may fit the descriptor limitations.

Some other systems use RF transmitters are very unreliable when they rely on license plates to identify the pursued vehicles, specially if the suspect uses stolen license plates or the law enforcement officer unable to obtain a line-of-sight with the target vehicle. Also all of these systems are unreliable when the target vehicle goes outside the range of the control signal that transmitted by the police vehicle unit.

The present high-speed pursuit system enables the law enforcement to safely chase and control a target vehicle. When the police is informed about a suspect vehicle fleeing a scene of a crime or refused to obey a police stop request or when the police assumes that a target vehicle moving on a certain road, the police vehicle unit transmits a log command. The police unit will transmit this command combined with a reference speed, road name, target direction, vehicle position code and police vehicle GPS coordinates via the long range frequency. And by using the vehicle model, type and class application, all of the speeding vehicles will appear in a list of vehicle category on the LCD display of the police unit, the police can select the vehicle category that fits the initial descriptions of the target vehicle from the list of the speeding vehicles. Then after selecting the right category, he can pinpoint the exact target vehicle, and by the using the programmed pictures of the vehicle model he can confirm his work. After that the police transmits a connect command. Connect command is used to connect the target vehicle to the cellular network, the police unit will transmit this command combined with the cellphone codes and a local dispatch center phone number. The target vehicle will periodically send its location data.

Also the police officer or the local dispatch center can call the target vehicle or send control commands to it. The local dispatch center will continue tracking down the movement of the target vehicle and communicate with the police vehicles in the vicinity of the target vehicle. Therefore, the police can alert and warn or talk with the suspect or to stop his vehicle safely.

However, if the target vehicle is blending with non speeding vehicles, in this case the police will approach closely the vicinity of the target vehicle and sends a log command. The police unit transmits the log command combined with the target vehicle make or model or body class type. The police unit uses the short range frequency to transmit this command. If the police unit transmitted the log command without road name or direction or position, it will log vehicles in all directions. Also the logged vehicles will appear in a category list, and by selecting the right category, the police can pinpoint the exact target vehicle from the list, and send a connect command to it, and communicating with it. All of these commands can be inputted via the voice recognition application to enhance the safety of the law enforcement personnel while chasing the suspect.

Roadway Radar System

Highway patrol officers rely on radar/laser guns to detect speeding vehicles, basically the police aims his handheld radar unit toward a specific moving vehicle to determine its speed then issues a speeding violation ticket to the driver if the detected speed is far away above the posted speed limit.

The police uses line-of-sight with the target vehicle when aiming his radar toward it and instantly reads the detected speed, the police randomly select the target vehicle travelling in the vicinity of other vehicles. However some speeding drivers are very skilled to spot the police cruiser shortly before the police aims his radar toward them or they slow down just after they notice other vehicles ahead of them being a target of the police radar, this process does not differentiate between the actual speeders and the unlucky drivers who may be just speeding for short period of time, also this process may disturb the traffic when the speeding vehicles suddenly drop their speed after they notice the police vehicle aiming the radar gun toward them.

The present invention provides a method to fairly detect speeding vehicles. The police will send a radar command via the long range signal, and the speeding vehicles will appear in a list on the police unit display, each vehicle in this list will show a speeding report, in this report the number of times and the length of time the vehicle was speeding over a selected (reference speed) in the last 30 minutes of movement for example. The police unit is programmed to give a higher priority to the larger vehicles along with higher length of speeding time, the bigger the vehicle size along with longer span of speeding time is an ideal candidate to top the list for citation. While, the cited vehicle was speeding over the reference speed when it received the radar command. Therefore the police can fairly send a speeding alert to the top of the list and communicate with it. Also this process can be automatically done by the police unit.

Law Enforcement Safety During a Check of a Vehicle

Stop and frisk has been an effective tool for police since the 1968 case Terry v. Ohio, when the Supreme Court ruled in favor of it. The court agreed with the police that officers face uncertain and dangerous situations on the streets, circumstances that can potentially threaten both law enforcement officers and the public. For this reason, police officers need a set of flexible responses that allow them to react based on the information they possess. Thus, distinctions should be made between a stop and an arrest (or seizure of a person), and between a frisk and a search. Under the Terry ruling, a police officer may stop and detain a person based on reasonable suspicion. And, if the police reasonably suspect the person is armed and dangerous, they may also frisk him or her for weapons.

Another example, a car driver might have been pulled over because he was driving erratically. However, a smell coming from the car or signs of slowed reflexes on his part may have indicated he is using some type of drug or alcohol.

If the officer decided to search his car from glove box to trunk based on the suspicion that he is using and possibly transporting an illegal substance, this would be probable cause.

The present invention provides a method to enhance the safety of police officers during a reasonable suspicion to stop and check a vehicle. When the officer decides to pull over a vehicle, he will send a (log command) to the vehicle, the logged vehicles will appear in a list, and by selecting the target vehicle from the list, the police can send connect command to connect it to the network, the local dispatch center will show the target vehicle on the tracking digital map.

Therefore, the police can alert the driver by sending warning and instruction text messages and/or talk with the driver or to stop his vehicle safely. This method may discourage the driver or the car's passengers to attempt to flee or causing harm to the officer when he realizes that his vehicle is being tracked and controlled by the law enforcement officer.

Emergency Vehicle Intersection Preemption System

The present invention provides a system to grant the emergency vehicle the right of way at an intersection by making the intersection traffic controller responds to the priority request transmitted by the emergency vehicle to manipulate the approached traffic light to green signal, also to manipulate the approached right/left turning light to green signal when the intersection unit receives a right/left turning request signal from the approaching emergency vehicle.

The Emergency Vehicle Unit

This unit is exactly as the vehicle unit, but it can communicate with the intersection unit via the long range (one to two mile) radio frequency signal. The emergency vehicle unit will periodically transmit the preemption codes, these codes will be checked by the intersection unit to decide whether to grant the preemption request or ignore it.

The Preemption Process

The emergency vehicle transmits the preemption codes to the intersection units to request priority passages as the following process:

The Preemption Codes

1—A passcode, one of the names of the intersection roadways will be the passcode, for example if the intersection is two-road intersection, then either name of the two names of the roads will be a passcode.

2—The emergency vehicle coordinates, the intersection unit will calculate the distance between the intersection and the emergency vehicle by using its coordinates and the emergency vehicle's coordinates, and when the distance lies between (0.6 mile and 0.4 mile), the intersection unit will trigger the traffic controller to change the light signals regardless the speed of the emergency vehicle.

3—The emergency vehicle class type, (fire trucks, ambulances and police vehicles) will be class "A", but fire trucks have higher priority over ambulances, and ambulances have higher priority over police vehicles for example, lower class vehicles such as buses will be class "B".

4—Right turning code and left turning code, the intersection unit will trigger the traffic controller to allow turning when the distance between the emergency vehicle and the intersection lies between (0.2 mile and 0.1 mile).

5—The heading code, this code tells the intersection unit which specific light to turn to green.

The emergency vehicle unit will determine the road names by matching and comparing the GPS coordinates to the data from the digital map, and periodically transmits the road names combined with the preemption codes via the long range radio frequency. Therefore, the intersection units will be alerted enough time before the start of the light signals changing process. Each intersection unit stores its coordinates and the names of its roadways, also each intersection unit has an ID, the intersection coordinates could be used as an ID to identify the intersection unit.

The intersection unit receives the names consecutively and compare them to the names that stored in its memory, and if one name matches, then it will go to the next step, which is reading the vehicle class type, vehicle ID, direction of travelling and the emergency vehicle's coordinates. It will decide the order of priority based on the class type of the vehicle and/or first come first served manner. Thus it will grant the preemption and alert all the emergency vehicles covered by its long range signal enough time before it is actually changes the intersection light signals.

The intersection unit programmed to recognize the type of the emergency vehicle, and will give the priority to fire truck over the ambulance, and the ambulance over the police car. The lower class vehicles, such as the buses, will transmit the preemption request over the short range (0.1 mile) radio signal.

After the intersection unit grant the preemption, it will transmit (the vehicle's ID, the road name, the heading) of the preempted vehicle and the intersection coordinates over a (0.60 mile to 0.80 mile) range radio signal. When the emergency vehicle receives the data from the intersection unit, the emergency vehicle green LED indicator will illuminate if its vehicle's ID matches the vehicle's ID transmitted by the intersection unit, and the alert message will be for example; (ACCESS OK, heading), but if its vehicle's 1D does not match the vehicle's 1D transmitted by the intersection unit, its yellow LED indicator will start flashing and the alert message will be ("emergency vehicle", heading) and another message includes (the names of the intersection roadways) based on the intersection coordinates.

When the distance between the emergency vehicle and the intersection lies between (0.6 mile and 0.4 mile), the intersection unit will trigger the traffic controller to change the light signals regardless the speed of the emergency vehicle, it will give a predetermined period of time (6 or 7 seconds) for example for a yellow signal light in the direction of the approaches that may conflict with the emergency vehicle approach before it turns into red signal light. Also the intersection unit will tell the intersection controller to complete the normal timing of the light cycles if there was no conflict with the approaching emergency vehicle or to extend the green time until the end of the preemption.

When the emergency vehicle wants to make a right/left turning, the emergency vehicle's operator must press on the right/left turning button to transmit the turning request signal. The intersection unit will receive the turning request code and grant the turning when the emergency vehicle's distance lies between (0.2 mile and 0.1 mile). The main reason for this distance restriction is to prevent as many unaffected intersections from executing the turning request, thus to not disturb the unaffected traffic at other intersections. There will be 5 or 6 seconds of yellow interval signal in the direction of the approaching that interfere with turning of the emergency vehicle before it turns to red signal.

Additionally, when the intersection unit triggers the controller to change the light signals, the other non emergency vehicles will start flashing their yellow LED indicators and the alert message will be ("emergency vehicle" . . . "road name" . . . heading) when they receive an alert signal transmitted by the intersection unit's short range (0.1 mile) transmitter. And in case of using pedestrians units, their LED indicators will start flashing when they receive a signal transmitted by the intersection unit. The pedestrians units programmed to recognize their respective intersection unit ID. For example, the intersection coordinates could be used as an ID for the intersection unit, thus the pedestrians units will respond only to their respective intersection unit.

In some occasions the vehicles may receive more than one alert message from different intersection units. In this case, the vehicle display will show the travelling road name along with the heading for each preempted emergency vehicle. Also the vehicle yellow LED indicator will be flashing. Additionally, in the case of a lower class type vehicle is granted the preemption, the intersection unit will not transmit any alert messages. Therefore, neither the vehicle's display or the pedestrian units will be affected.

The intersection unit will consider the end of the preemption of class "A" vehicles when the distance between the emergency vehicle and the intersection lies between (0.1 mile and zero), also it will consider the end of the preemption when it receives names not stored in its memory. After the end of the preemption, the light signals will remain the same for 10 to 15 seconds before the intersection controller goes back to its normal timing. For class B vehicles the preemption process will take a predetermined period of time such as 30 seconds or 20 seconds before the controller goes back to its normal timing.

U.S. Pat. No. 7,327,280 of Bachelder et al; provides an emergency vehicle traffic light preemption system for preemption of traffic lights at an intersection to allow safe passage of emergency vehicles. The system includes a real-time status monitor of an intersection which is relayed to a control module for transmission to emergency vehicles as well as to a central dispatch office. The system also provides for audio warnings at an intersection to protect pedestrians who may not be in a position to see visual warnings or for various reasons cannot hear the approach of emergency vehicles. A transponder mounted on an emergency vehicle provides autonomous control so the vehicle operator can attend to getting to an emergency and not be concerned with the operation of the system. Activation of a priority-code (i.e. Code-3) situation provides communications with each intersection being approached by an emergency vehicle and indicates whether the intersection is preempted or if there is any conflict with other approaching emergency vehicles. On-board diagnostics handle various information including heading, speed, and acceleration sent to a control module which is transmitted to an intersection and which also simultaneously receives information regarding the status of an intersection. Real-time communications and operations software allow central and remote monitoring, logging, and command of intersections and vehicles.

The weaknesses of this system are its complexity and it relies on network communications between the emergency vehicles and the intersections, which will increase the cost of operating and maintaining the system, thus, further delays deployment.

U.S. Pat. No. 8,610,596 of Johnson; provides Management of traffic signal preemption control equipment. In one approach, logged preemption data is periodically read from each of a plurality of intersections having respective preemption controllers for preempting traffic signals at the intersections. The logged preemption data at an intersection describes operational states of the preemption controller and each vehicle control unit that submitted a preemption request at the intersection and data describing each individual preemption request. The logged preemption data read from the plurality of intersections are stored in a database. The database is monitored for data indicative of changes in operational status of the traffic signal preemption control equipment. In response to the data indicating a change in operational status, data descriptive of the change are output.

This system utilizes the Opticom® Priority Control System, the OPTICOM GPS priority control system, or a networked system. The Opticom® GPS system utilizes a GPS receiver in the vehicle to determine location, speed, and heading of the vehicle. The information is combined with security coding information that consists of an agency identifier, vehicle class, and vehicle ID and is broadcast via a proprietary 2.4 GHz radio.

An equivalent 2.4 GHz radio located at the intersection along with associated electronics receives the broadcasted vehicle information. Approaches to the intersection are mapped using either collected GPS readings from a vehicle traversing the approaches or using location information taken from a map database. The vehicle location and direction are used to determine on which of the mapped approaches the vehicle is approaching toward the intersection and the relative proximity to it. The speed and location of the vehicle are used to determine the estimated time of arrival (ETA) at the intersection and the travel distance from the intersection. ETA and travel distances are associated with each intersection approach to determine when a detected vehicle is within range of the intersection and, therefore, a preemption candidate. Preemption candidates with valid security codes are reviewed with other detected vehicles to determine the highest priority vehicle. Vehicles of equivalent priority are generally selected in a first come, first served manner. A preemption request is issued to the controller for the approach direction with the highest priority vehicle travelling on it.

The weaknesses of this system are its high complexity and it relies on wired networks such as Ethernet or fiber optics and wireless networks such as Mesh or IEEE to detect the emergency vehicles, which will increase the cost of operating and maintaining the system, thus, further delays deployment.

The present invention provides a system that utilizes a long range radio signal frequency which will not be affected by weaknesses that face the strobe light systems due to weather conditions or lack of line-of-sight with the intersection.

Furthermore, the present preemption system is a better alternative to the Opticom® GPS system and other RF systems, because it is less complicated and more efficient and less costly, the intersection unit works in a very simple way and doesn't need to be connected to any network to achieve a high level of efficiency. The present system also provides feedback and alerting and warning method to emergency vehicles and non emergency vehicles.

Furthermore, the emergency vehicle's long range signal will allow the intersections to create safe Corridors. Thus, to increase the efficiency of the system without the need to preset or assign a travelling route. The simplicity of the intersection unit configuration will decrease the maintenance and managing cost.

Security and Crime-Fighting System

Unlawful or forcible entry or attempted entry of a residence. This crime usually, but not always, involves theft. The illegal entry may be by force, such as breaking a window or slashing a screen, or may be without force by entering through an unlocked door or an open window. As long as the person entering has no legal right to be present in the structure a burglary has occurred. Furthermore, the structure need not be the house itself for a burglary to take place; illegal entry of a garage, shed, or any other structure on the premises also constitutes household burglary. If breaking and entering occurs in a hotel or vacation residence, it is still classified as a burglary for the household whose member or members were staying there at the time the entry occurred.

Violent crime includes murder, rape and sexual assault, robbery, and assault. Information about murder is obtained on a yearly basis from the FBI's Uniform Crime Reports. There are two measures for non-fatal violence—the Uniform Crime Reports (UCR) and the National Crime Victimization Survey (NCVS). NCVS measures rape or sexual assault, robbery, and aggravated and simple assault.

A motor vehicle, commonly referred to as a getaway car, is frequently used by the offender to flee the scene of a crime. Getaway cars are prevalent in major crimes such as bank robberies and homicides. Very frequently, but not always, a getaway car is stolen and is abandoned soon after the crime, in the hope that the vehicle cannot be traced to the offender.

If the vehicle does not belong to the driver and is quickly abandoned, a trace may not be possible without examination of forensic evidence. In some cases, the offender may go to extreme measures to discard the getaway vehicle in order to hide his 'tracks' by dumping it in a river or secluded park, and/or setting it on fire; while this may not make solving the crime impossible, it can make the effort more difficult for law enforcement. The criminal investigation can be further complicated by the use of multiple getaway vehicles, which can confuse eyewitnesses, as well as creating multiple places to investigate: each vehicle is a new crime scene. In Forensics for Dummies, the rookie is reminded: "At a minimum, the crime scene includes . . . Areas from which the site can be entered, exited, or even escaped.

Since a getaway vehicle often requires a getaway driver, this additional co-defendant creates problems in itself. First, having a second perpetrator involved creates yet another inchoate offence that the prosecutor can use in an indictment: conspiracy. Also, a co-conspirator may cooperate with police, either intentionally by 'turning state's evidence' by way of a plea bargain, or inadvertently by giving away information to persons outside the conspiracy. If the driver, who may have parked some distance away, unknowingly drives past the scene of the crime, the getaway vehicle itself may identify the occupants to the crime victim and police. This is especially true if the vehicle has unique markings or is an unusual model. Without a driver, the perpetrator may make errors due to the stress associated with the crime, or lack of ability to multi-task (such as leaving the car keys at the scene of the crime); a murderer needs to "think strategically" to get away with murder—to "mislead police, stage crime scenes and destroy evidence." Taking a public bus or taxicab makes the driver an involuntary co-conspirator, yet also creates an eyewitness whose interest it is to cooperate with police.

Witnesses to the crime will often attempt to take note of the tags (registration plate) or other important details of the car and report this information to law enforcement. It may be possible to identify the offender if an officer spots the offender in possession of the vehicle prior to its abandonment.

Thus, the present invention created a system and a method to help law enforcement identify the offenders in quick and efficient manners, by identifying the suspect vehicles that may be used by the offenders. Therefore, logging the vehicles that come nearby a spot logging unit and storing the logged data combined with real-time can grant the law enforcement instantly a quick access to the logged information from the crime scene logging unit.

Prior systems generally rely on continuously logging the vehicles' locations in a central database, these database systems are similar to the database systems used by cellphone carriers. And when there is a need to obtain data relevant to a particular location 'crime scene', the law enforcement follows the legal protocol to obtain these vital records from the database carrier. The serious weakness of these systems is the wasting of the critical time just after the crime. A plenty of valuable time will be lost during the process of obtaining the logged records from the database carrier. Therefore, the offenders will have a good chance to abandon the getaway vehicle and may get rid of some important evidence. Also prior systems may violate the privacy rights of the vehicles' owners by having their movement continually monitored and stored in a central database for a long period of time. Thus, the present invention relies on individually owned spot logging units to be used for security and protection reasons (similar to the vedio cameras' purpose), to obtain an immediate access to the stored data, these individually owned spot logging units can be installed in homes, public parks, banks, schools, and commercial properties such as malls, gas stations, grocery stores, warehouses, parking lots, . . . etc.

Spot Logging Unit

This unit uses the short range (0.1 mile) radio frequency transceiver module to communicate with the vehicle unit. And comprises a memory to store the data transmitted by the vehicle unit.

Generally, vehicles drop their speed when they come to stop, therefore the vehicle unit will transmit a logging signal when its speed goes under (15 MPH) via the short range (0.1 mile) signal to alert the spot logging unit. And if there is any spot logging unit in the range of the transmitted signal, the spot logging unit will respond and send "log command" to the vehicle. The vehicle will reply by periodically transmit its VIN code combined with location and real-time, until the vehicle's speed goes to (zero). And when the vehicle's speed goes above (zero), the vehicle unit will periodically transmit its VIN code combined with location and real-time. The vehicle will stop transmitting after its speed goes above (15 mph). By obtaining the start time of logging and the end time of logging we can determine the period of time the vehicle was at the scene. The memory chip of the spot logging unit could store the logged data for a long period of time.

Missing Person Search and Crime-Fighting Method

Many kids and loved ones go missing every year, and this may cause a huge pain and severe long lasting psychological trauma for the parents, family members and friends. People go missing for a number of reasons, an old person with the Alzheimer's disease may wander around or get lost without the ability to contact his family or his care giver. Some of the teenagers runaway from their families is often a common problem. Children and adults may go missing when they become victims of a foul play.

Generally when a loved one goes missing, panic occurs, and his family's mind is in turmoil, his family accounts—in as much detail as possible where the person was and what he was doing before he went missing. This may urge calling friends, family members or going to places that the person frequents, and finally filing a missing person report with the local police.

Furthermore, robbery or burglary is a serious crime when a perpetrator commits an offence, usually that offence will be theft. Generally the perpetrator or perpetrators use a getaway car to escape the crime scene after committing the offence. There are some known ways the police use to fight bank robbery crimes, such as hiding a GPS device with cash stolen by the robbery suspect, and tracking him down then arresting him. Also banks may use RFID tags hidden with the cash to assist in tracking the stolen cash, which may lead to the arrest of a suspect robber.

Radio-frequency identification (RFID) are used for the purposes of automatically identifying and tracking tags attached to objects, such as personal possessions, clothing, cash, . . . etc. The tags contain electronically stored information. Some types of very short range (a few meters) active tags have an on-board tiny battery and periodically transmit their identification signal.

The present invention utilizes the RFID technology to allow the very short range (few meters) read-only active RFID tags to be logged in the vehicle unit at a real-time, to make a real connection between the missing person or the stolen object that carries the RFID tag and a vehicle or vehicles to assist in a quick and efficient tracking, also to use this connection as an evidence in criminal cases.

Generally, when an active RFID tag passes through the field of the scanning antenna, it detects the activation signal from the antenna. That "wakes up" the RFID chip, and it transmits the information on its microchip to be picked up by the scanning antenna of the tag reader (interrogator).

Whereas, radio-frequency identification (RFID) active tag of the present invention uses a very short range preferably (2 to 3 meter) radio frequency to communicate with the vehicle unit over its short range frequency transceiver. The tag will automatically and periodically transmit its identification signal (once every one or few minutes to protect its on-board battery from wearing out in a short time, the user can remove the in-board battery every time the tag is not in use). Additionally, in another embodiment of the active RFID tag, the tag will start periodically transmit its identification signal every time the user activates it by pressing on a button integrated in it), and when the vehicle unit comes in the range of the tag signal, it will store the tag ID in real-time status. Therefore, the vehicle unit programmed to create a tag report which contains the tag ID, the VIN code of the vehicle, the date/time and period of time in which the tag was logged in the vehicle.

RFID tag command is used to allow the vehicles' units to send a report about a particular tag number "target tag". The police unit will transmit the RFID tag command or the clone command paired with the RFID tag command combined with the cell-phone codes, the local dispatch center's phone number, the target tag number and a time window. Time window is a period of time in minutes, for example (60 or 120 minutes), to allow the vehicle unit to randomly select a time within the time window to connect to the cellular network and send the RFID tag report. This way if the tag was logged in a number of vehicles, each one of these vehicles can connect and report in different times without any possible interference.

Children Safety in Hot-Cars

The statistics of Heat-stroke Deaths of Children in Vehicles in the untied states of America, indicated that. So far in 2014 there have been at least five heat-stroke deaths of children in vehicles; four confirmed as heatstroke and the other one still pending official findings by the medical examiner. Last year, 2013, there were at least forty-four deaths of children in vehicles; thirty-nine which has been confirmed as heatstroke and five which, based upon the known circumstances, are most likely heatstroke (2013 list). In 2012 there were 34 deaths of children due to hyperthermia (heatstroke) after being left in or having gained access to hot cars, trucks, vans and SUV's. Since 1998 there have been at least 606 documented cases of heatstroke deaths of children in vehicles. This data and study shows that these incidents can occur on days with relatively mild (i.e., ~70 degrees F.) temperatures and that vehicles can reach life-threatening temperatures very rapidly.

The atmosphere and the windows of a vehicle are relatively "transparent" to the sun's shortwave radiation and are warmed little. However this shortwave energy does heat objects that it strikes. For example, a dark dashboard or seat can easily reach temperatures in the range of 180 to over 200 degrees F.

These objects (e.g., dashboard, steering wheel, childseat) heat the adjacent air by conduction and convection and also give off longwave radiation which is very efficient at warming the air trapped inside a vehicle. Heatstroke occurs when a person's temperature exceeds 104 degrees F. and their thermoregulatory mechanism is overwhelmed. Children's thermoregulatory systems are not as efficient as an adult's and their body temperatures warm at a rate 3 to 5 times faster than an adult's. Study of temperature rise in enclosed vehicles concluded that the temperature inside the enclosed vehicle may reach 115 deg F. in just 30 minutes in an average Ambient temperature of 80 degrees F.

The present invention creates a new method of warning and alerting the parents or the caregivers when a child is being left in or having access to hot vehicles. The concept of this method is to attach an active RFID tag to the child and when the temperature inside the vehicle reaches a critical point for a predetermine period of time such as (5 to 10 minutes) for example, along with the presence of the tag. The vehicle unit will trigger the warning by either using the vehicle's siren and/or calling the (parents or the caregivers) phone number.

BRIEF DESCRIPTION OF THE DRAWINGS

The invention is herein described, by way of example only, with reference to the accompanying drawings, wherein:

FIG. 7 Also illustrates an example of a chased target vehicle being tracked on the digital map and displayed on the police LCD unit.

FIG. 41 Illustrates an SQL table Section_Location to locate a specific geographical section.

FIG. 42 Illustrates an SQL table to link between position coordinates on a leg-segment and the respective traffic light cycles.

FIG. 43 Illustrates an SQL table to link the traffic light phases and the respective cycle name.

FIG. 44 Illustrates an SQL pedestrian table to link between an intersection coordinates and the respective pedestrian walking (crossing) cycle ID along with the street name.

FIG. 45 Illustrates an SQL table to link the pedestrian traffic light phases and the respective cycle ID.

FIG. 46 Illustrates an SQL table to link between position coordinates on a freeway and the respective freeway name.

DETAILED DESCRIPTION OF THE INVENTION

Figure 1:
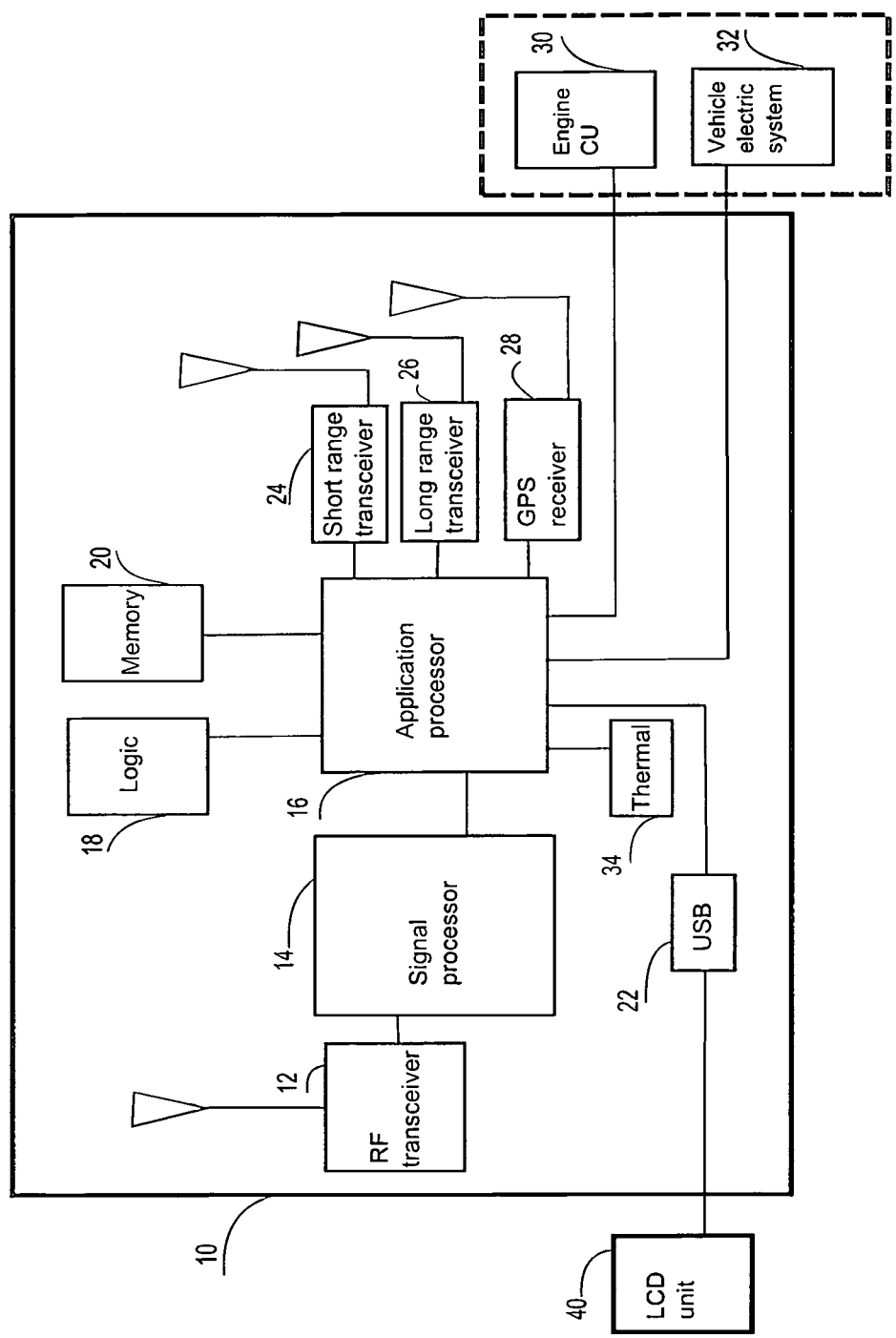
FIG. 1 Is a block diagram of the vehicle unit 10.
Figure 2:
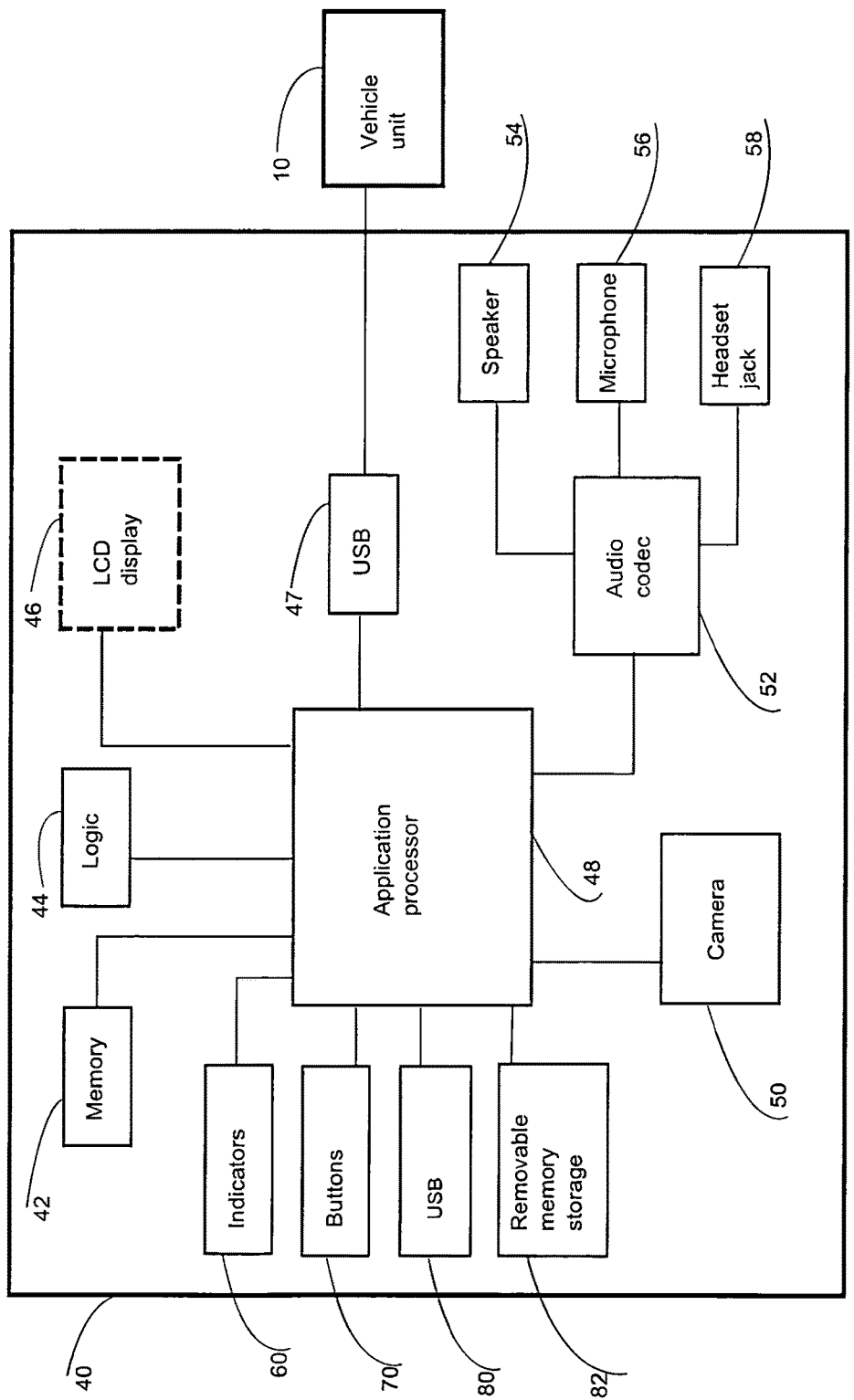
FIG. 2 Is a block diagram of the vehicle LCD unit 40, (the vehicle unit 10 and the LCD unit 40 will be referred as unit V10).

As shown in FIG. 1 and FIG. 2, the vehicle unit V10 installed in each new and used vehicle, and is powered by the vehicle's electric system 32. Vehicle unit 10 includes a RF transceiver 12, analog/digital signal processor 14, application processor 16, logic chips 18, memory chips 20, a USB port 22, a short range transceiver 24, a long range transceiver 26, and a GPS receiver 28. Vehicle unit 10 is connected to the engine control unit (ECU) 30 in a manner to disturb the vehicle (ECU) when the vehicle unit V10 is being removed or tampered with.

There are both digital-to-analog and analog-to-digital conversion computer chips within the processor 14. They convert audio signals going out from analog to digital, and then they convert the audio signals from digital back into analog. The unit V10 is designed to connect to the cellular network and to communicate with the police vehicle unit P210 as well. The microprocessor 16 is in charge of dealing with most of the tasks that are to be performed by the unit V10. It also focuses on the unit's control signals (to and from the base station) and the control commands functions. It helps to interconnect all of the LCD unit 40 main functions. The memory 20 includes the flash memory and ROM components of the unit circuit board serve as a storage location for the unit. It stores the vehicle identification number "VIN" code, also the memory 20 temporary stores cellphone codes transmitted by the police vehicle unit P210 for a selected period of time, the memory 20 also stores the database of the GPS digital map application, the GPS readings for a period of time such as (the last 30 minutes of the vehicle movement), wherein these readings include "coordinates, speed, heading and date/time", also it stores the RFID active tag readings "tag number at real-time status", as well as the entire operating system.

The unit 10 uses a long range radio frequency transceiver module 26, preferably (one to two mile) range, and a short range radio frequency transceiver module 24, preferably (0.1 mile range), a thermal module 34, and a GPS receiver module 28 to determine the location, heading, speed and date/time of the vehicle. The thermal module 34 is used for determining the temperature inside the vehicle.

Figure 3:
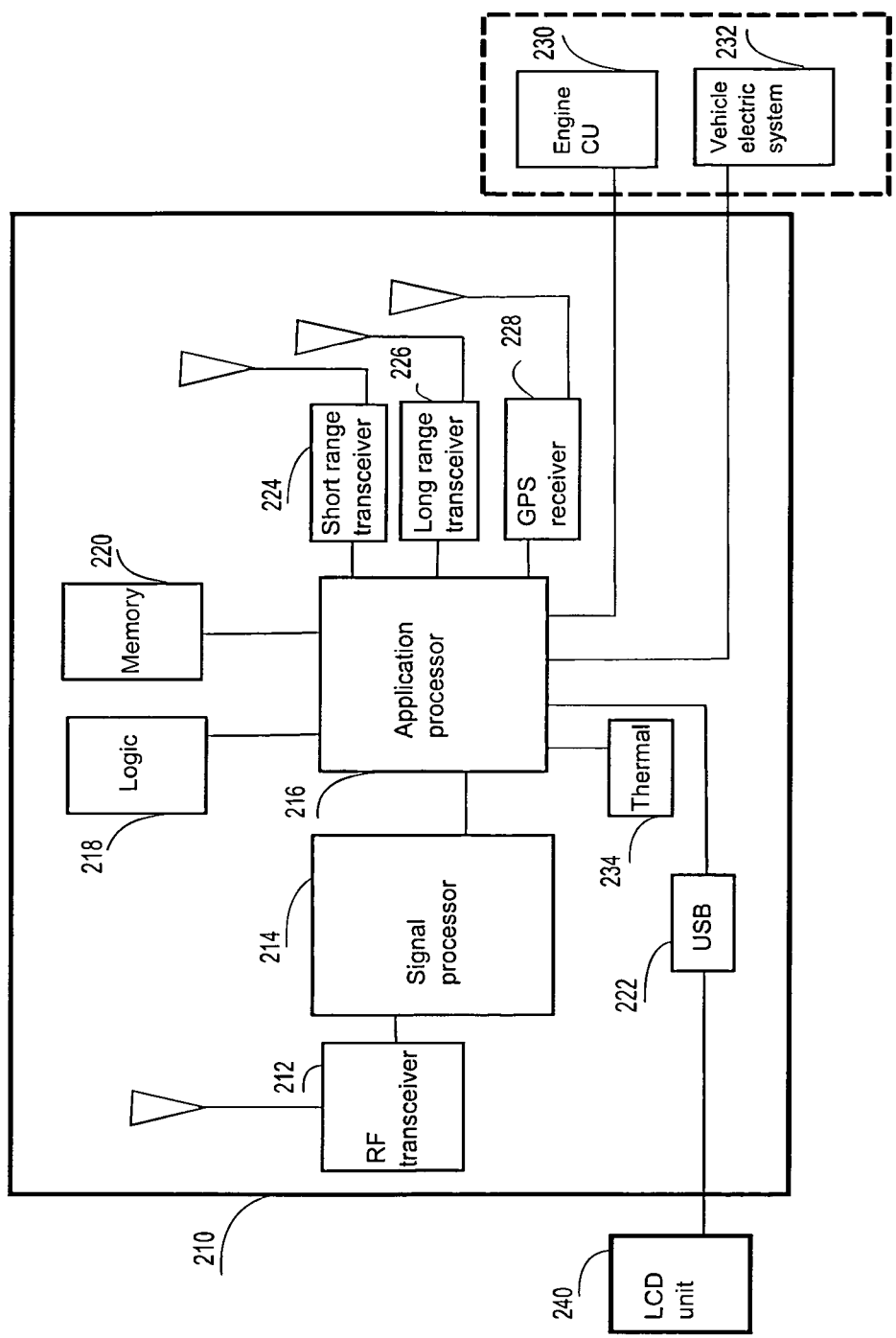
FIG. 3 Is a block diagram of the police vehicle unit 210.
Figure 4:
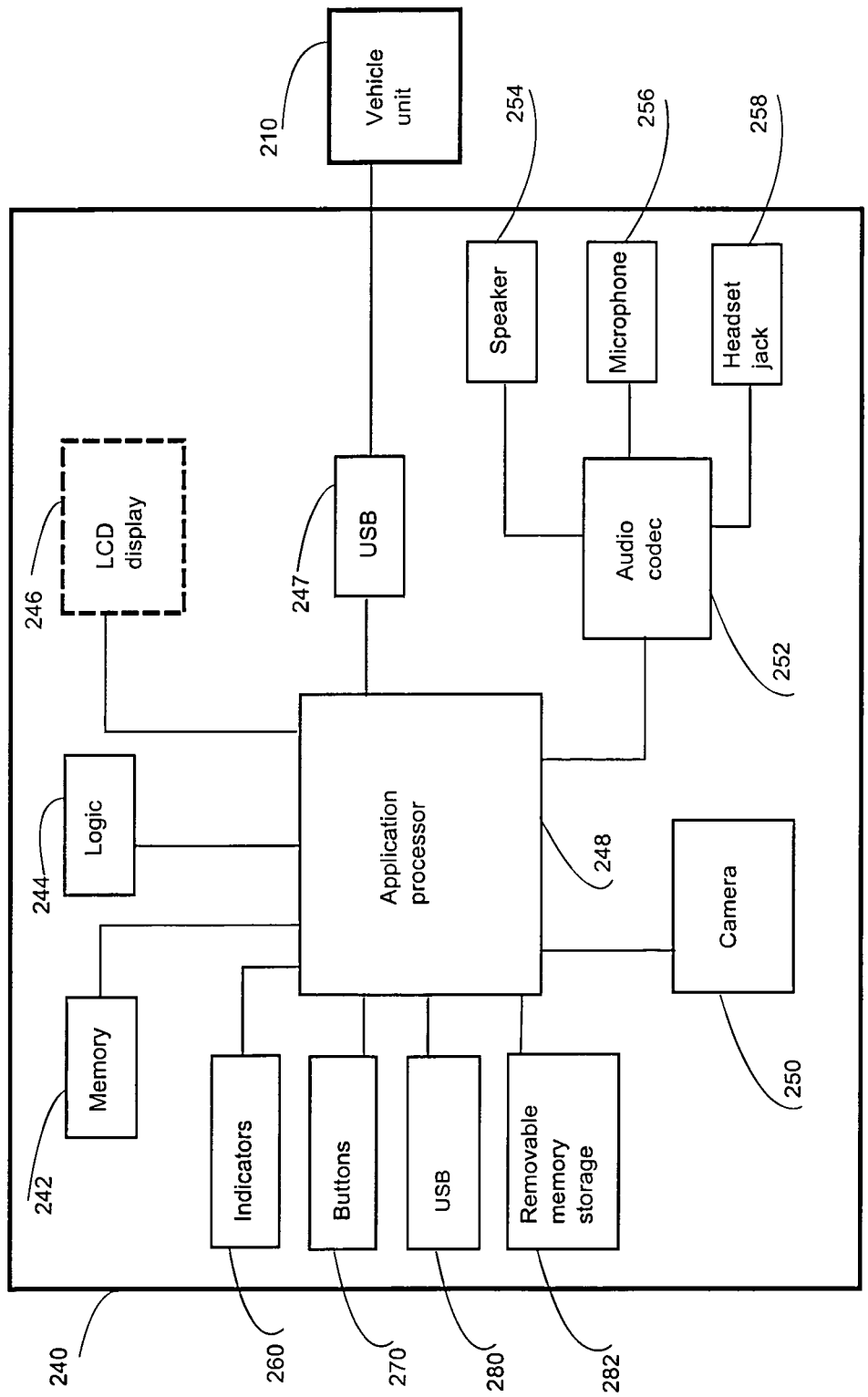
FIG. 4 Is a block diagram of the police vehicle LCD unit 240, (the police vehicle unit 210 and the LCD unit 240 will be referred as unit P210).

As shown in FIG. 3 and FIG. 4, the police vehicle unit P210 includes similar electronic components as the vehicle unit V10, and is programmed to communicate with the vehicle unit V10 via the long range (one to two mile) and the short range (0.1 mile) radio frequency, also the police unit P210 can communicate with the vehicle unit V10 via the cellular network. In addition, the police unit P210 can communicate with the intersection unit 100 via the long range radio signal. Furthermore, the memory 220 stores the "control operating system" which is responsible for all the control commands needed to manipulate the vehicle unit V10. The memory 220 also stores the preemption codes, and the vehicle model, type and class application, also the memory 220 stores the database of the GPS digital map application. The unit P210 is installed inside the police vehicle in either a portable manner or in an installation manner similar to the unit V10.

The police LCD unit 240 as shown in FIG. 4, includes a touch screen LCD display 246 which can display colored pictures of a wide range of vehicles models. The LCD display 246 is used to display the response messages transmitted by the vehicle unit V10, it is also used as an interface to activate the control commands. The LCD unit 240 also includes a microphone module 254, a speaker module 256, and a headset jack module 258 for audio communication with the vehicle unit V10, they are also used to activate the control commands via the voice recognition application. The LCD display 246 also displays alert messages transmitted by the intersection unit 100.

Generally the LCD unit 240 includes application processor 248, the memory 242 to store the vehicle model, type and class application, it also stores the in-car traffic light cycle application which is a component of the in-car traffic light system, camera module 250 to keep at least ten minutes of recorded video of the roadway, LED indicators 260 to be used for in-car traffic light system and for alerting/warning indication, the buttons 270, a USB port 280, and a removable memory storage 282. The application processor 248 is responsible for interpreting and executing the control commands and sub-commands from the users interface. The USB 280 is used to update the digital map application, the vehicle model, type and class application, and the in-car traffic light cycle application. The USB 280 is also used to update the entire operating system and the control commands. The removable memory storage 282 is used for keeping a record of the police vehicle unit P210 activity for predetermined period of time. The buttons 270 include one button 271 for turning on/off the preemption system, by pressing on this button, the police vehicle unit P210 transmits the preemption codes, another button 272 to send the right-turning preemption request, another button 273 to send the left-turning preemption request over the long range frequency, another button 274 to turn on/off the in-car traffic light system, and another button 275 to turn on/off the LCD unit 240, by turning off the unit 240 the vehicle unit V10 will be released from the control commands of the unit P210. The LCD unit 240 is connected to the police vehicle unit 210 via a USB cable which is connecting the USB port 247 to the USB port 222. The USB port 222 supplies electric power across the cable to the LCD unit 240.

Figure 39:
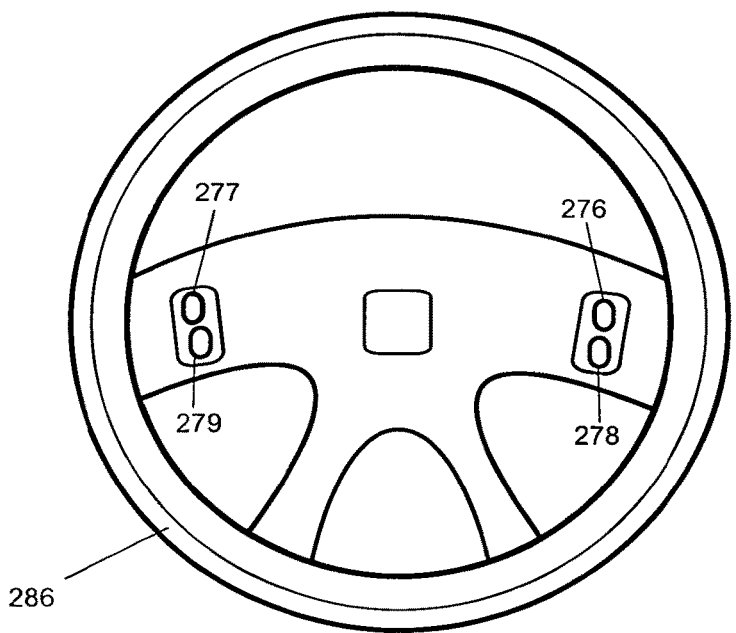
FIG. 39 Illustrates an example of the preemption buttons installed on the steering wheel of the emergency vehicle.
Figure 40:
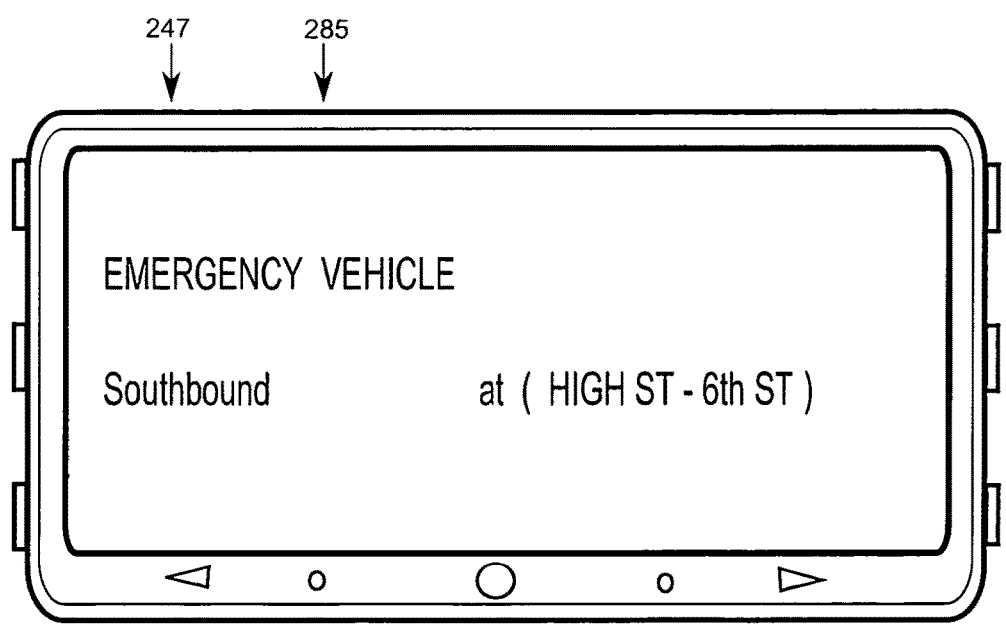
FIG. 40 Illustrates another embodiment of the LCD unit 240 comprises an additional USB port to connect the steering wheel buttons to the LCD unit 240.

In another embodiment of the LCD unit 240 as shown in FIG. 39 and FIG. 40, the preemption buttons 276, 277 and 278 are installed on the steering wheel 286 of the emergency vehicle to provide the driver more accessibility and convenience. The buttons 276, 277, 278 and 279 are connected to the LCD unit 240 via the USB port 285. Wherein the button 277 to turn on/off the preemption system, the button 276 to request right-turning and the button 278 to request left-turning. Additionally, the button 279 to turn on/off the LCD unit 240.

Figure 27:
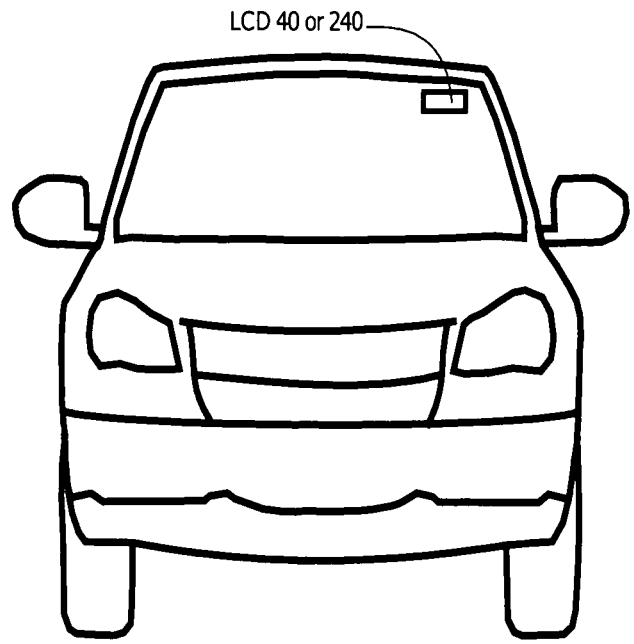
FIG. 27 Illustrates the location and the position of installation the police LCD unit or the vehicle LCD unit inside the car.

The LCD unit 40 as shown in FIG. 2, includes electronic components similar to the LCD unit 240, but its memory 42 stores the in-car traffic light cycle application and the video records for at least ten minutes of the roadway and the GPS readings for at least the last thirty minutes of the vehicle movement. Its LCD display 46 is used to display alert/warning messages transmitted by the police unit P210 and the intersection unit 100. The LCD display 46 is also used to display the in-car traffic related messages and alert messages transmitted by the traffic logging unit 400. The application processor 48 is responsible for interpreting and executing most of the commands from the users interface. The USB port 80 is used to update the digital map application and the in-car traffic light cycle application. The removable memory storage 82 is used for having a copy of video record of at least the last ten minutes of the roadway, wherein five minutes of this record is after the vehicle fully stopped. Also the removable memory storage 82 is used to have a GPS records of at least the last thirty minutes of the vehicle movement. The video and GPS records will be used for the accident report file for legal or financial purposes. The vehicle unit V10 is designed to communicate with the police vehicle unit P210 even if the LCD unit 40 is being removed or disconnected and without affecting the functionality of the control command system. The indicators 60 include a green LED indicator 61, a yellow LED indicator 62, a red LED indicator 63, a green right arrow LED indicator 64, and a green left arrow LED indicator 65. When the vehicle unit V10 receives any alert message from (a police unit P210, a traffic logging unit 400 or an intersection unit 100), the yellow LED indicator 62 will start flashing. Generally, the LED indicators 60 are used to illuminate the synchronized LED's in-car traffic light cycle. Also the LCD unit 40 comprises a number of buttons 70, one button for help assistance 71, by pressing on this button, the vehicle unit V10 transmits a help signal over the long range frequency, another button 72 to turn on/off the in-car traffic light system. Furthermore, another button 73 to turn on/off the in-car traffic (stop signs and the other traffic relevant alert messages), another button 74 to copy the ten minutes of recorded video and the GPS recordings from the memory 42 to the removable memory storage 82, another button 75 is used for requesting help assistance (in case of the owner of the vehicle used his own SIM card data) as illustrated later in the bottom of the detailed description. The LCD unit 40 is connected to the vehicle unit 10 via a USB cable which is connecting the USB port 47 to the USB port 22. The USB port 22 supplies electric power across the cable to the LCD unit 40. The LCD unit 40 and the police LCD unit 240 installed to face the driver by an appropriate manner without blocking the line-of-sight with the road or with the street traffic lights as shown in FIG. 27.

Figure 8:
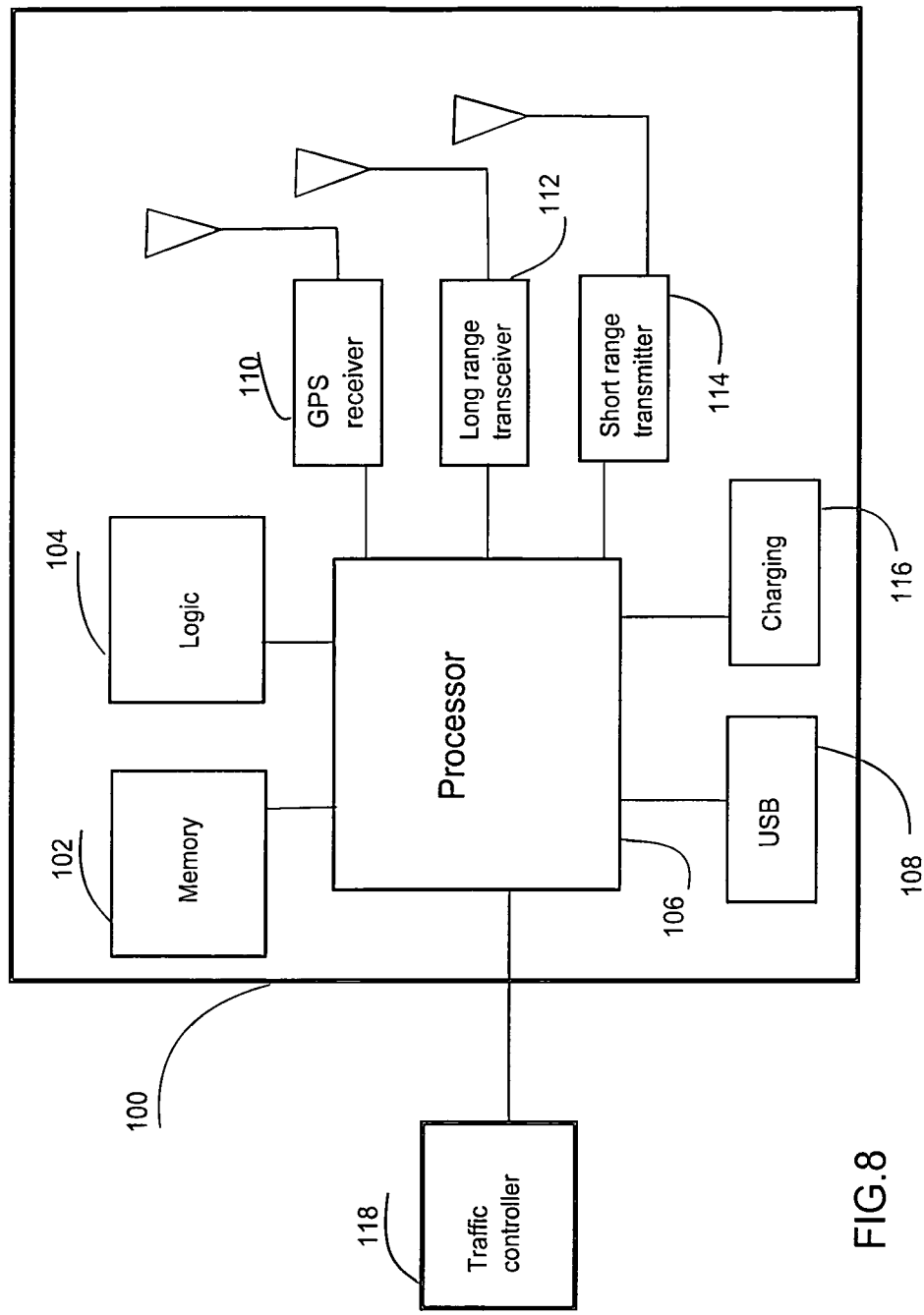
FIG. 8 Is a block diagram of the intersection unit 100.

As shown in FIG. 8, the intersection unit 100 installed at every intersection by an appropriate manner and includes a long range (0.6 to 0.8 mile) transceiver module 112 to receive the preemption request codes from the emergency vehicles and to transmit reply signals back to emergency vehicles close to the intersection. The unit 100 also includes a short range (0.1 mile) transmitter module 114 to transmit alert/warning message to all of the non emergency vehicles in the vicinity of the intersection. Furthermore, the unit 100 includes a GPS receiver 110 to synchronize the unit 100 via Global Positioning System (GPS) timing signals. The unit 100 also includes the memory 102 to store the preemption codes, the fixed time (for a single intersection) traffic light cycles and (activating and deactivating codes). It also stores the intersection coordinates and the unit 100 ID. The USB port 108 is used to update the stored data of the memory 102.

The unit 100 is connected to the intersection controller 118, and is powered by the intersection electric system, the charging component 116 of the circuit board is used to recharge the back up battery in case of power outage at the intersection. The processor 106 along with the other component of the circuit board is in charge of dealing with the unit tasks.

Figure 9:
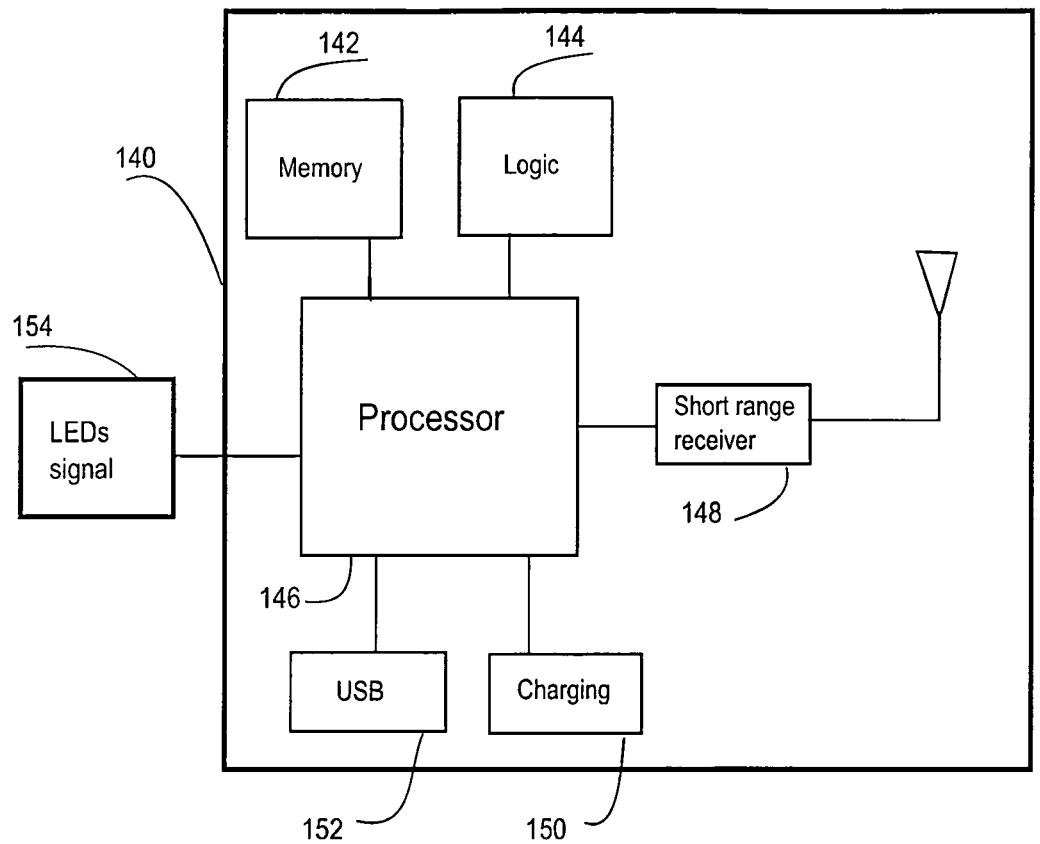
FIG. 9 Is a block diagram of the pedestrians unit 140.
Figure 10:
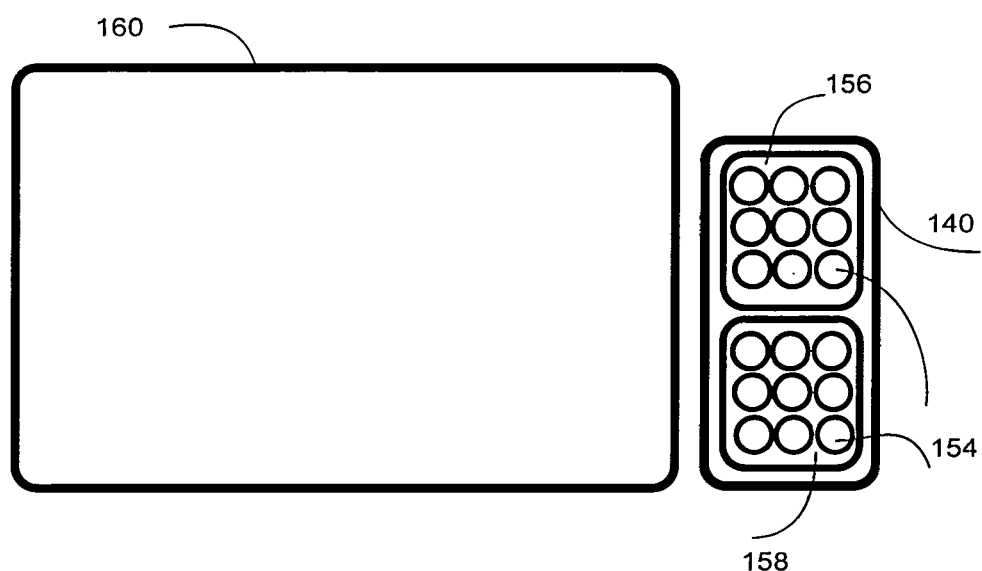
FIG. 10 Illustrates an example of the pedestrians unit 140 (front view).

As shown in FIG. 10 and FIG. 9, the pedestrians unit 140 is attached to the conventional (walk-don't walk) signal box 160, and includes a receiver module 148 to receive a trigger signal from the intersection unit's short range transmitter 114 to start the visual alerting LEDs 154 signal when an emergency vehicle is approaching the intersection, also to start the walk/don't walk signal when the intersection unit using the fixed time traffic light cycles or when there is a power outage at the intersection. The memory 142 stores the fixed time walk/don't walk cycle and the intersection unit 100 ID. The unit 140 is synchronized via Global Positioning System (GPS) timing signals every time it receives a trigger signal transmitted by the intersection unit 100. The LED clusters 156 and 158 are used for visual walk/don't walk signal and also as visual alerting/warning signal. The charging component 150 of the circuit board is responsible for recharging the unit's back up battery. The USB port 152 is used to update the unit 140 data.

Model, Type and Class Category of Vehicles

In general a VIN code of a vehicle, is a unique code including a serial number, used by the automotive industry to identify individual motor vehicles, as defined in ISO 3833.

The vehicle descriptor section of the VIN code is used to identify the vehicle type, the model and the body style. While, vehicle identifier section of the VIN is used to identify the individual vehicle. The vehicle descriptor section of the VIN code will tell in which class category the vehicle belongs, therefore when the police vehicle unit P210 receives a VIN code transmitted by a unit V10, the unit P210 will know instantly the type, model and the class category (body style) of the vehicle. The police vehicle unit P210 is programmed to decode the VIN code to turn it into a vehicle class category and a model/type form to enable the police officer to a quick pick of a target vehicle from a category list displayed on the LCD display 246. For example, if the unit P210 received a VIN code from a "Toyota Avalon", the unit P210 will determine that the vehicle belongs to (FULL-SIZE CATEGORY), and if it receives a VIN code from a "Cadillac Escalade", the unit P210 will determine that the vehicle belongs to (FULL-SIZE SUV CATEGORY), . . . etc. Also the unit P210 is programmed with a directory of a wide-range of model/type pictures of vehicles to enable the police officer to view the rear/front side pictures of a vehicle who transmitted its VIN code. The function and the merits of the vehicle class category list and the model/type picture application will be clear while illustrating the high-speed pursuit system and others.

An Example List of the Vehicle Class Category

SUBCOMPACT: (examples: Ford Fiesta, Chevy Spark, Chevy Sonic, honda fit, Hyundai Accent, Kia Rio, Mazda2, Nissan Versa).

COMPACT: (examples: Subaru Impreza, Nissan Sentra, Toyota Corolla, Scion tC, Lexus IS, Honda Civic, Acura TSX).

MID-SIZE: (examples of midsize vehicles: Honda Accord (coupe)), Acura TL, Hyundai Sonata, Kia Optima, Mazda6, Infiniti G, Toyota Camry).

FULL-SIZE: (examples of full-size vehicles: Toyota Avalon, Lexus LS, BMW 7-Series, Mercedes-Benz (S-Class), Audi A8, Hyundai Genesis).

SPORT CAR: (example of sport vehicles: Dodge Challenger, Ford Mustang, Chevy Camaro, Honda CR-Z, Nissan Z, BMW M-Series, Audi TT).

CONVERTIBLE: (examples of convertible vehicles: BMW 6 Series, Chevrolet Camaro, Mercedes CLK, Volvo C70, Volkswagen Eos).

COMPACT CUV (MINI MPV): (examples: Jeep Compass, Chevy HHR, Honda Element, Acura RDX, Hyundai Tucson, Kia Sportage).

MID-SIZE CUV: (examples: Dodge Journey, Ford Edge, Lincoln MKX, Chevy Equinox, GMC Terrain, Cadillac SRX).

FULL-SIZE CUV: (examples: Dodge Durango, Lincoln MKT, Ford Flex, GMC Acadia, Mercedes-Benz (R-Class), Audi Q7).

OTHERS: (example: Lincoln Town Car limousine).

COMPACT SUV: (examples: Mazda Tribute, Nissan Xterra, Subaru Forester, Jeep Wrangler, Jeep Patriot, Jeep Liberty).

MID-SIZE SUV: (examples: Jeep Grand Cherokee, Ford Explorer, Honda Pilot, Acura MDX, Kia Borrego, Nissan Pathfinder).

FULL-SIZE SUV: (examples: Cadillac Escalade, GMC Yukon, Lincoln Navigator, Ford Expedition, Lexus LX).

MINI VAN: (examples: Chrysler Town and Country, Ford Galaxy, Peugeot 807, Renault Espace, SEAT Alhambra).

FULL-SIZE VAN: (examples: Ford E-Series, Chevy Express).

CARGO VAN: (examples: Ford Transit Connect, Chevrolet Express 1500 Cargo, Ford E350 Van).

BUS: - - -

COMPACT PICKUP TRUCK: (examples: Chevrolet Montana, Fiat Strada, Volkswagen Saveiro, Ford Ranger).

MID-SIZE PICKUP TRUCK: (examples: Dodge Dakota, Chevy Colorado, GMC Canyon, Honda Ridgeline, Toyota Tacoma).

FULL-SIZE PICKUP TRUCK: (examples: Toyota Tundra, Nissan Titan, GMC Sierra, Chevy Avalanche, Chevy Silverado, Dodge Ram).

DUMP TRUCK: - - -

SEMI-TRAILER TRUCK: - - -

FULL-TRAILER TRUCK: - - -

The GPS Digital Map Application and Track Points Database

Digital maps companies generally rely on a few thousand vehicles which are systematically collecting geographic data, including street centerlines, number of lanes, turn restrictions, speed limits, traffic speed. GPS receivers installed in these vehicles collect the coordinates of street centerlines of millions of miles of roads around the world. Therefore comparing the coordinates at any point on the roadway to the data from the digital map will determine the name of the roadway. Additionally each roadway radiating from an intersection is called a "leg". Most intersections have four legs, which is generally accepted as the maximum recommended number for safety and capacity reasons. The three basic intersection types are: "T" intersection (three approach legs), Fourleg intersection, and Multileg intersection (five or more approach legs). In a GPS digital map application, the roadway intersection legs are defined as leg segments, these segments enable the vehicle unit V10 to identify any specific leg or approach of any roadway intersection. The GPS receiver 28 in the vehicle unit V10 enables the unit to determine the coordinates, speed, heading and date/time at real-time status, by matching and comparing the GPS coordinates to the data from the GPS digital map, the unit V10 can determine the exact leg segment. The segment could be a section of a road between two consecutive road-intersections, or it could be an intersection leg of a length lies between (0.1 mile and 0.5 mile) depending on the speed limit of the road. Generally, each leg segment is identified by its road-name and a serial number or identified by a code. Occasionally, some cities may have similar road names, therefore the GPS digital map uses special codes similar to the zip codes to identify different cities. The road names could be coded to eliminate any chance of having a repeated name for different roads.

Laying street centerline GPS track points are important to create the intersection GPS leg-segments. The GPS database of programmed track points creates a virtual trail for each leg-segment. Additionally, the GPS database of programmed track points creates a virtual trail for the major streets and the freeways. The track points could be dropped as close together along the leg-segment or as close together in the vicinity of the street intersection and as far apart away from the intersection. Also as far apart along the freeways.

SQL (Structured Query Language) is a computer language aimed to store, manipulate, and query data stored in relational databases. In a relational database, data is stored in tables. A table is made up of rows and columns. Each row represents one piece of data, and each column can be thought of as representing a component of that piece of data. For example, if we have a table for recording GPS tracking points information, then the columns may include information such as Latitude, Longitude, and Street name or Cycle ID as shown in FIGS. 41, 42 and 46. As a result, when we specify a table, we include the column headers and the type of data for each column. We may also decide to place certain limitations, or constraints, to guarantee that the data stored in the table makes sense.

The GPS latitude and longitude coordinates will be in decimal degrees for database and programming use. A typical consumer-grade GPS units (e.g. Garmin GPS Map 76C) which deliver 1-3 m accuracy. For that grade of GPS, reporting 5 decimal places will preserve a precision of 1.1 m accuracy. An example:
Lat N 41° 5' 3.588"=41.084329766126652°
Lon W 81° 30' 51.4938"=−81.51430423111378°

For reporting 5 decimal places the Lat will be 41.08432 and the Lon will be −81.51430

For the programming purposes and database design, the Lat and the Lon values will be used as:
Lat 41.08432, LatA=410, LatB=8432 and LatC=41084
Lon −81.51430, LonA=815, LonB=1430 and LonC=81514

Realize that the 1st three numbers=LatA or LonA, the 1st five numbers=LatC or LonC and finally the last four numbers=LatB or LonB.

The GPS receiver module 28 of the V10 and the consumer-grade GPS units or the smartphones may automatically record a position each second.

Two consecutive recording positions can determine the direction of moving. Record the first position and obtain its LatB and LonB, then record the next position while moving NE (northeast)) for instance and obtain its LatB and LonB. For example: 1st position Lat 41.07811, Lon −81.51442 and next position Lat 41.07816, Lon −81.51433
1st position: LonB=1442, 2nd position: LonB=1433
Realize that LonB decreases eastbound.
1st position: LatB=7811, 2nd position: LatB=7816
Realize that LatB increases northbound.

FIG. 41 shows SQL table. In that table a city or a region is divided into a number of geographic sections each section is about 8 by 8 miles, and identified by its LatA and LonA.

The table Section_Location comprises three columns, the 1st column for LatA, 2nd column for LonA and the last column for location ID. For example, the position Lat 41.07629, Lon −81.52229 has LatA=410, LatB=7629 and LonA=815, LonB=2229, by applying the SELECT SQL command for Location ID, WHERE LatA=410 AND LonA=815, the result will be 44308.

44308 is the actual zip code for downtown the city of Akron, Ohio where the Lat 41.07629, Lon −81.52229 of this position belongs.

The same way with position Lat 41.45533, Lon −81.73770 has LatA=414, LatB=5533 and LonA=817, LonB=3770, and by applying the SELECT SQL command for Location ID, WHERE LatA=414 AND LonA=817, the result will be (44114). 44114 is the actual zip code for downtown the city of Cleveland, Ohio where the Lat 41.45533, Lon −81.73770 of this position belongs.

FIG. 46 illustrates an SQL table Freeways, it comprises three columns, the 1st column for LatC, 2nd column for LonC and the last column for Freeway ID. For example, the position Lat 41.24129, Lon −81.01079 has LatC=41241, and LonC=81010, by applying the SELECT SQL command for Freeway ID, WHERE LatC=41241 AND LonC=81010, the result will be I 80.

Figure 36:
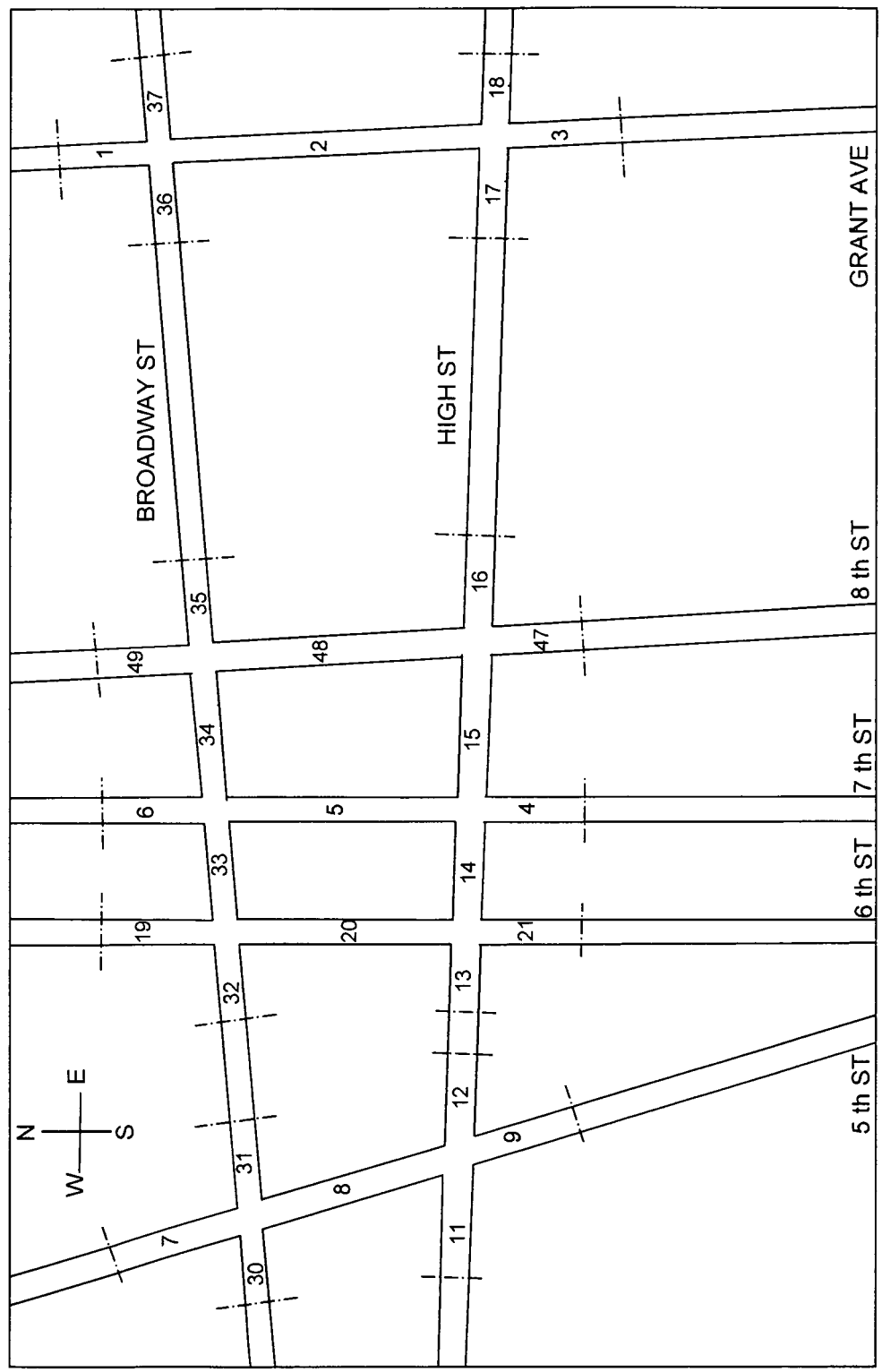
FIG. 36 Illustrates an example of intersection leg segments.

FIG. 36 illustrates an example of the leg segments. HIGH ST and 8th ST intersect and create a fourleg intersection, the four legs "16-HIGH ST", "47-8th ST", "15-HIGH ST", and "48-8th ST" represent four leg segments, the segments "16-HIGH ST" and "15-HIGH ST" are sections of the HIGH ST, the segments "47-8th ST" and "48-8th ST" are sections of the 8th ST. The length of the segment "16-HIGH ST" could be (0.5 to 0.2 mile), the length of the segment "48-8th ST" will be the length between the (HIGH ST-8th ST) intersection and (BROADWAY ST-8th ST) intersection. When a vehicle moves eastbound on BROADWAY ST, the GPS receiver 28 of the vehicle unit V10 will determine the coordinates and the unit V10 will determine each segment the vehicle is approaching by comparing the coordinates to the data in the digital map. When the vehicle reaches the segment (33-BROADWAY ST), the unit V10 will know it is approaching the intersection (BROADWAY ST-7th ST), and if the unit V10 is programmed with the actual traffic light timing signal that is synchronized with the actual traffic light timing signal of the intersection (BROADWAY ST-7th ST), the vehicle can proceed the intersection safely when the green LED indicator 61 is illuminated. Therefore the in-car traffic light cycle application can be created to mimic the actual traffic light signals at roadway intersections.

Figure 37:
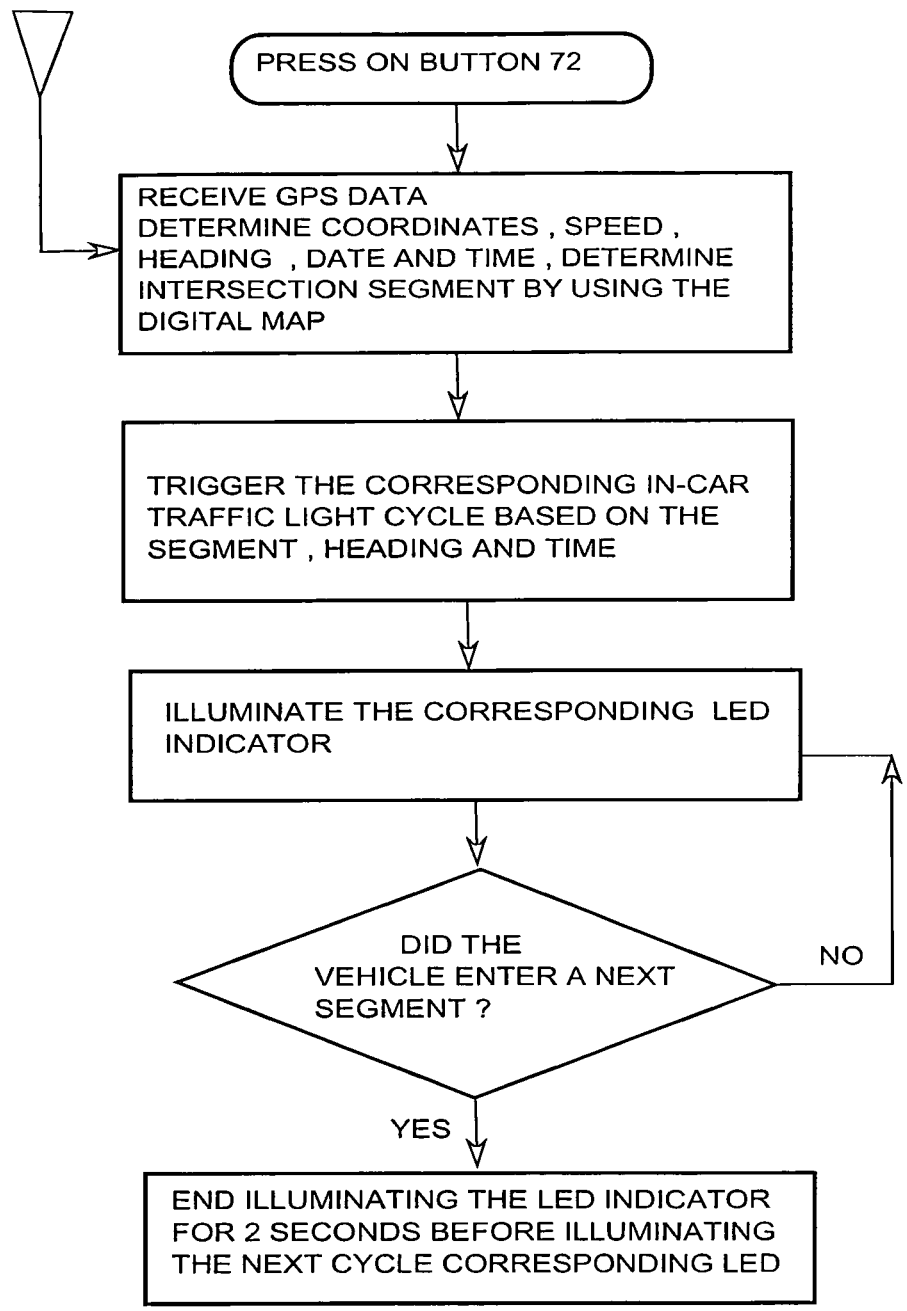
FIG. 37 Illustrates a flow chart example of the in-car traffic light cycle process done by the vehicle unit.

In order to create the in-car traffic light cycles for roadway traffic that may vary during the different hours of the day at an intersection, we divide the day into two or three hour-portions, one portion represents the high traffic hours, the second portion represents the medium traffic hours, and the third portion represents the low traffic hours. For each portion, the time duration for the green, yellow, red, turning and pedestrians, light signals will mimic the average time duration of the actuated timing, and each intersection leg segment will be represented by corresponding timing cycle. By using the intersection types, we create a cycle application, in this application, all possible types of leg segments will be represented by the appropriate timing cycle. FIG. 37 is a flow chart of the in-car traffic light application programmed in the vehicle unit V10.

Figure 5:
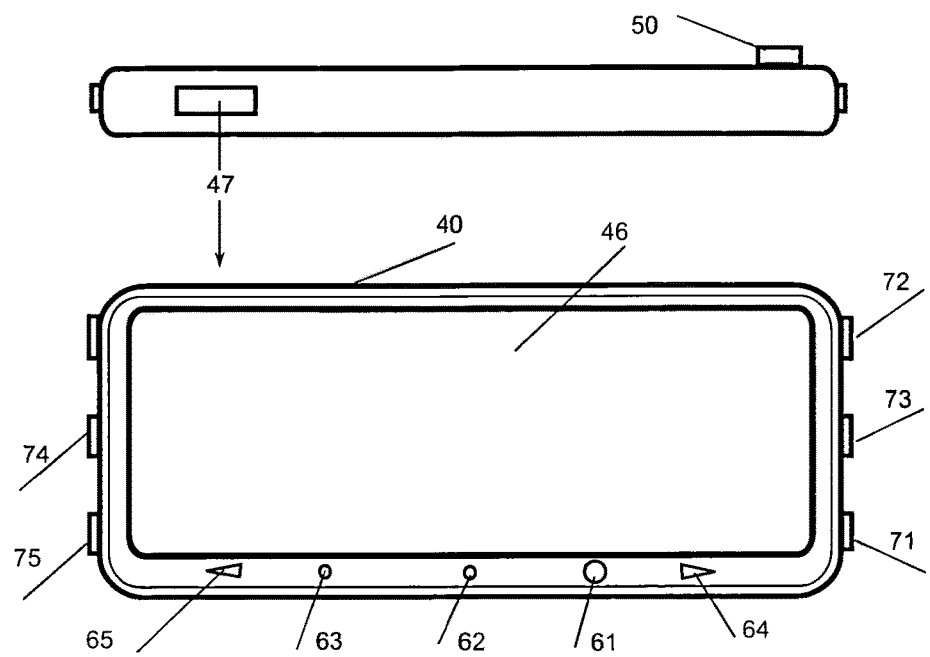
FIG. 5 Illustrates an example of the vehicle LCD unit 40 (front and top view).
Figure 6:
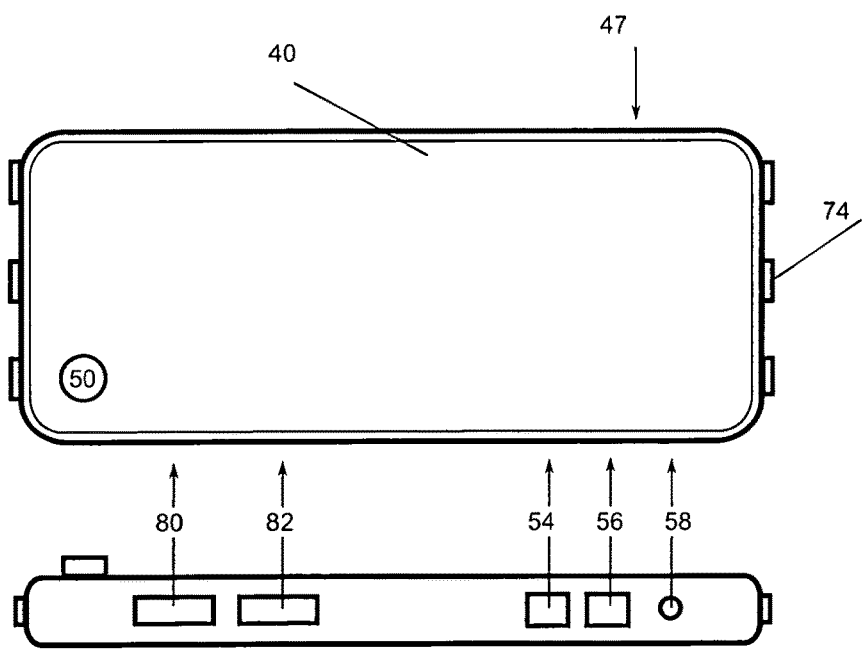
FIG. 6 Illustrates an example of the vehicle LCD unit 40 (rear and bottom view).
Figure 38:
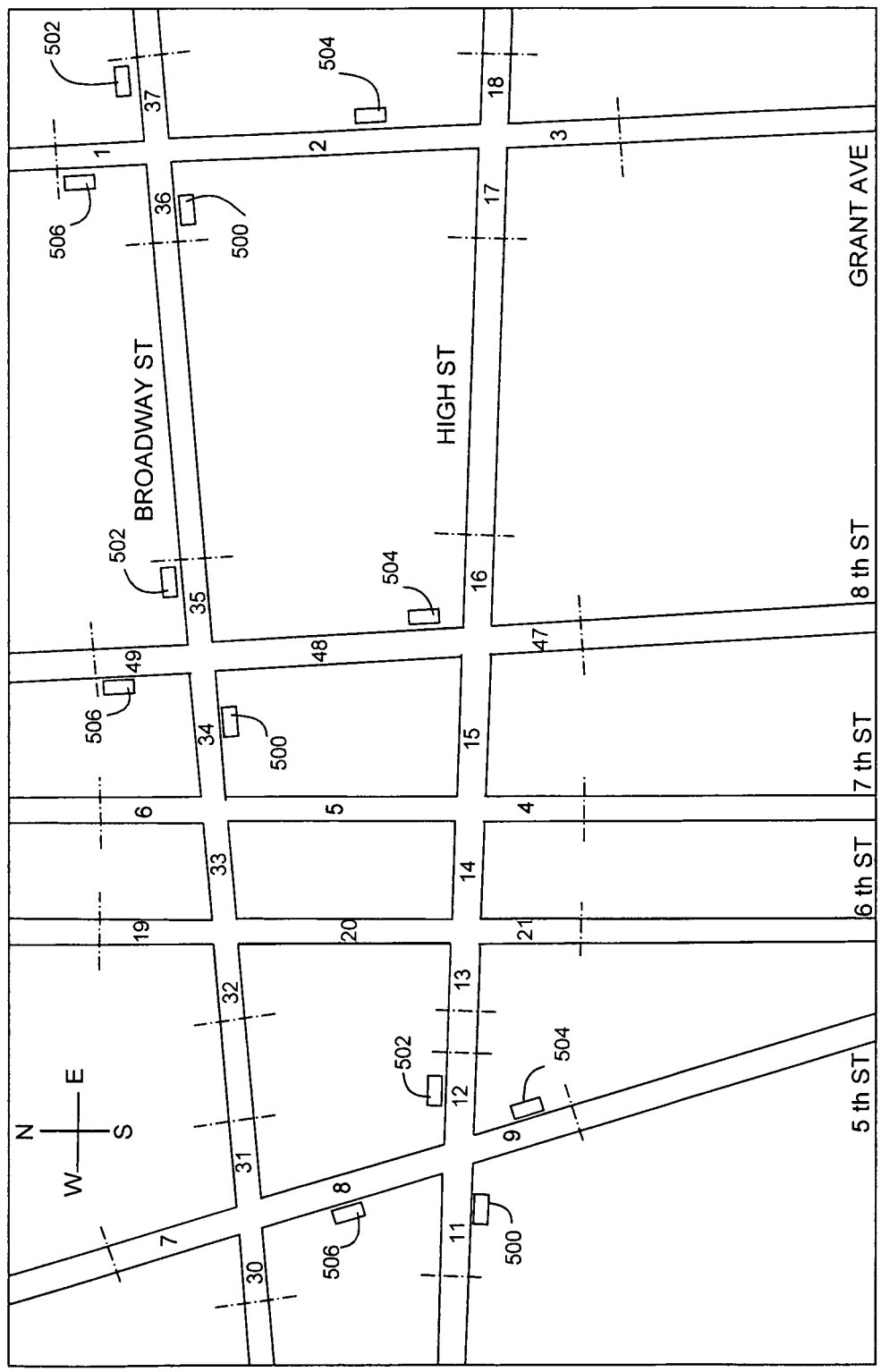
FIG. 38 Illustrates an example of the in-car traffic light cycle process at street intersections.

FIG. 38 illustrates an example of the in-car traffic light cycle. At (BROADWAY ST-GRANT AVE) intersection, (cycle 1 includes 40 seconds of green light timing, 6 seconds of yellow light timing and 50 seconds of red light timing), and (cycle 2 includes 46 seconds of red light timing, 44 seconds of green light timing and 6 seconds of yellow light timing). Both cycles start at the same time at mid-night and continually repeated. The segment (37-BROADWAY ST) westbound assigned (cycle 1), the segment (36-BROADWAY ST) eastbound also assigned (cycle 1). The segment (2-GRANT AVE) northbound assigned (cycle 2) and the segment (1-GRANT AVE) southbound also assigned (cycle 2). At time 04:27:15 PM, an example time at (BROADWAY ST-GRANT AVE) intersection, vehicles 500 (moving eastbound) on segment (36-BROADWAY ST) will have their green LED indicator 61 turned on (as shown in FIG. 5) until they reach the next segment then the green LED indicator 61 will be turned off, also the vehicles 502 (moving westbound) on segment (37-BROADWAY ST) their green LED indicator 61 will be turned on until they reach the next segment then the green LED indicator 61 will be turned off, but the vehicles 504 (moving northbound) on segment (2-GRANT AVE) and the vehicles 506 (moving southbound) on segment (1-GRANT AVE) will have their red LED indicator 63 turned on, until they reach the next segment, but when vehicles 506 reach segment (2-GRANT AVE) southbound, their red LED indicator 63 will be turned off for (two to three seconds) before the start of a new cycle assigned for the segment (2-GRANT AVE) southbound, based on the following simple calculations (the difference between 04:27:15 pm and mid-night=16 hours, 27 minutes and 15 seconds=59239 seconds), the total time of cycle 1=96 seconds, the cycle is repeated 59239/96=617.0279 times, and 617×96=59232, thus 59239−59232=7 seconds, this means that cycle 1 at time 04:27:15 pm has 7 seconds passed from the green light timing and still has 33 seconds of green light timing at (the eastbound and westbound) of the intersection (BROADWAY ST-GRANT AVE). By using same way of calculations, cycle 2 has 7 seconds passed from the red light timing and still has 39 seconds of the red light timing at (the northbound and southbound) of the intersection (BROADWAY ST-GRANT AVE). Another example in FIG. 38, (cycle 7 is cycle 2) but its start time delayed 10 seconds and (cycle 5 is cycle 1) but its start time delayed 10 seconds, at (BROADWAY ST-8th ST) intersection, segment (35-BROADWAY ST) westbound assigned (cycle 7), and segment (34-BROADWAY ST) eastbound also assigned (cycle 7), segment (48-8th ST) northbound assigned (cycle 5) and segment (49-8th ST) southbound also assigned (cycle 5). At time 04:27:15 PM, based on the calculations (cycle 7 is cycle 2 but delayed 10 seconds after mid-night), so 59239−59232−10=−3 seconds, this means that a start of a new repeated (cycle 2) will begin after 3 seconds and the yellow light timing still has 3 seconds for vehicles moving eastbound of segment (34-BROADWAY ST) and westbound of segment (35-BROADWAY ST) at (BROADWAY ST-8th ST) intersection. Also by using same way of calculations a new repeated (cycle 1) will start after 3 seconds and the red light timing still has 3 seconds for vehicles moving northbound of segment (48-8th ST) and southbound of segment (49-8th ST) at (BROADWAY ST-8th ST) intersection, when the vehicles enter the next segment their LED indicator will follow the next assigned cycle of the new segment they just have entered after (two to three seconds of turned off their LED indicator). Generally, right/left turning timing cycles work by the same concept of the previous example to form more cycle models.

Therefore by having a directory of timing cycle models and each leg segment is assigned a respective cycle for each heading, the in-car traffic light system can enable the vehicle to proceed at an intersection safely even if there is no traffic light apparatus at the intersection or there is a lack of traffic signs, or a lack of line-of-sight with the road traffic light, or a non-operational traffic light. In cases of a stop sign or a flashing yellow light signal or flashing red light signal, the cycle of timing includes only one light, so a stop sign or red flashing light will be referred as (cycle R) to represent a full stop at an intersection, while yellow flashing light will be referred as (cycle Y) to represent caution at an intersection. The (cycle R) and the (cycle Y) are very helpful to provide safety at large areas that can't afford to install stop signs or the like in a wide-scale.

Also another example in FIG. 38 to illustrate (cycle R and cycle Y) example. At (HIGH ST-5th ST) intersection, the segment (8-5th ST southbound) assigned (cycle Y), and the segment (9-5th ST northbound) assigned (cycle Y). The segment (12-HIGH ST westbound) assigned (cycle R), and the segment (11-HIGH ST eastbound) assigned (cycle R). At any time of moving at this intersection, the vehicles 500 and the vehicles 502 will have their red LED indicator 63 turned on, while vehicles 504 and vehicles 506 will have their yellow LED indicator 62 turned on.

Generally using the in-car traffic light system will depend on the status of the intersections, (non-operational traffic lights due to blackout or damages caused by hurricanes and severe storms), also the surrounding weather such as heavy fogs, snow storms and sandstorms may cause the vehicles' operators to lose the line-of-sight with the traffic light. Therefore the traffic light cycles at the intersections must include the same light cycles programmed in the unit V10 and the cycles start the same exact time (mid-night). The traffic maintenance crew or the police vehicles may activate/deactivate the intersection unit 100 fixed time cycles by transmitting the activating/deactivating code at any reasonable time. The intersection unit 100 receives the activating code and start the activation at a predetermined time such as 3:00 AM for example. After the weather allows the intersection traffic light to go back to the normal function, the traffic maintenance crew or the police vehicles transmit the deactivating code to the intersection units 100, and end the activation at a predetermined time. While the (cycle R) and the (cycle Y) don't depend on any urgent situation, therefore the vehicles' operators can use them at any time. The LCD unit 40 includes a button 72 to turn on/off the in-car traffic light system and a button 73 to turn on/off the in-car traffic ("cycle R and cycle Y" and the other traffic relevant alert messages).

The in-car traffic light system and the intersection segments (as one element of the digital map) could be programmed in the LCD unit 40 since they have no effect on the purposes of the control commands sent by the police vehicle unit P210.

FIG. 42 illustrates an SQL Table 44308 which comprises 3 columns, the 1st column for LatB, 2nd column for LonB and the last column for Cycle ID, by applying the SELECT command for Cycle ID, WHERE LatB=7629 AND LonB=2229, the result will be 2011100060000. What does this code mean?

Let's break the code into few parts to understand what each part means.

2011100060000: 2-01-11-00-06-00-00, the 1st digit (2) means this segment is considered vertical segment (runs north or south). Generally each segment has two ends, in this case of a vertical segment the northbound cycle will be listed before the southbound cycle. The next 2 digits (01) are the cycle ID for northbound, the next 2 digits (11) are the cycle ID for left turning of the north end, the next 2 digits (00) are the cycle ID for right turning of the north end, 00 means no right turn cycle, the next 2 digits (06) are the cycle ID for southbound, the next 2 digits (00) are the cycle ID for left turning of the south end. 00 means no left turn cycle. Finally, last 2 digits (00) are the cycle ID for right turning of the south end.

Another example in table 44308 for LatB 7659 and LonB 2226, the cycle ID will be 1031300000000. The 1st digit (1)

means this segment is considered horizontal segment (runs east or west). Since each segment has two ends, in this case of a horizontal segment the eastbound cycle will be listed before the westbound cycle. The next 2 digits (03) are the cycle ID for eastbound, the next 2 digits (13) are the cycle ID for left turning of the east end, the next 2 digits (00) are the cycle ID for right turning of the east end, the next 2 digits (00) are the cycle ID for westbound, 00 means no cycle, the next 2 digits (00) are the cycle ID for left turning of the west end. Finally the last 2 digits (00) are the cycle ID for right turning of the west end. 00 means no cycle.

Another example of a one way street segment, the cycle ID code could be 3051719. The 1st digit (3) means this segment is considered a one way segment. The next 2 digits (05) are the cycle ID for approaching end, the next 2 digits (17) are the cycle ID for left turning. Finally the next 2 digits (19) are the cycle ID for right turning.

FIG. 43 illustrates an SQL table Cycle_Phases which comprises 2 columns, the 1st column for the cycle ID and the 2nd column for the traffic light timing phases.

An example of cycle ID 02, the timing phases will be 0150606096.

Let's break up this code to understand what it means, 015-060-6-096. The 1st three digits (015) for delay time in seconds, the next three digits (060) is the time for the green light phase, the next digit (6) is the time for the yellow light phase, and finally the last three digits (096) is the time for the red light phase. Realize that the total time of the cycle is 162 seconds.

Another example of cycle ID 11, the timing phases will be 0000096147. This cycle for turning.

Let's break up this code to understand what it means, 000-009-6-147. The 1st three digits (000) for delay time in seconds, the next three digits (009) is the time for the arrow green light phase, the next digit (6) is the time for the yellow light phase, and finally the last three digits (096) is the time for the red light phase. Also the total time of the cycle is 162 seconds.

Another example of cycle ID 29, this cycle is always red phase. Cycle ID 30 is always yellow phase.

FIG. 44 illustrates an SQL table 44308Ped. This table for pedestrian walking cycles, the 1st column for LatB, the 2nd column for LonB of the intersection coordinates, the last column for the Ped cycle ID (to cross the mentioned street). FIG. 45 illustrates an SQL table Ped Cycle Phases. For each intersection we used two drop points to represent the intersection in order to get a walking cycle for each crossing. For instant, LatB 7654 and LonB 2211 always has this crossing cycle 1D 01 for Exchange ST, and cycle ID 02 for Main ST. Let's break up their cycle codes to understand each part of it, crossing cycle ID 01 has this timing phases code 02020142. The 1st three digits (020) is for the delay time in seconds, the next two digits (20) is the allowed time for pedestrians to cross Exchange ST. Finally the last three digits (142) is the length of time pedestrians not allowed to cross Exchange ST. For cycle ID 02, the timing phases code is 10120142: 101 seconds for delay, 20 seconds for pedestrians to cross Main ST., and 142 seconds to wait. Realize that the pedestrian total cycle time is 162 seconds.

Note: delay time means the delay time in seconds from 12:00 Midnight for example to initiate the start of a traffic light cycle as explained in previous examples.

Another note: In the database example the 1st 3 track points from the intersection are dropped 10 meter apart, then after that the next track points are 25 meter apart, also 100 meter apart in high speed roads. And 350 meter apart in freeways. For the one way streets the track points will be dropped on the far left side of the street in direction of traffic. The main purpose for having big distance between track points is to have the minimum track points just enough to provide a very accurate database. In this case the SELECT SQL command will be used with WHERE and BETWEEN commands to locate coordinates between a 1st position and a 2nd position. The 2nd position can be generated as following:

We can add or subtract a value to a 1st position LatB, LonB or LatC, LonC

For directions E and NW (add to Lat, add to Lon), for directions W and SE (subtract from Lat, subtract from Lon), for directions S and SW (add to Lat, subtract from Lon). Finally for directions N and NE (subtract from Lat, add to Lon). [E, NW (+,+) . . . W, SE (-, -) . . . S, SW (+, -) . . . N, NE (-, +)]

For LatB and LonB only, the added values will be 12 to initiate the 1st search then if there is no result, the next value will be 30, and if no result come the next value will be 120. For LatC and LonC the added value will be 4 for example.

GPS-enabled smartphones or typical consumer-grade GPS units (e.g. Garmin GPS Map 76C) may use the In-car traffic light system as well for vehicles and pedestrians.

The consumer-grade GPS receivers, GPS-enabled smartphones and the vehicle unit V10 can be loaded with the database of track points, the traffic light cycles and maps enough to cover an entire country, state or quite few cities of interest. Also the owners of the GPS receivers or the GPS-enabled smartphones may obtain the GPS database, the traffic light cycles and maps in CD-ROM format and load them onto the receiver or the smartphone or they may use microSD memory cards that are preloaded with database of track points and the traffic light cycles that can easily be added to the GPS receivers or the GPS-enabled phones. Finally, the GPS-enabled smartphones may also download the GPS data, the traffic light cycles and maps from the internet by using the in-car traffic light system app.

A location-based service, or LBS, is any information, entertainment, or social media service that is available on a mobile device, and makes use of geographical position. Position is determined by GPS or other methods. Location-based services are provided via mobile applications (apps), or are built into mobile device hardware and software.

A smartphone is basically a cell phone that has the capability of downloading and running small computer programs. These little computer programs are known affectionately as "apps" or "applications". Generally, data from the Internet will need an Internet connection. This connection can be a data plan paid by the smartphone owner.

Since the table Cycle_Phases of FIG. 43 for the traffic light cycles will not be a large file, therefore it's preferably to be stored in the memory of the smartphone. In this case the smartphone app will upload the latitude/longitude information collected by the application to a web based server and download just the cycle ID that belongs only to the segment and the direction of moving.

Additionally, by storing the pedestrians cycle_phases file of FIG. 45 in the memory of the smartphone. The smartphone app will upload the latitude/longitude information collected by the pedestrian application to the web server and download just the walking (crossing) cycle ID coupled with the street name for the desired street intersection as illustrated in FIG. 44.

Generally, the in-car traffic light system app will upload the latitude/longitude information collected by the application to the web server and download the GPS track points and the traffic light cycles data or the data of the animated traffic light markers on the Roadmap from the internet. For example, Google Maps JavaScript API provides a programming tool suitable to create animated traffic light graphics that can be displayed on a Roadmap as Markers at street intersections. Roadmap is a map type displays a normal street map.

Overlays are objects on the map that are tied to latitude/longitude coordinates, so they move when you drag or zoom the map. Markers are a type of overlay. Markers can display custom images. In this case the images will be a set of graphics at each header of the leg-segment. You can animate markers so that they exhibit dynamic movement in a variety of different circumstances.

Figure 47:
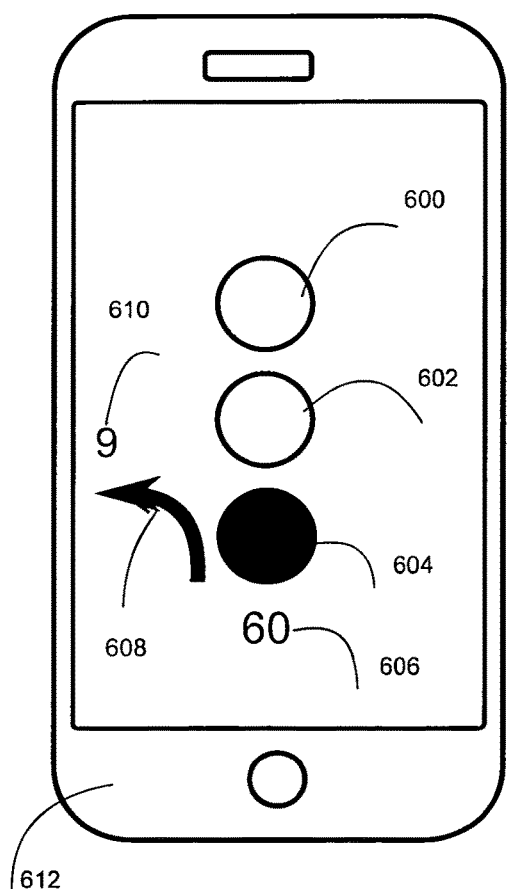
FIG. 47 Illustrates one form of displaying the traffic light phases on a smartphone screen by using the in-car traffic light system app.

The in-car traffic light system app for smartphones can display the traffic light phases in two different forms. The first form as shown in FIG. 47, the conventional shapes of light rounds, green light 604, yellow light 602, red light 600, and turning arrows 608 displayed on the screen of the smartphone 612. The green light 604 is on, also the left turn green arrow 608 is on. Along with a timer 606 to show the countdown in seconds for the green round and also a timer 610 for the green arrow.

Figure 49:
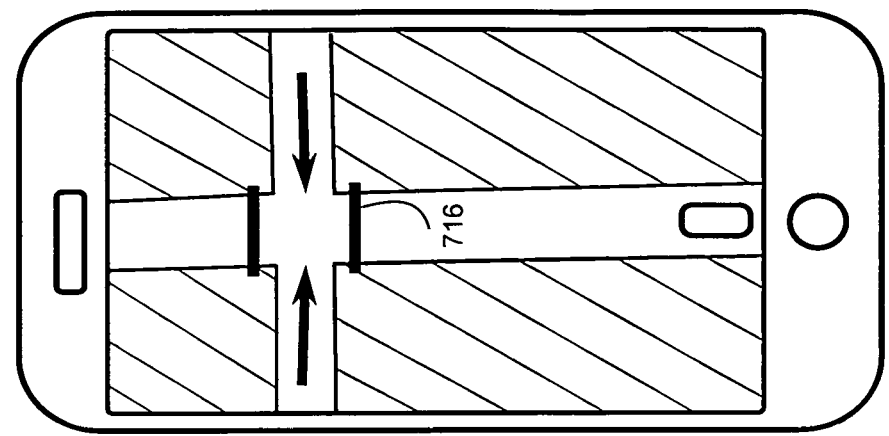
FIGS. 49 A, B and C, Illustrate the other form of displaying the traffic light phases on a Roadmap on a smartphone screen by using the in-car traffic light system app.
Figure 49:
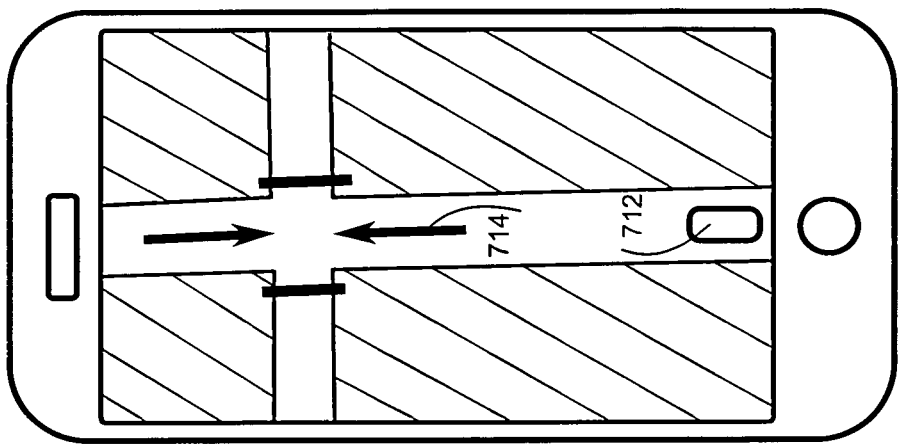
Figure 49:
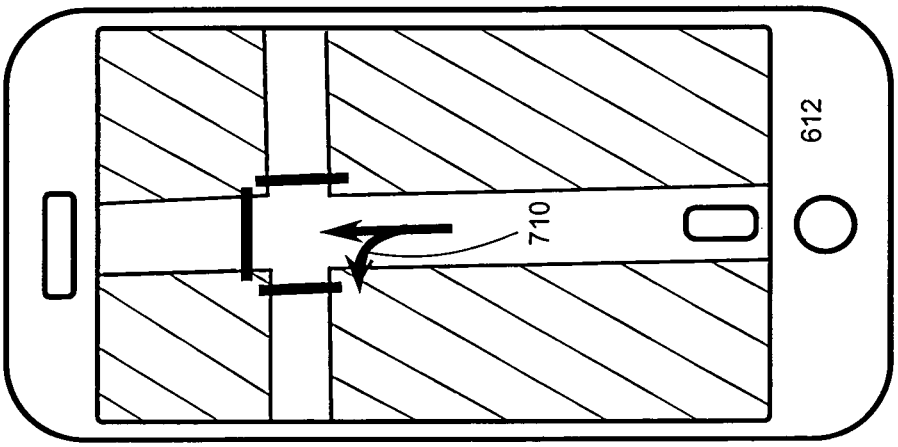

FIGS. 49 A, B, and C, illustrate the second form of displaying the traffic light phases as animated Markers (to appear and disappear) on a Roadmap for the vehicle 712. The Red Marker bar 716 to represent red traffic light, the Green straight arrow Marker 714 to represent green traffic light, and the Green left arrow Marker 710 to represent the green left turning traffic light arrow.

Figure 48:
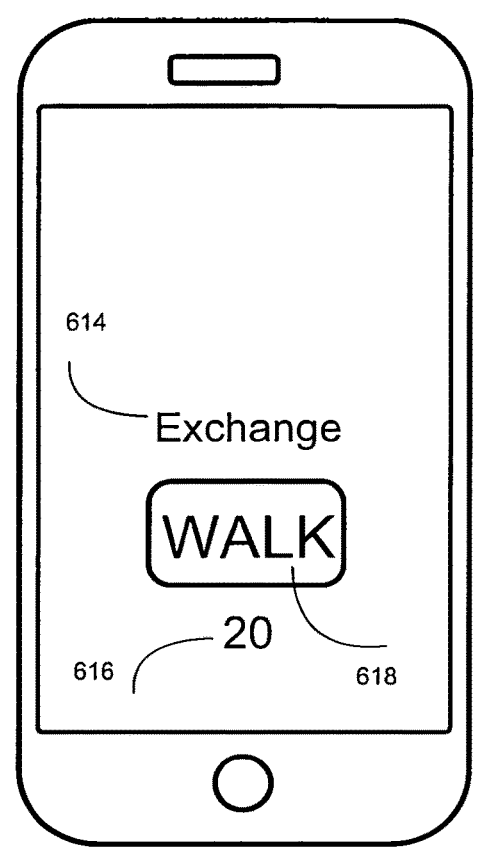
FIG. 48 Illustrates the pedestrian walking cycle while crossing Exchange ST on a smartphone screen by using the in-car traffic light system pedestrian app.

FIG. 48 illustrates how the pedestrian in-car traffic light system app displays the walk (crossing) 618 cycle for Exchange ST 614 along with the countdown timer 616.

The police vehicle unit P210 communicates with the vehicle unit V10 via a set of control commands to force the unit V10 to execute a selected function or application. These control commands are listed and illustrated based on their purposes as following:

LOG command is used to log the VIN codes of the target vehicles into the police unit P210, the police unit P210 transmits the LOG command combined with any of the following data "the target road name, the target direction, the vehicle position code, the police vehicle GPS coordinates, a reference speed, the target vehicle model, vehicle class category and the coordinates of a crime scene". The police unit P210 uses the short range (0.1 mile) or the long range (1 to 2 mile) frequency to transmit this command. If the unit P210 transmitted the log command without road name or direction or position, then it will log vehicles in all directions by using the short range signal.

When the vehicle unit V10 receives the police unit's GPS coordinates (the origin coordinates), it will calculate the distance between its coordinates and the origin coordinates, and after few seconds (2 to 3 seconds), it will calculate the new distance between its new coordinates and the origin coordinates. If the new distance is smaller than the first distance, then the vehicle is approaching the police vehicle. Thus, the position code will be "approach" to represent approaching, and if the new distance is greater than the first distance, then the vehicle is departing the police vehicle, and the position code will be "depart" to represent departing.

SPOT LOG command is used to log the VIN codes of vehicles near to make a complete stop into the spot logging unit 300, the spot logging unit 300 will transmit the SPOT LOG command via the short range (0.1 mile) frequency after it receives a log request from a vehicle.

TRAFFIC LOG command is used to log the VIN codes of vehicles into the traffic logging unit 400, the traffic logging unit 400 will transmit the TRAFFIC LOG command via the short range (0.1 mile) frequency.

RADAR command is used to log the VIN codes and a (speed report) of vehicles that speed above a (reference speed), the police unit P210 will transmit this command combined with the reference speed, road name, target direction, vehicle position code (approach) and police vehicle GPS coordinates (the origin coordinates) via the long range (1 to 2 mile) frequency. The reference speed is a selected comparing-speed to report all vehicles that speed above it.

The speed report will include the number of times and the length of time in which the vehicle was speeding above a (reference speed) in the last 30 minutes of vehicle's movement. The GPS receiver 28 of the vehicle unit V10 determines, coordinates, speed, heading and date and time at real-time status. The vehicle unit V10 will keep a record of these data for the last (30 minutes) to be used for the speed report.

CLONE command is used to allow the vehicle unit V10 to periodically re-transmit any specific command "target command" transmitted by the police unit P210 via the long range frequency. Generally, the target command could be (VIN report command) or (RFID tag report command). The clone command is used to widely increase the number of vehicles that will do the scan search of a particular vehicle or a particular RFID tag, cloning is a process to multiply the number of vehicles that mimic police vehicles in performing a search process.

CONNECT command is used to connect the target vehicle to the cellular network, the police unit P210 will transmit this command combined with the cell-phone codes (SIM card codes) and a local dispatch center phone number. The target vehicle will periodically send its location data. Also the police officer or the local dispatch center can call the target vehicle or send control commands to it. The local dispatch center will continue track down the movement of the target vehicle and communicate with the police vehicles in the vicinity of the target vehicle.

The cellphone codes will be transmitted from the police unit P210 to the vehicle unit V10 to give it a temporary ability to connect to the cellular network. Each one of the police vehicles will be assigned a number of sets of "Cell-phone Codes" to enable the police vehicle unit P210 to lend the vehicle unit V10 the necessary codes that are required for cellular communication. In this scenario the SIM card operating system that required to connect the vehicle unit V10 to the cellular network must be manipulated and redesigned to allow the SIM card codes to be inputted remotely by the P210 unit.

While there is another scenario to connect the V10 unit to the cellular network without redesigning the SIM card operating system.

Assume that you have a number of cellphones and all of them have an exact copy of a SIM card that has the same exact codes, (as what is called cloning the SIM card). Therefore in order to connect one of these cellphones to the network you must power off the rest of the cellphones. In this case the V10 unit will have a permanent cloned SIM card, (or few cloned SIM cards). And when the police unit P210 transmit the CONNECT command to the V10 unit, the V10 unit will respond by sending the phone number associated with its SIM card back to the unit P210. Also the CONNECT command will tell the V10 unit to POWER UP the parts responsible for the network connection, (similar to powering up your cellphone). In this case the target vehicle will be the only vehicle been asked to connect. But in reality there is a big chance that more than one vehicle could be asked to connect to the network at the same time, therefore a third party could operate few thousands of lines and each one of these lines is cloned thousands of times and few cloned lines randomly programmed in the V10 unit to minimize the chance of having many V10 units to connect at the same time.

VIN report command is used to allow the target vehicle to connect to the cellular network and send (location report), which is used for vehicle search process. The police unit P210 will transmit the VIN report command combined with the cell-phone codes and the local dispatch center's phone number. The location report contains the VIN code of the vehicle and real-time location of it.

RFID tag command is used to allow the vehicles' units to send a report about a particular tag number "target tag". The police unit P210 will transmit the RFID tag command combined with the cell-phone codes, the local dispatch center's phone number, the target tag number and a time window.

FLASH command is used to flash the head and/or tail flashers of the target vehicle. The unit P210 will transmit this command over the short range or the long range frequency to the unit V10.

ALERT command is used to send an alert and warning text messages to the target vehicles and flashing the yellow LED indicator 62 of them. The unit P210 will transmit this command over the short or long range frequency to the unit V10.

STOP command is used to slow down the target vehicle then stop it by disturbing the fuel system or the electric system of the target vehicle. The unit P210 will transmit this command over the short range or the long range frequency to the unit V10. Also the unit P210 can send this command after connecting the target vehicle to the cellular network.

RELEASE command is used to release the target vehicle unit V10 from the control commands of the unit P210 or the dispatch center, the command will tell the unit V10 to delete the cellphone codes and disconnect with the cellular network.

The police vehicle unit P210 and E210 also communicate with the intersection unit 100 via the preemption codes and ACTIVATING/DEACTIVATING command.

ACTIVATING/DEACTIVATING command is used to allow the intersection unit 100 to use the fixed time traffic light cycles at predetermined time, the unit P210 or the maintenance crew will transmit this command over long range frequency to the unit 100.

Roadside Assistance

A roadside assistance system provides the vehicle unit V10 an alternative method for the drivers to get roadside assistance in case of no cellular service in an area they may be stuck in. The driver can press on "help request" button 71, or by using voice recognition application programmed in the LCD unit 40, the vehicle unit V10 will periodically transmit "help request" signal over the long range frequency, and when any police vehicle travels by the area of the signal, the "help request" alert will appear on its LCD display 246 along with the VIN code and location of the vehicle that sent the help request.

Figure 26:
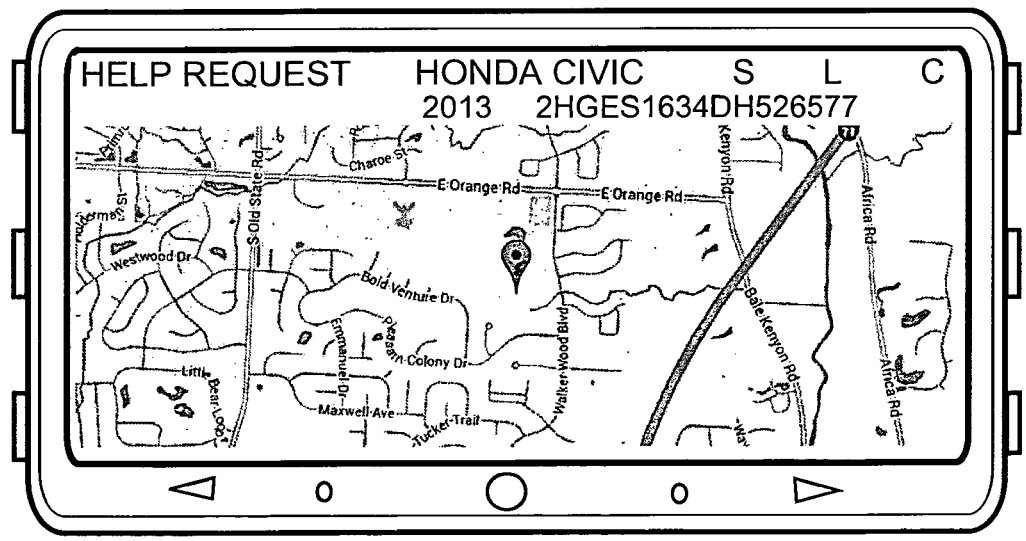
FIG. 26 Illustrates an example of a help request transmitted by a vehicle.

FIG. 26 is an example of the help request displayed on the LCD display 246 of the police unit P210. A HONDA CIVIC model requested a roadside assistance in an area near COLUMBUS, OHIO where the driver of the vehicle lost his cellphone signal, when the driver pressed on the button 71 of his vehicle LCD unit 40, the unit V10 periodically transmitted the VIN code of his HONDA CIVIC combined with its location coordinates over the long range signal. When a police vehicle roamed around that area the unit P210 received the help signal and its yellow LED indicator 262 started flashing, the name and location of the vehicle appeared on the police LCD display 246, the police used his digital map and knew exactly the location of the HONDA CIVIC and provided the needed assistance.

Roadway Safety Alert

A traffic collision or traffic accident occurs when a vehicle collides with another vehicle, utility poles, concrete barricades on the freeway, or pedestrians. Traffic accidents may cause severe injuries, death, and property damage. The impact of the collisions may lead to psychological trauma, long lasting injury issues, or significant financial debts. Most of the accidents take place due to a number of factors, which varies, from human errors (i.e. speeding, driving skill level or impairment.) to weather condition factors which may affect the roads by making them slippery due to snow fall or heavy rain.

The roadway safety alert system provides a method to alert and warn the drivers of the upcoming accidents approach to guide them to pass safely thru an accident scene to avoid more collisions at the original accident site. When the police is notified about an accident on a freeway, the police vehicle unit P210 can periodically transmit an "accident" alert message combined with instructions of how to safely approach the site of the accident by telling the drivers which lanes are safe to use and what speed is suitable.

Figure 18:
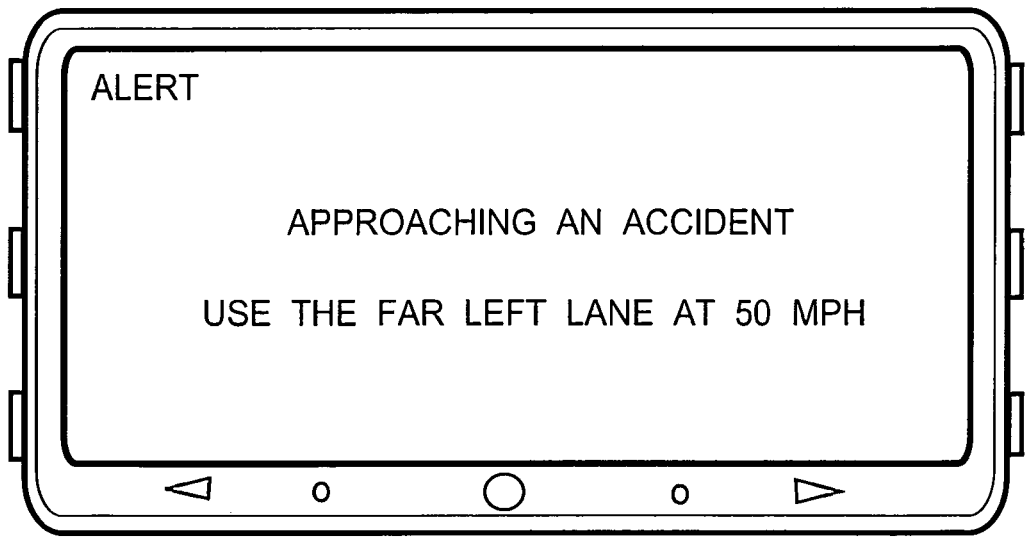
FIG. 18 Illustrates an example of a roadway safety alert message displayed on the vehicle LCD unit.

FIG. 18. is an example of the roadway safety alert system, in a snowy winter day an accident took place on interstate 71 south near COLUMBUS, OHIO, the highway patrol rushed to the accident scene and sent this alert message to the approaching vehicles (approaching an accident—use the far left lane—at 50 mph), the unit P210 transmitted this message over the long range signal combined with road name: I 71, heading: SOUTH, position: APPROACH, coordinates: 40.24549, −82.92867. All the approaching vehicles in the range of the transmitted signal will receive the message and their yellow LED indicator 62 will start flashing. If the highway patrol wants to alert the approaching vehicles far away from the accident scene, he can use a portable P210 unit and install it at an appropriate distance from the accident scene.

The Accident Report

In all cities worldwide, individuals involved in motor vehicle accidents can be held financially liable for the consequences of an accident, including property damage, injuries to passengers and drivers, and fatalities. Because these costs can easily exceed the annual income of the average driver, most countries require drivers to carry liability insurance to cover these potential costs. However, in the event of severe injuries or fatalities, victims may seek damages in civil court, often for well in excess of the value of insurance.

Additionally, drivers who are involved in a collision frequently receive one or more traffic citations, usually directly addressing any material violations such as speeding, failure to obey a traffic control device, or driving under the influence of drugs or alcohol. In the event of a fatality, a charge of vehicular homicide is occasionally prosecuted, especially in cases involving alcohol. Therefore, the accident report system provides a method to create (an accident report) to be used in accident cases. The vehicle unit's GPS receiver 28 determines the coordinates, speed, heading and date/time at real-time status, these data will be continually recorded for at least the last 30 minutes of the vehicle movement. The last 5 minutes of the of the GPS recordings along with at least 10 minutes of recorded video of the roadway, wherein, 5 minutes of the recorded video is after the vehicle speed becomes zero. When the vehicle comes to a complete stop just after an accident, its speed will come to zero, then the microprocessor 16 of vehicle unit V10 will tell the memory 42 to save the last 5 minutes of the video recording while the vehicle was moving and to continue recording and saving the video for another 5 minutes after its speed becomes zero. The law enforcement officer can download the accident report file by connecting his portable computer to the LCD unit 40 via the USB port 80. Also a copy of the accident report file can be saved to the removable memory storage 81 by pressing on the button 74 of the LCD unit 40.

The High-Speed Pursuit System

High-speed police pursuit is a very dangerous task for law enforcement and the public when a suspect uses a vehicle to escape from law enforcement attempting to stop or arrest him, the high-speed chase is considered as a road-safety problem, specially when innocent drivers not involved in the pursuit may be struck by the elusive suspect in his attempt to escape, or by the police vehicles during the chase. A number of techniques used by police to end the chases, from pleading with the suspect, disabling the suspect's vehicle by shooting out tires, or the use of spike stripes, or boxing in the suspect's vehicle with police cruisers. All of the forceful methods may impose risk and harm to all involved as well as innocent bystanders.

Figure 21:
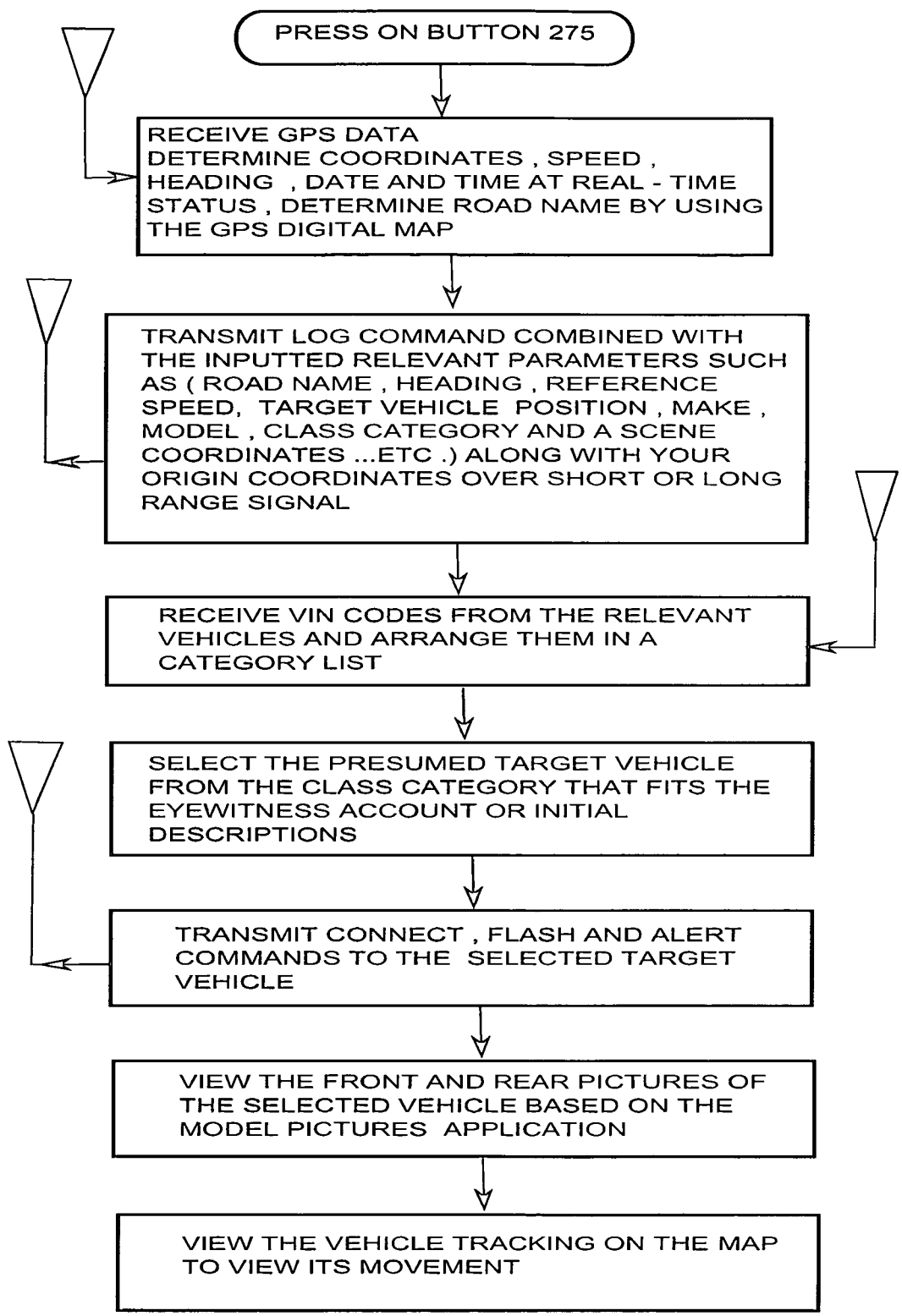
FIG. 21 Illustrates an example flow chart of a high-speed chase process.

As shown in FIG. 21, the present high-speed pursuit system enables the law enforcement to safely chase and control a target vehicle. When the police is informed about a suspect vehicle fleeing a scene of a crime or refused to obey a police stop request or when the police assumes that a target vehicle moving on a certain road, the police vehicle unit P240 transmits a log command. The police unit P210 will transmit this command combined with a reference speed, road name, target direction, vehicle position code and police vehicle GPS coordinates via the long range frequency. And by using the vehicle model, type and class application, all of the speeding vehicles will appear in a list of vehicle category on the LCD display 246 of the police unit P210, the police can select the vehicle category that fits the initial descriptions of the target vehicle from the list of the speeding vehicles. Then after selecting the right category, he can pinpoint the exact target vehicle, and by the help of the programmed pictures he can confirm his work. After that the police transmits a connect command. Connect command is used to connect the target vehicle to the cellular network, the police unit P210 will transmit this command combined with the cell-phone codes and a local dispatch center phone number. The target vehicle will periodically send its location data.

Also the police officer or the local dispatch center can call the target vehicle or send control commands to it. The local dispatch center will continue tracking down the movement of the target vehicle and communicate with the police vehicles in the vicinity of the target vehicle. Therefore, the police can alert and warn or talk with the suspect or to stop his vehicle safely.

However, if the target vehicle is blending with non speeding vehicles, in this case the police will approach closely the vicinity of the target vehicle and sends a log command. The police unit P210 transmits the log command combined with the target vehicle make or model or body class type. The police unit P210 uses the short range frequency to transmit this command. If the unit P210 transmitted the log command without road name or direction or position, it will log vehicles in all directions. Also the logged vehicles will appear in a category list, and by selecting the right category, the police can pinpoint the exact target vehicle from the list, and send a connect command to it, and communicating with it. All of these commands can be inputted via the voice recognition application to enhance the safety of the law enforcement personnel while chasing the suspect.

Figure 7:
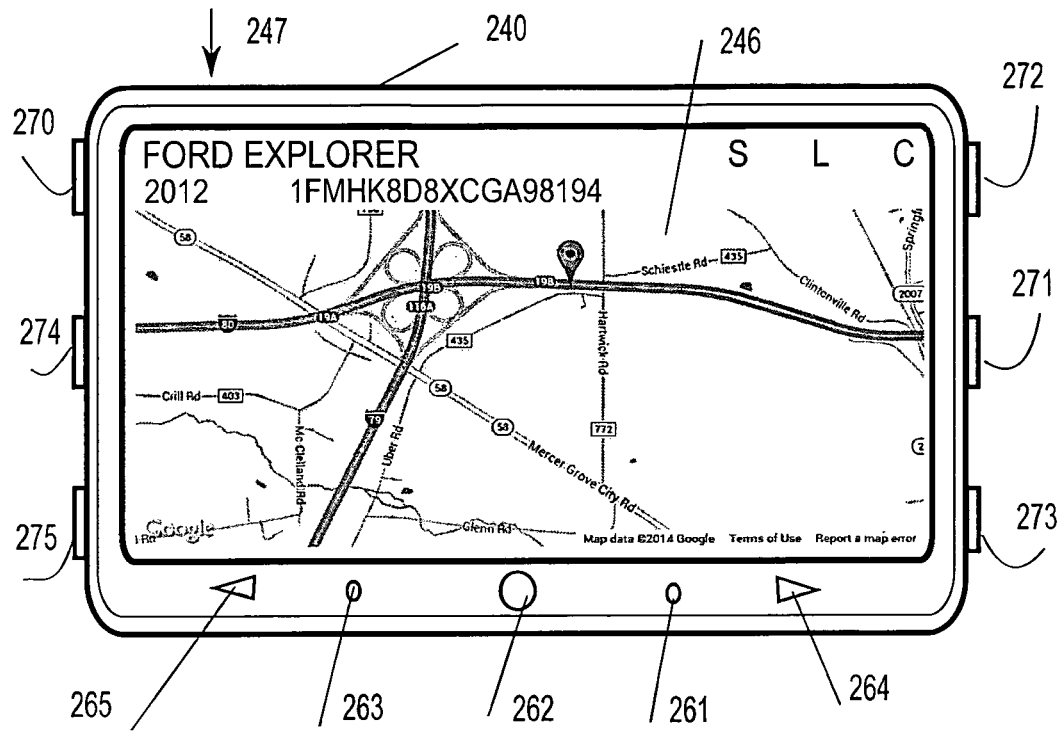
FIG. 7 Illustrates an example of the police vehicle LCD unit 240 (front view).
Figure 15:
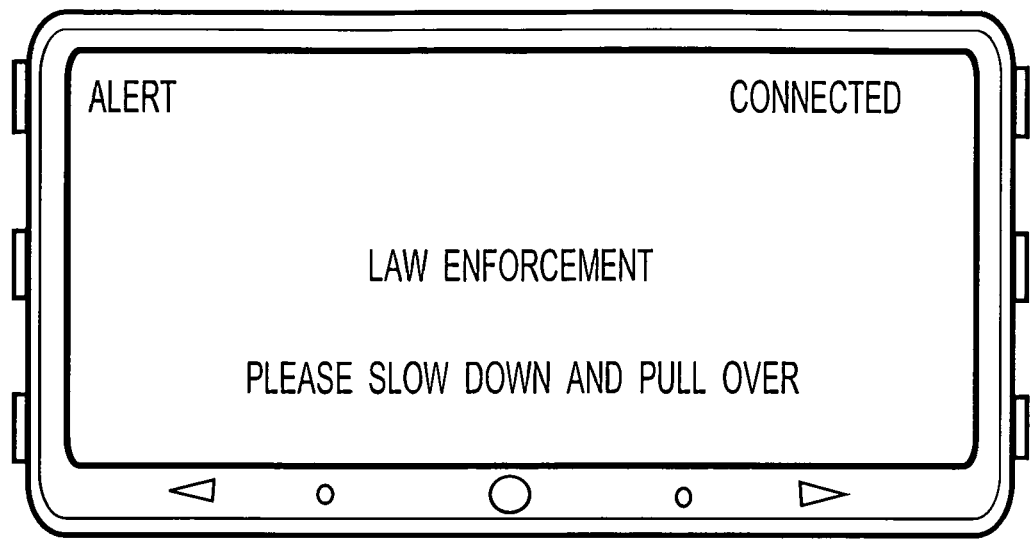
FIG. 15 Illustrates an example of a stop alert or a high-speed chase alert message displayed on the vehicle LCD unit.
Figure 22:
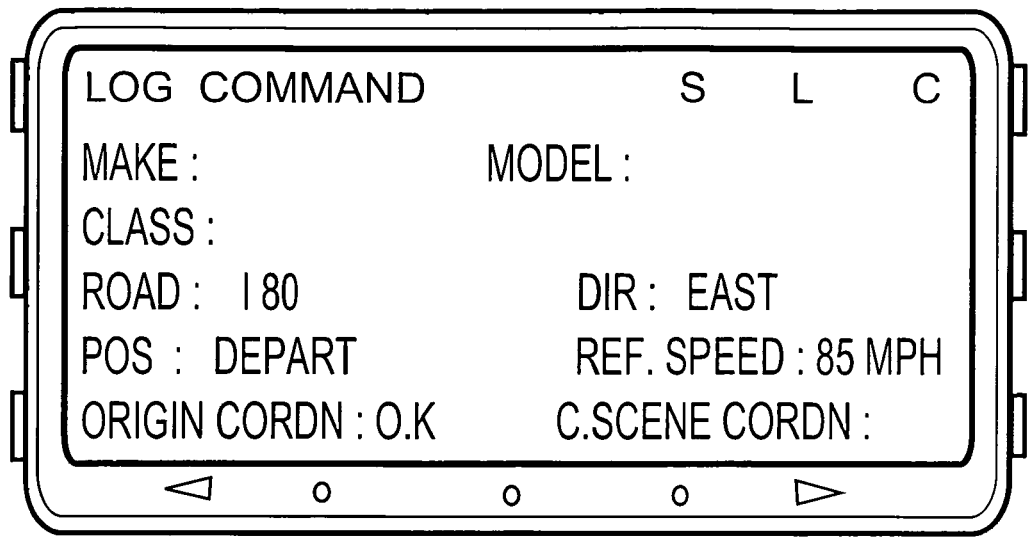
FIG. 22 Illustrates an example of a high-speed chase process, it shows the inputted parameters by the police to apply a log command.
Figure 23:
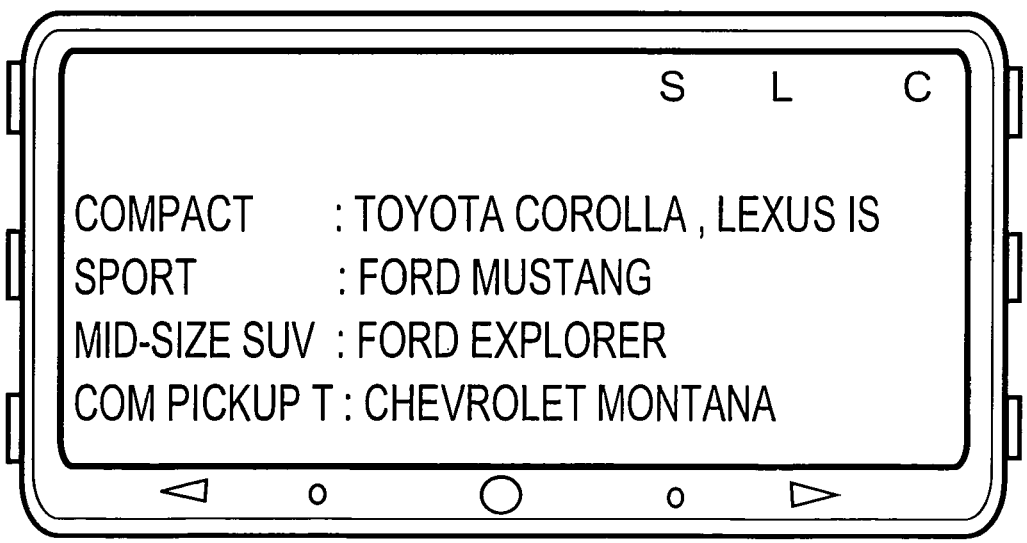
FIG. 23 Illustrates a class category list of the responding vehicles.
Figure 24:
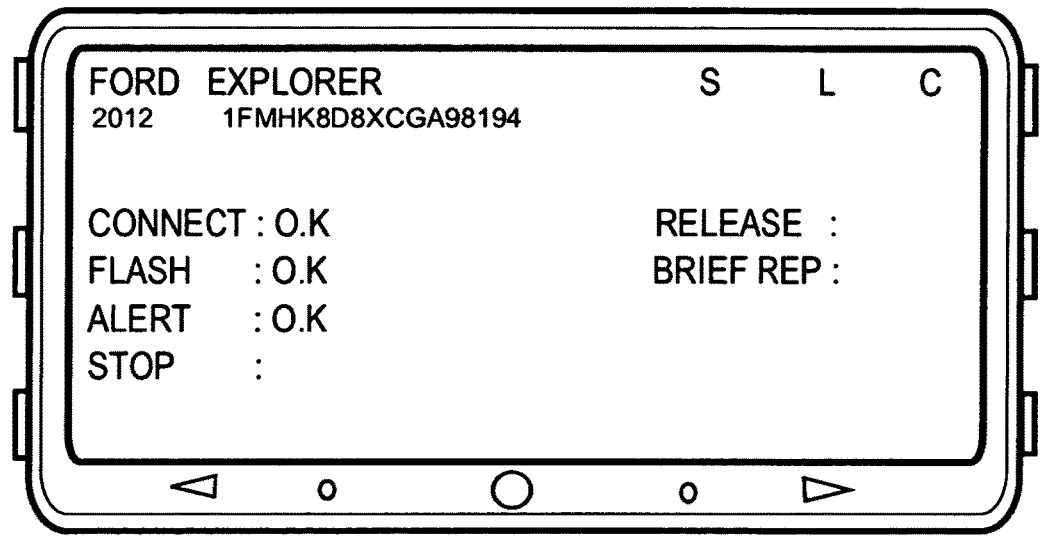
FIG. 24 Illustrates inputting (connect, flash and alert) commands to transmit them to the target vehicle.
Figure 25:
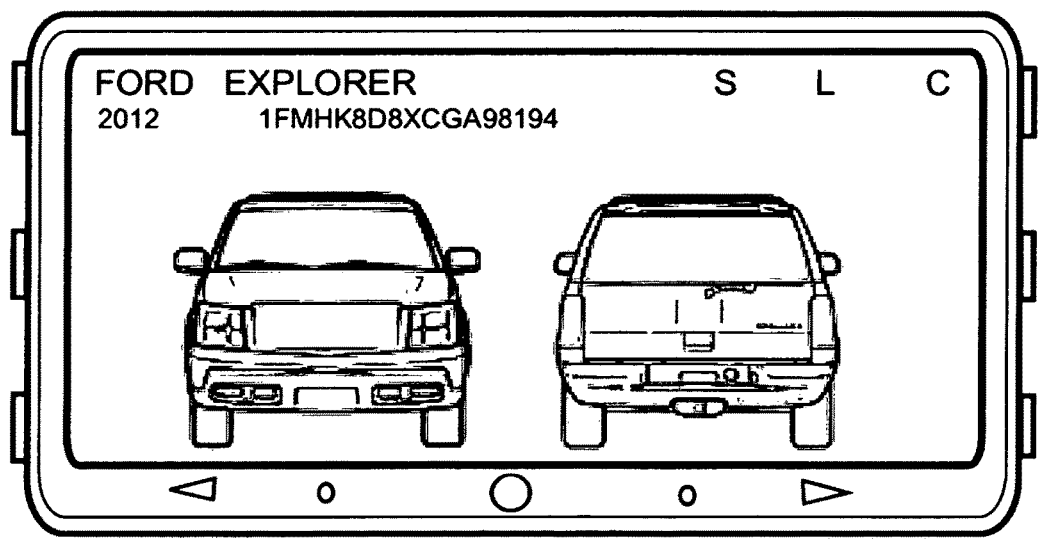
FIG. 25 Illustrates the rear and front pictures of the target vehicle based on its model.

FIGS. 22, 23, 24, 25 and 7 illustrate an example of a high speed pursuit. The highway patrol has been notified about a vehicle being involved in a hit and run accident with initial description as (white color mid-size SUV fairly new), and an eyewitness said the vehicle raced toward the interstate 80 east. The highway patrol rushes behind the target vehicle vicinity and turns on his P210 unit and transmits a log command combined with (road: I 80, heading: EAST, position: DEPART, speed reference: 85 mph, origin coordinates: 41.19522 −80.17865) over the long range signal as shown in FIG. 22. All vehicles travelling on I 80 east and departing from the origin coordinates of the P210 unit and speed over 85 mph will transmit their VIN code over the long range signal. The highway patrol unit P210 will display all the speeding vehicles in a category list as FIG. 23. (Generally vehicles presumably reduce their speed when they see the the highway patrol warning flashing lights or when they hear the warning siren). The highway patrol will pick the mid-size SUV category and will find Ford Explorer XLT 2012 model fits the eyewitness descriptions. The Ford Explorer transmitted this VIN code 1FMHK8D8XCGA98194, the P210 unit decoded the first part of the VIN (1FMHK8D8XCG) as 2012 Ford Explorer XLT, body style SUV, body type Truck, and decoded the second part (A98194) as Production Sequence Number which is used to identify only this vehicle. The highway patrol selects Ford Explorer and sends connect, flash and alert commands to it as shown in FIG. 24. The unit P210 sends the V10 unit inside the Ford Explorer all the needed codes to connect to the cellular network to show up on a local dispatch center digital map to track its movement as shown in FIG. 7. Even if the Ford Explorer escaped the range of the P210 signal, the local dispatch center and the P210 units can still send control commands to it via the network. The alert command will tell the driver to slow down his Ford Explorer and to follow the highway patrol instructions as shown in FIG. 15, the flash command will make the tail lights of the Ford Explorer flashing to be visually clear to the highway patrol to deal with the vehicle. Also the highway patrol can view pictures of the same Ford Explorer model to assist him spotting the vehicle as it shown in FIG. 25. If the target mid-size SUV wasn't speeding over the reference speed and was blending with the traffic, in this case it will not show up in any category list based on its speed, the highway patrol will send a log command combined with the coordinates of the accident scene to log any mid-size SUV comes in his way via the long range signal and the V10 unit inside each mid-size SUV will compare the accident scene coordinates to any coordinates stored in its memory 20 from the last thirty minutes of its movement. The target SUV will transmit its VIN code since it was in close proximity with the accident scene coordinates, the P210 unit will show it as Ford Explorer 2012. In another scenario if the highway patrol knows the target vehicle model from the eyewitness account, basically he can send a log command to log the vehicle model of an estimated model years (to fit the vehicle condition based on the eyewitness account when he said fairly new) even if there was no coordinates of an accident scene. And when a fairly new Ford Explorer receives the log command, it will send its VIN code to the unit P210. In another scenario if the highway patrol knows only that the target vehicle is just a fairly new SUV, then he can send a log command to log any fairly new SUV comes in his way and check it one by one to see if it matches the eyewitness account or not via the short range or the long range signal. The police can view the location of the target vehicle on the map as shown in FIG. 7.

Another common example when the police vehicle chases a precise target vehicle, and the police has a visual contact with the target vehicle, in this case the police vehicle will speed right behind the target vehicle and send a log command combined with the vehicle model or the vehicle make and the body style over the short range signal. The target vehicle will send its VIN code to show up on the LCD display 246 of the police vehicle unit P210, then the police can transmit connect, flash and alert commands to it to deal with it as the previous example. Generally, when the police turns on the unit P210, all the control commands will be displayed in a form of icons, each command has a unique shape icon, the police can activate each icon by touch screen or via the voice recognition application as part of the software operating system of the unit P210.

Roadway Radar System

Highway patrol officers rely on radar/laser guns to detect speeding vehicles, basically the police aims his handheld radar unit toward a specific moving vehicle to determine its speed then issues a speeding violation ticket to the driver if the detected speed is far away above the posted speed limit.

The police uses line-of-sight with the target vehicle when aiming his radar toward it and instantly reads the detected speed, the police randomly select a target vehicle travelling in the vicinity of other vehicles. However some speeding drivers are very skilled to spot the police cruiser shortly before the police aims his radar toward them or they slow down just after they notice other vehicles ahead of them being a target of the police radar, this process does not differentiate between the actual speeders and the unlucky drivers who may be just speeding for short period of time, also this process may disturb the traffic when the speeding vehicles suddenly drop their speed after they notice the police vehicle aiming the radar gun toward them.

The present roadway radar system provides a method to fairly detect speeding vehicles. The police unit P210 will send a radar command. A radar command is used to log the VIN codes and a (speed report) of the vehicles that speed over a (reference speed), the police unit P210 will transmit this command combined with the reference speed, road name, target direction, vehicle position code (approach) and police vehicle GPS coordinates (the origin coordinates) via the long range (1 to 2 mile) frequency.

The speed report will include the number of times and the length of time in which the vehicle was speeding over a (reference speed) in the last 30 minutes of vehicle movement. The GPS receiver 28 of the vehicle unit V10 determines, coordinates, speed, heading and date and time at real-time status. The vehicle unit V10 will keep a record of these data for the last (30 minutes or more) to be used for the speed report. And the speeding vehicles will appear in a vehicle list on the police LCD display 246, each vehicle in this list will show a speeding report, in this report the number of times and the longest length of time the vehicle was speeding over a selected (reference speed) in the last 30 minutes of movement. The police unit P240 is programmed to give a higher priority to the large size vehicles along with longer span of speeding time for citation. Wherein the cited vehicle is speeding over the reference speed during receiving the radar command. Therefore the police can fairly send a speeding alert message to the cited vehicle and communicate with it, also to send a warning message about the high speed to the other vehicles under the cited vehicle in the list.

Figure 11:
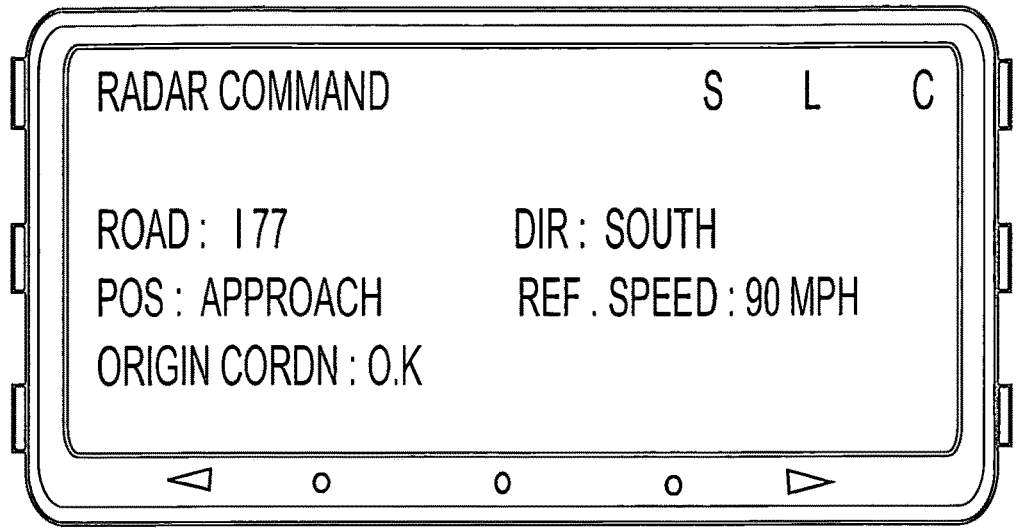
FIG. 11 Illustrates an example of the radar process. It shows the inputted parameters by the police to apply a radar command displayed on the police vehicle LCD unit.
Figure 12:
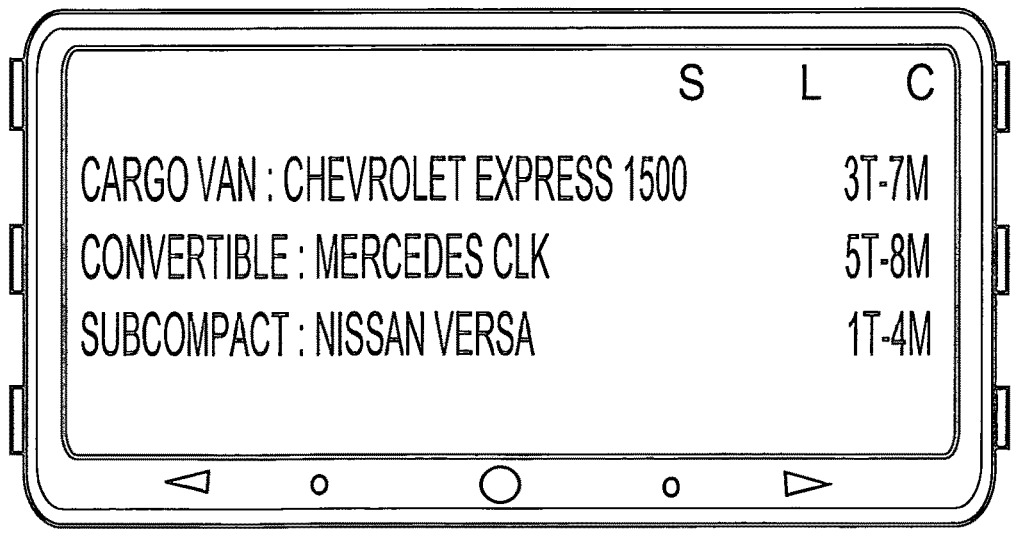
FIG. 12 Illustrates the list of the responding vehicles displayed on the police vehicle LCD unit.
Figure 13:
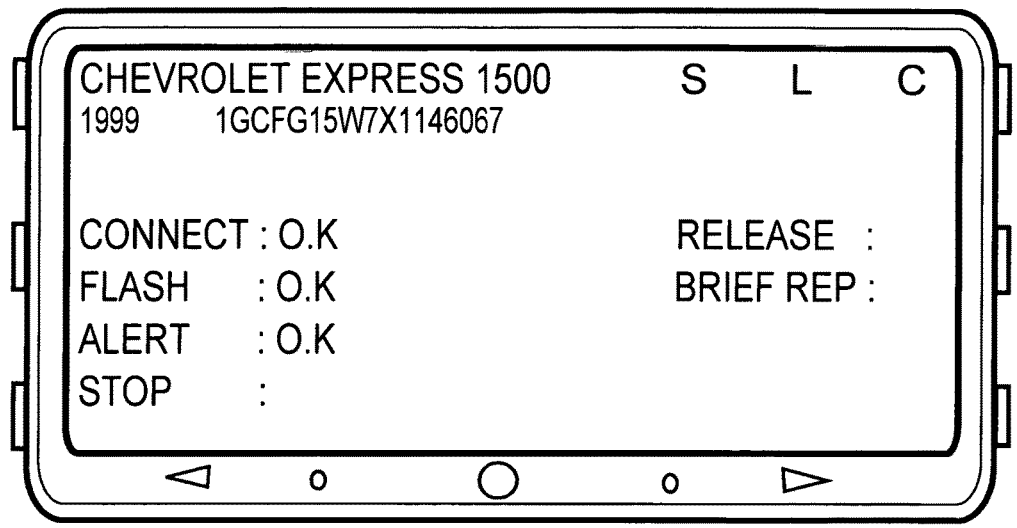
FIG. 13 Illustrates inputting (connect, flash and alert) commands to transmit them to the cited vehicle who displayed on the police vehicle LCD unit.
Figure 14:
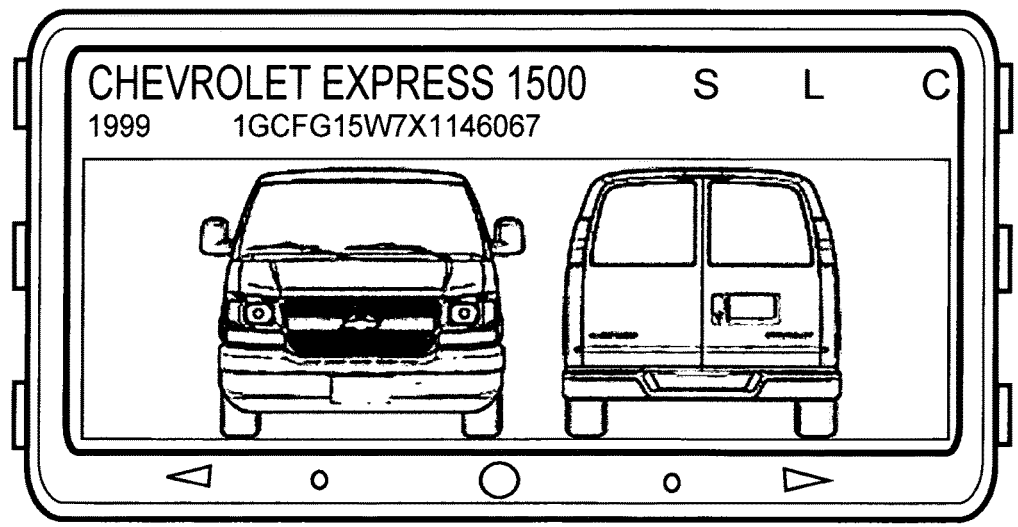
FIG. 14 Illustrates the pictures of the cited vehicle based on its model displayed on the police vehicle LCD unit.

FIGS. 11, 12, 13 and 14 illustrate an example of the radar system. The highway patrol on interstate 77 south sets his P210 unit to spot the speeding vehicles that may impose danger to traffic. The highway patrol vehicle location is 40.71239 −81.422170, the police sets the reference speed as 90 mph to cite any vehicle speeds over it. The police transmitted the radar command to all vehicles approaching him over the long range signal as shown in FIG. 11, his P210 unit received signals from the speeding vehicles and it arranged them in a list as shown in FIG. 12, the cargo van speeded 3 times over the 90 mph, the longest time was 7 minutes in the last thirty minutes of its movement, mercedes CLK speeded 5 times, the longest time was 8 minutes and nissan versa speeded 1 time for 4 minutes. Although MERCEDES CLK speeded more times and little longer than the cargo van CHEVROLET EXPRESS 1500, the cargo van will be the cited vehicle because its weight and size which could cause more damage if an accident happened. The unit P210 automatically selects the cargo van and transmits connect, flash and alert commands to it as shown in FIG. 13, so the police can communicate with it and cites the driver. At the same time the unit P210 automatically transmits a warning message to MERCEDES CLK and NISSAN VERSA to tell them to slow down. The yellow LED indicator 62 of the V10 units will be flashing when they receive the messages from the unit P210.

Law Enforcement Safety During a Check of a Vehicle

Stop and frisk has been an effective tool for police since the officers face uncertain and dangerous situations on the streets, circumstances that can potentially threaten both law enforcement officers and the public. For this reason, police officers need a set of flexible responses that allow them to react based on the information they possess. Thus, distinctions should be made between a stop and an arrest (or seizure of a person), and between a frisk and a search. A police officer may stop and detain a person based on reasonable suspicion. And, if the police reasonably suspect the person is armed and dangerous, they may also frisk him or her for weapons.

Another example, a car driver might have been pulled over because he was driving erratically. However, a smell coming from the car or signs of slowed reflexes on his part may have indicated he is using some type of drug or alcohol. If the officer decided to search his car from glove box to trunk based on the suspicion that he is using and possibly transporting an illegal substance, this would be probable cause.

The present "law enforcement safety method during a check of a vehicle" provides a method to enhance the safety of police officers during a reasonable suspicion to stop and check a vehicle. When the officer decides to pull over a vehicle. The police will approach closely the vicinity of the target vehicle and will send a log command combined with the vehicle model, make or the vehicle class category. The police unit P210 uses the short range (0.1 mile) frequency to transmit this command (similar to the high-speed pursuit examples). Therefore, the police can alert the driver by sending warning and instruction text messages and/or talk with the driver or to stop his vehicle safely as shown in FIG. 15. This method will discourage the driver or the car's passengers to attempt to flee or causing harm to the officer when the driver realizes that his vehicle is being tracked and controlled by the law enforcement system.

Emergency Vehicle Intersection Preemption System

The present emergency vehicle intersection preemption system provides a system to grant the emergency vehicle the right of way at an intersection by making the intersection traffic controller 118 responds to the priority request transmitted by the emergency vehicle to manipulate the approached traffic light to green signal, also to manipulate the approached right/left turning light to green signal when the intersection unit 100 receives a right/left turning request signal from the approaching emergency vehicle.

The emergency vehicle unit comprises electronic components similar to the police vehicle unit P210 and it will be referred as unit E210, it can communicate with the intersection unit 100 via the long range (one to two mile) radio frequency signal. The emergency vehicle unit E210 will periodically transmit the preemption codes, these codes will be checked by the intersection unit 100 to decide whether to grant the preemption request or ignore it. The unit E210 will not include any of the control commands that deal with the vehicle unit V10, it will only deal with intersection unit 100, except for the police vehicle unit P210, the police vehicle unit P210 will deal with vehicle unit V10 and also the intersection unit 100.

The Preemption Codes

1—A passcode: one of the names of the intersection roadways will be the passcode, for example if the intersection is two-road intersection, then either name of the two names of the roads will be a passcode, this passcode programmed in the intersection unit 100.

2—The emergency vehicle coordinates: the intersection unit 100 will calculate the distance between the intersection and the emergency vehicle by using its coordinates and the emergency vehicle's coordinates, and when the distance lies between (0.6 mile and 0.4 mile), the intersection unit 100 will trigger the traffic controller 118 to change the light signals regardless the speed of the emergency vehicle.

3—The emergency vehicle class type: (fire trucks, ambulances and police vehicles) will be class "A", but fire trucks have higher priority over ambulances, and ambulances have higher priority over police vehicles. Lower class vehicles such as buses will be class "B".

4—Right turning code and left turning code: the intersection unit 100 will trigger the traffic controller 118 to allow turning when the distance between the emergency vehicle and the intersection lies between (0.2 mile and 0.1 mile).

5—The heading code: this code tells the intersection unit 100 which specific light to turn to green.

The Preemption Process

Figure 33:
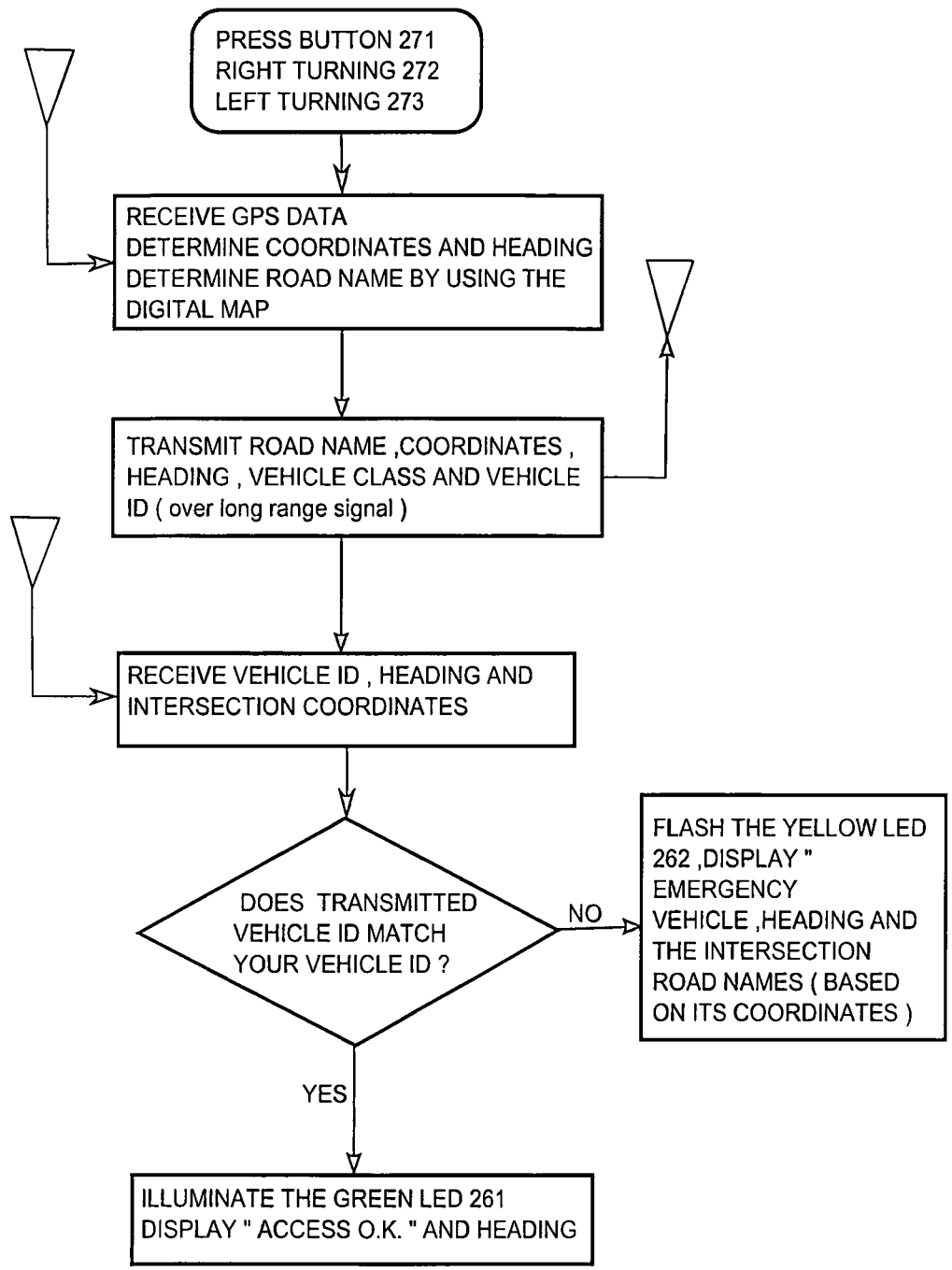
FIG. 33 Illustrates a flow chart example of a preemption process done by the emergency vehicle unit.
Figure 34:
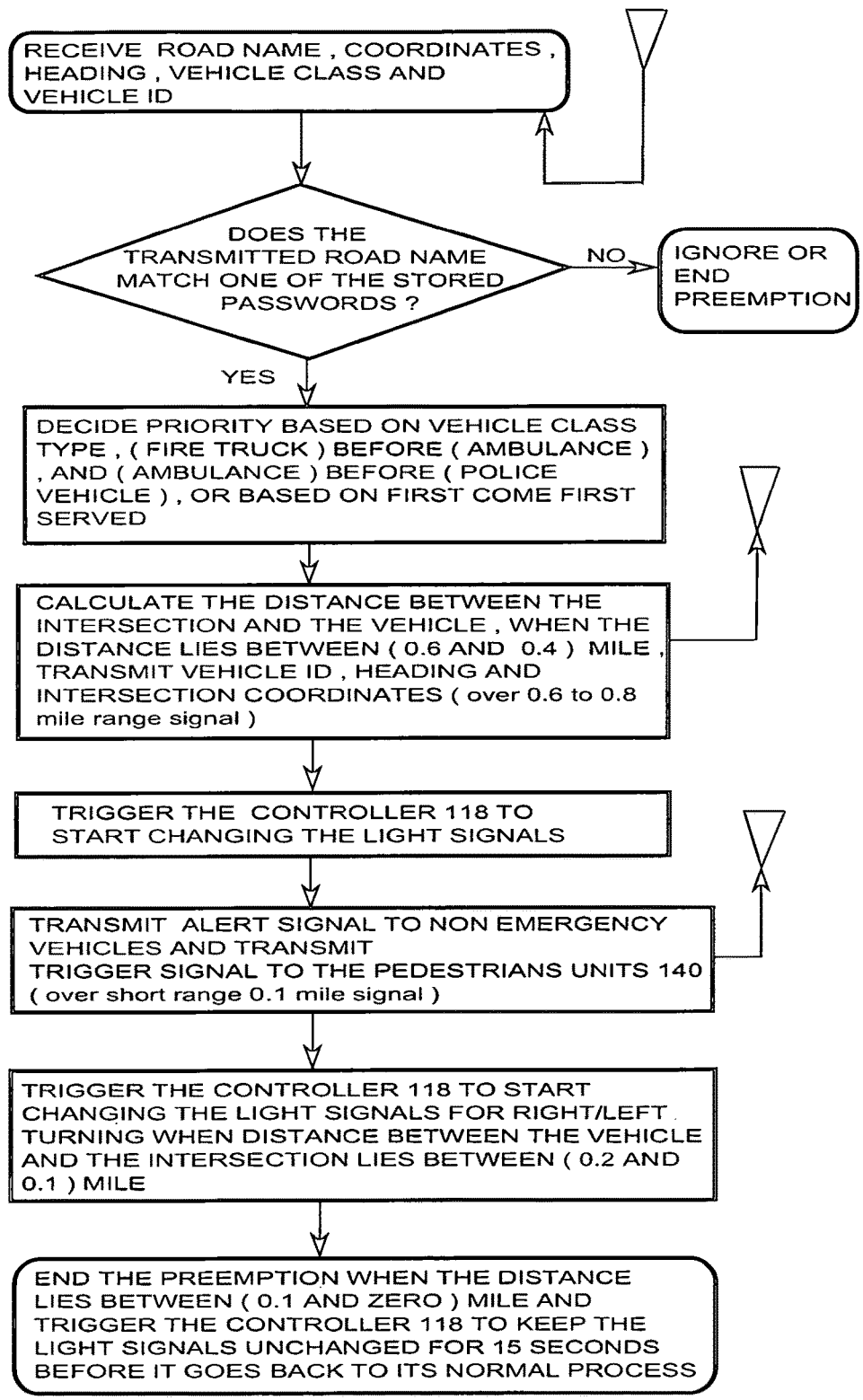
FIG. 34 Illustrates a flow chart example of a preemption process done by the intersection unit.

FIG. 33 and FIG. 34 illustrate flow charts of the preemption process. Once the emergency vehicle's operator presses on the on/off preemption process button (271 or 277), the emergency vehicle unit E210 will determine the road names by matching and comparing the GPS coordinates to the data from the digital map, and periodically transmits the road names combined with the preemption codes via the long range radio frequency as shown in flow chart of FIG. 33. Therefore, the intersection units 100 will be alerted enough time before the start of the light signals changing process. Each intersection unit 100 stores its coordinates and the names of its roadways, also each intersection unit 100 has an ID, the intersection coordinates could be used as an ID to identify the intersection unit 100.

The intersection unit 100 receives the names consecutively and compare them to the names that stored in its memory 102, and if one name matches, then it will go to the next step, which is reading the emergency vehicle class type, vehicle ID, direction of travelling and the emergency vehicle's coordinates. Then the intersection unit 100 will decide the order of priority based on the class type of the vehicle and/or first come first served manner. Thus it will grant the preemption and alert all the emergency vehicles covered by its long range signal enough time before it is actually changes the intersection light signals as shown in flow chart of FIG. 34.

The intersection unit 100 programmed to recognize the type of the emergency vehicle. And will give the priority to fire truck over the ambulance, and the ambulance over the police car. The lower class vehicles, such as the buses, will transmit the preemption request over the short range (0.1 mile) radio signal.

After the intersection unit 100 grant the preemption, it will transmit (the vehicle's ID, the heading) of the preempted vehicle and the intersection coordinates over a (0.60 mile to 0.80 mile) range radio signal. When the emergency vehicle unit E210 receives the data from the intersection unit 100, the emergency vehicle green LED indicator 261 will illuminate if its vehicle's ID matches the vehicle's ID transmitted by the intersection unit 100, and the alert message will be for example (ACCESS OK heading), but if its vehicle's ID does not match the vehicle's ID transmitted by the intersection unit 100, its yellow LED indicator 262 will start flashing and the alert message will be (emergency vehicle . . . heading) and another message includes (the names of the intersection roadways) based on the intersection coordinates.

When the distance between the emergency vehicle and the intersection lies between (0.6 mile and 0.4 mile), the intersection unit 100 will trigger the controller 118 to change the light signals regardless the speed of the emergency vehicle, it will give a predetermined period of time (6 or 7 seconds) for example for a yellow signal light in the direction of the approaches that may conflict with the emergency vehicle approach before it turns into red signal light. Also the intersection unit 100 will tell the intersection controller 118 to complete the normal timing of the light cycles if there was no conflict with the approaching emergency vehicle or to extend the green time until the end of the preemption.

When the emergency vehicle wants to make a right-turning or a left-turning, the emergency vehicle's operator must press on the right-turning button (272 or 276) or the left-turning button (273 or 278) to transmit the turning request signal. The intersection unit 100 will receive the turning request code and grant the turning when the emergency vehicle's distance lies between (0.2 mile and 0.1 mile) away from the intersection. The main reason for this distance restriction is to prevent as many unaffected intersections from executing the turning request, thus to not disturb the unaffected traffic at other intersections. There will be 5 or 6 seconds of yellow interval signal in the direction of the approaching that interfere with turning of the emergency vehicle before it turns to red signal.

Figure 16:
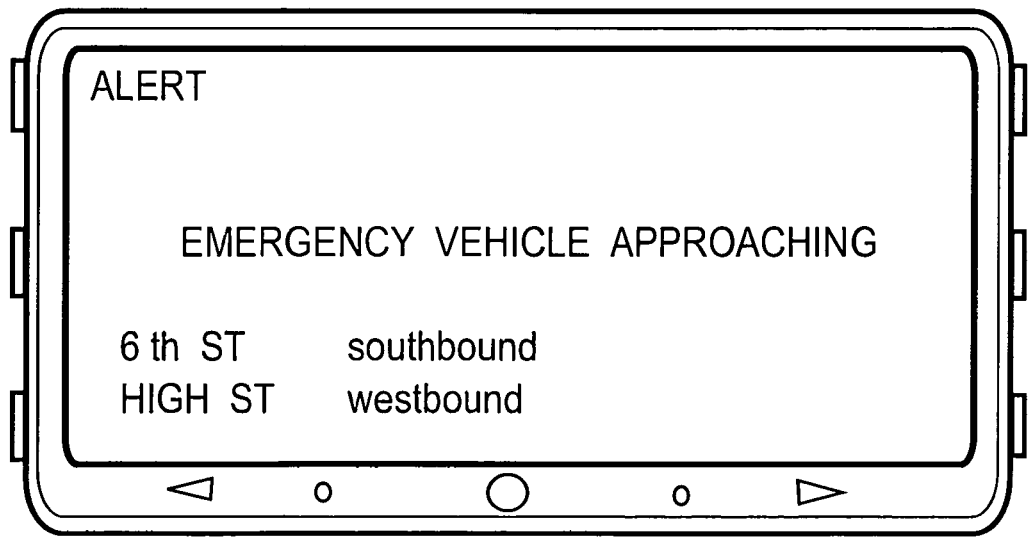
FIG. 16 Illustrates an example of an emergency vehicle alert message displayed on the vehicle LCD unit.

Additionally, when the intersection unit 100 triggers the controller 118 to change the light signals, the other non emergency vehicles will start flashing their yellow LED indicators 62 and the alert message will be ("emergency vehicle approaching" . . . "road name" . . . heading) as shown in FIG. 16 when they receive an alert signal transmitted by the intersection unit's short range (0.1 mile) transmitter 114. And in case of using pedestrians units 140, their LEDs signal 154 will start flashing when they receive a signal transmitted by the intersection unit 100 combined with the intersection ID. The pedestrians units 140 programmed to recognize their respective intersection unit ID. For example, the intersection coordinates could be used as an ID for the intersection unit 100, thus the pedestrians units 140 will respond only to their respective intersection unit 100.

In some occasions the vehicles may receive more than one alert message from different intersection units 100. In this case, the vehicle LCD display 46 will show the travelling road name along with the heading for each preempted emergency vehicle. Also the vehicle yellow LED indicator 62 will be flashing as shown in FIG. 16. Additionally, in the case of a lower class type vehicle is granted the preemption, the intersection unit 100 will not transmit any alert messages. Therefore, neither the vehicle's LCD display 46 or the pedestrian units 140 will be affected.

The intersection unit 100 will consider the end of the preemption of class "A" vehicles when the distance between the emergency vehicle and the intersection lies between (0.1 mile and zero), also it will consider the end of the preemption when it receives names not stored in its memory 102. After the end of the preemption, the light signals will remain the same for 10 to 15 seconds before the intersection controller 118 goes back to its normal timing. For class B vehicles the preemption process will take a predetermined period of time such as 30 seconds or 20 seconds before the controller 118 goes back to its normal timing.

Figure 35:
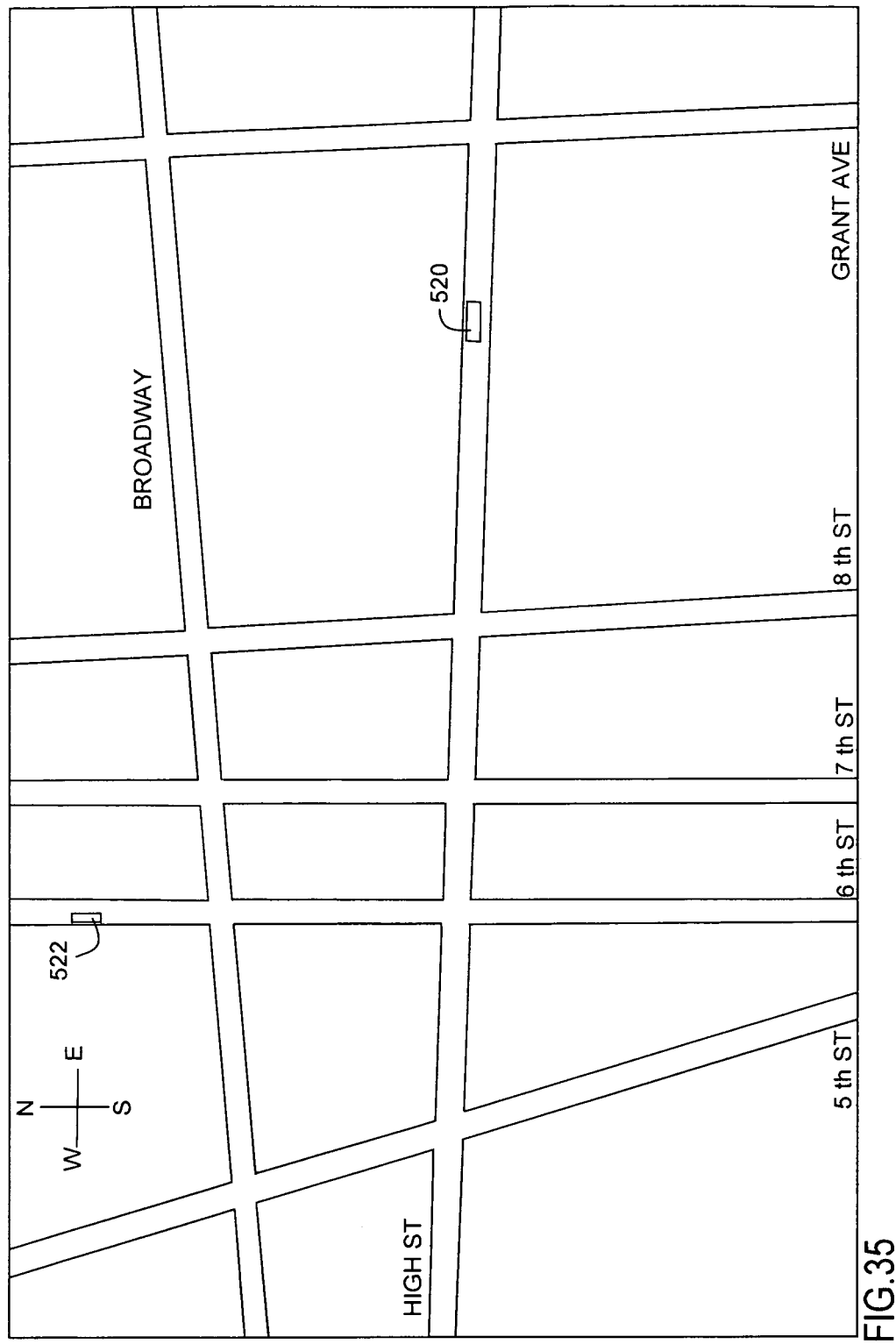
FIG. 35 Illustrates an example of a preemption process at street intersections.

FIG. 35 illustrates an example of the preemption process, the fire truck 520 moving westbound on HIGH ST approaching the (HIGH ST-8th ST) intersection, the fire truck ID is F4000, and a police vehicle 522 moving southbound on 6th ST approaching the (BROADWAY ST-6TH ST) intersection, the police vehicle ID is P2000. The operators of both vehicles 522 and 520 started the preemption request by pressing on the button 271. The GPS receiver 228 of the unit E210 in the fire truck 520 determines the coordinates, heading, speed and date/time at real time status, the unit E210 will match and compare the coordinates to the data of the digital map to determine the road name which is HIGH ST, and the heading which is westbound. The unit E210 transmits the following data (HIGH ST, "coordinates value", westbound, class A, F4000) over the long range (one to two mile) signal, the police vehicle unit P210 also determines the road name which is 6th ST, the heading which is southbound and transmits the following data (6th ST, "coordinates value", southbound, class A, P2000) over the long range (one to two mile) signal. The intersection unit 100 is installed at every intersection. The intersection unit 100 at (HIGH ST-8th ST) intersection has a password as (HIGH ST or 8th ST), also the intersection unit 100 at (HIGH ST-7th ST) intersection has a password as (HIGH ST or 7th ST), also the intersection unit 100 at (HIGH ST-6th ST) intersection has a password as (HIGH ST or 6th ST), moreover, the intersection unit 100 at (HIGH ST-5th ST) intersection has a password as (HIGH ST or 5th ST), and the intersection unit 100 at (BROADWAY ST-6th ST) intersection has a password as (BROADWAY ST or 6th ST), also the intersection unit 100 at (HIGH ST-6th ST) intersection has a password as (HIGH ST or 6th ST). When the intersection unit 100 at (HIGH ST-8th ST) intersection receives the data from both fire truck 520 and police vehicle 522, it will compare the passwords programmed in it to the road names it has received. The unit 100 will find a password matches a road name sent by the fire truck 520 which is (HIGH ST) word, the unit 100 will ignore the police vehicle 522 since the road name sent by it didnt match any of the passwords programmed in the unit 100. Thus, the unit 100 will grant the preemption to the fire truck 520 and will transmit the following data over (0.6 to 0.8 mile) range signal {F4000, HIGH ST westbound, "(HIGH ST-8th ST) intersection coordinates"}. The unit E210 in the fire truck 520 receives these data and the transmitted vehicle ID (F4000) matches its ID, so the unit E210 knows it was granted the preemption request. The green LED indicator 261 will illuminate and the message "ACCESS OK westbound" will appear on the LCD display 246. The unit 100 at (HIGH ST-8th ST) intersection will calculate the distance between the intersection and the fire truck 520, and when this distance lies between (0.6 and 0.4 mile) it will trigger the traffic controller 118 to start manipulating the light signals to make the light signals that facing east and west direction to turn to green or to extend the green, while switching signal lights that facing north and south direction to red after 6 or 7 seconds of yellow signal. Also the unit 100 at (HIGH ST-8th ST) intersection will send a trigger signal to the pedestrians units 140 to start flashing the warning LEDs 152. Moreover, the unit 100 at (HIGH ST-8th ST) intersection will send an alert message via the short range (0.1 mile) transmitter 114 to all of the non emergency vehicles in close proximity to the intersection to warn them about the coming fire truck, the yellow LED 62 of the vehicle units V10 will start flashing, and the message "emergency vehicle, HIGH ST, westbound" will appear on the LCD display 46. The same process is repeated at all intersections, but intersection unit 100 at (HIGH ST-6th ST) intersection has a password as (HIGH ST or 6th ST) and both passwords match the road names transmitted by the fire truck 520 and the police vehicle 522, while the police vehicle 522 transmitted its data before the fire truck 520, so the unit 100 will grant the police vehicle 522 the preemption request based on first come first served manner. In this case the yellow LED indicator 262 of the fire truck will start flashing and the message "emergency vehicle, southbound at (HIGH ST-6th ST)" will appear on the LCD display 246 as shown in FIG. 40. This message means that an emergency vehicle moving southbound on 6th ST and the intersection (HIGH ST-6th ST) is in its path granted priority for another emergency vehicle. So the fire truck 520 can access all the intersections safely and take precaution when it gets too close to (HIGH ST-6th ST) intersection. The non emergency vehicles in close proximity to (HIGH ST-6th ST) intersection will receive two alert messages, one for the police vehicle and another one for the fire truck "emergency vehicle, 6th ST, southbound" and "emergency vehicle, HIGH ST, westbound" will appear on the LCD display 46.

Security and Crime-Fighting Involving Getaway Vehicles System

Unlawful or forcible entry or attempted entry of a residence. This crime usually, but not always, involves theft. The illegal entry may be by force, such as breaking a window or slashing a screen, or may be without force by entering through an unlocked door or an open window. As long as the person entering has no legal right to be present in the structure a burglary has occurred. Furthermore, the structure need not be the house itself for a burglary to take place; illegal entry of a garage, shed, or any other structure on the premises also constitutes household burglary. If breaking and entering occurs in a hotel or vacation residence, it is still classified as a burglary for the household whose member or members were staying there at the time the entry occurred.

A motor vehicle, commonly referred to as a getaway car, is frequently used by the offender to flee the scene of a crime. Getaway cars are prevalent in major crimes such as bank robberies and homicides. Very frequently, but not always, a getaway car is stolen and is abandoned soon after the crime, in the hope that the vehicle cannot be traced to the offender.

If the vehicle does not belong to the driver and is quickly abandoned, a trace may not be possible without examination of forensic evidence. In some cases, the offender may go to extreme measures to discard the getaway vehicle in order to hide his tracks by dumping it in a river or secluded park, and/or setting it on fire; while this may not make solving the crime impossible, it can make the effort more difficult for law enforcement. The criminal investigation can be further complicated by the use of multiple getaway vehicles, which can confuse eyewitnesses, as well as creating multiple places to investigate: each vehicle is a new crime scene.

Since a getaway vehicle often requires a getaway driver, this additional co-defendant creates problems in itself. First, having a second perpetrator involved creates yet another inchoate offence that the prosecutor can use in an indictment conspiracy. If the driver, who may have parked some distance away, unknowingly drives past the scene of the crime, the getaway vehicle itself may identify the occupants to the crime victim and police. This is especially true if the vehicle has unique markings or is an unusual model. Without a driver, the perpetrator may make errors due to the stress associated with the crime, or lack of ability to multi-task (such as leaving the car keys at the scene of the crime); a murderer needs to "think strategically" to get away with murder—to "mislead police, stage crime scenes and destroy evidence.". Taking a public bus or taxicab makes the driver an involuntary co-conspirator, yet also creates an eyewitness whose interest it is to cooperate with police.

Witnesses to the crime will often attempt to take note of the tags (registration plate) or other important details of the car and report this information to law enforcement. It may be possible to identify the offender if an officer spots the offender in possession of the vehicle prior to its abandonment. Thus, the present security and crime-fighting system creates a method to help law enforcement identify the offenders in a quick and efficient manner, by identifying the suspect vehicles that may be used by the offenders. Therefore, logging vehicles that come to stop nearby a spot logging unit 300 and storing the logged data in real-time staus can provide the law enforcement an instant access to the logged information from the crime scene logging unit 300.

Prior systems generally rely on continuously logging the vehicles' locations in a central database, these database systems are similar to the database systems used by cell-phone carriers. And when there is a need to obtain data relevant to a particular location (crime scene), the law enforcement follows the legal protocol to obtain these vital records from the database carrier. The serious weakness of these systems is wasting the crucial time just after the crime. A plenty of valuable time will be lost during the process of obtaining the logged records from the database carrier. Therefore, the offenders will have a good chance to abandon the getaway vehicle and may get rid of some important evidence. Also prior systems may violate the privacy rights of the vehicles' owners by having their movement continually monitored and stored in a central database for a long period of time. Thus, the present security and crime-fighting system relies on individually owned spot logging units 300 to be used for security and protection reasons (similar to the video cameras' purpose), to obtain an immediate access to the stored data. These individually owned spot logging units 300 can be installed in homes, public parks, banks, schools, and commercial properties such as malls, gas stations, grocery stores, warehouses and parking lots, . . . etc.

Figure 19:
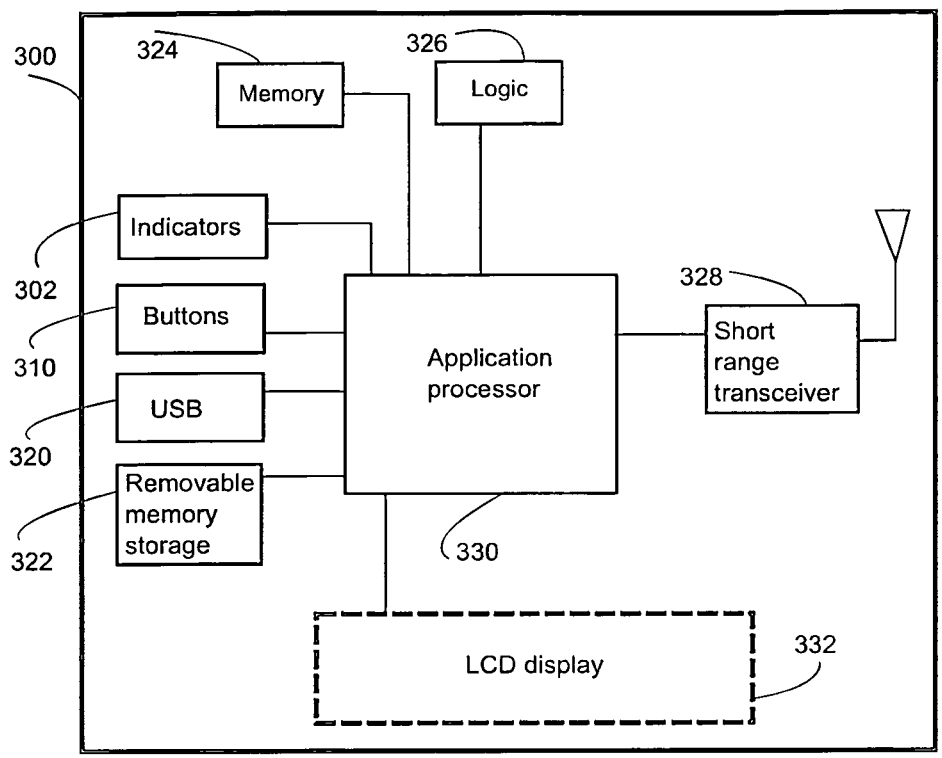
FIG. 19 Is a block diagram of the spot logging unit 300.
Figure 29:
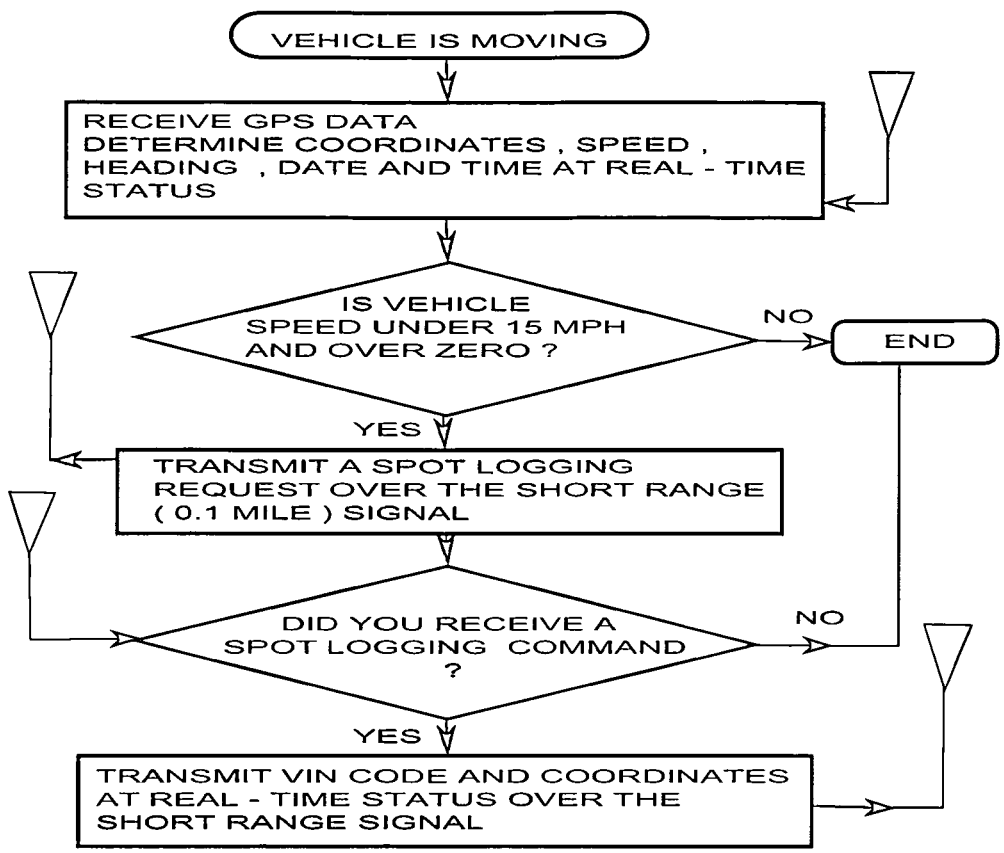
FIG. 29 Illustrates a flow chart example of a spot logging process done by the vehicle unit.
Figure 30:
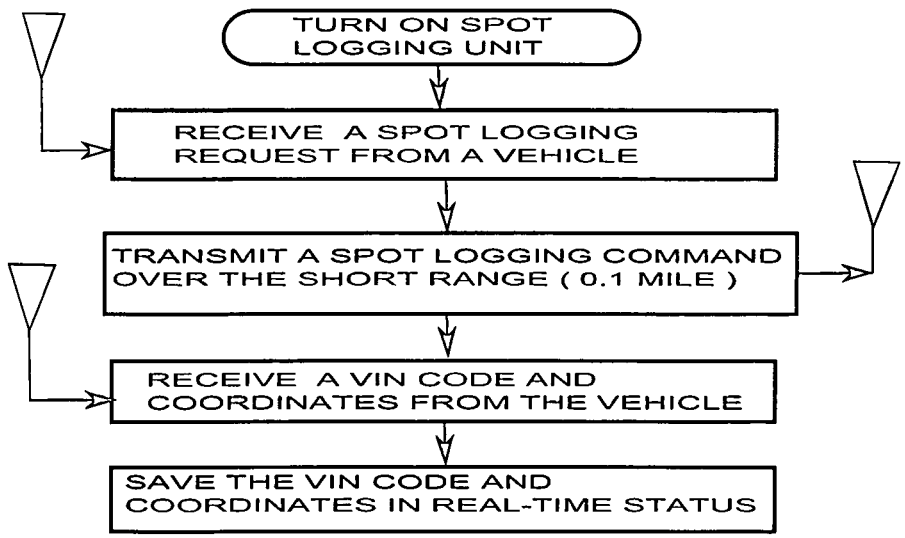
FIG. 30 Illustrates a flow chart example of a spot logging process done by the spot logging unit.
Figure 31:
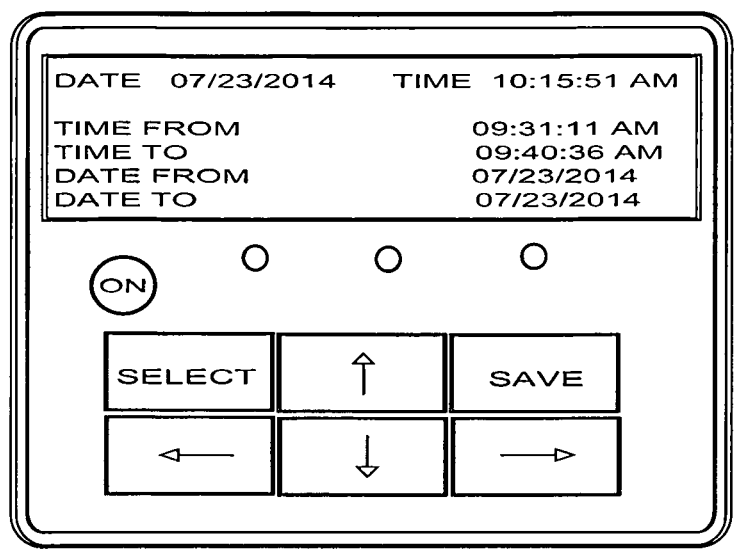
FIG. 31 Illustrates an example of the spot or traffic logging unit (front view).

As illustrated in the block diagram of FIG. 19, the spot logging unit 300 includes a short range (0.1 mile) transceiver module 328, a microprocessor 330, a memory 324, indicators 302, buttons 310, USB port 320, removable memory storage 322 and LCD display 332. This unit uses the short range (0.1 mile) radio frequency transceiver module 328 to communicate with the vehicle unit V10. And comprises a memory 324 to store the data transmitted by the vehicle unit V10. Generally, vehicles drop their speed when they come to stop, therefore the vehicle unit V10 will transmit a logging request signal when its speed goes under (15 MPH) via the short range (0.1 mile) signal to alert any spot logging unit 300 could be covered by its short range signal, as illustrated in the flow chart of FIG. 29. And if there is any spot logging unit in the range of the transmitted request signal, the spot logging unit 300 will respond and send a spot log command to the vehicle, as illustrated in the flow chart of FIG. 30. The vehicle unit V10 will reply by periodically transmit its VIN code combined with location at real-time status, until the vehicle's speed goes to (zero)), it will stop transmitting. And when the vehicle's speed goes above (zero), the vehicle unit V10 will periodically transmit its VIN code combined with location at real-time status. The vehicle unit V10 will stop transmitting after the speed goes above (15 MPH). By obtaining the start time and the end time of logging we can determine the period of time in which the vehicle was at the scene. The memory 324 of the spot logging unit 300 could store the logged data for a long period of time. The indicators 302 include one indicator to show the unit 300 is turned on or off, another indicator flashes when the unit 300 is logging a vehicle and another indicator to show when the memory 324 is full. The buttons 310 include one button to turn on/off the unit 300, a number of buttons used as an interface to select a target vehicle or vehicles from a selected period of time in a certain date from the unit 300 and save the results to the removable memory storage 322, FIG. 31, shows an example of the spot logging unit 300. The LCD display 332 shows the logging data of the vehicles, these data include the model and the VIN code of each vehicle combined with real date and time of logging. In a preferred embodiment of the unit 300, the LCD display 332 is a touch screen display and is used as an interface to deal with the logged data. The USB port 320 is used to upload the stored data and to update the operating application of the unit 300.

Collecting Traffic Data for Intersection Design

Figure 17:
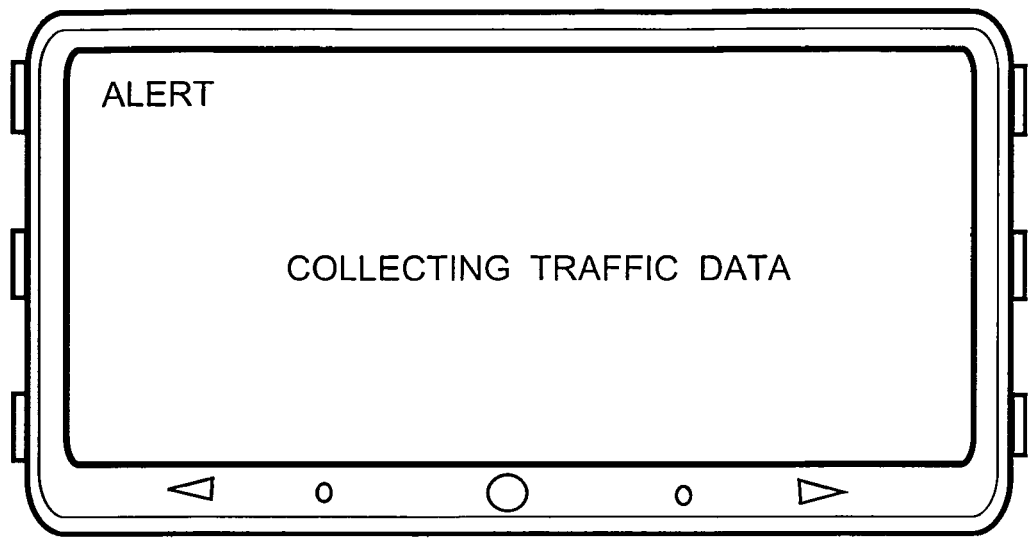
FIG. 17 Illustrates an example of a collecting traffic alert message displayed on the vehicle LCD unit.
Figure 20:
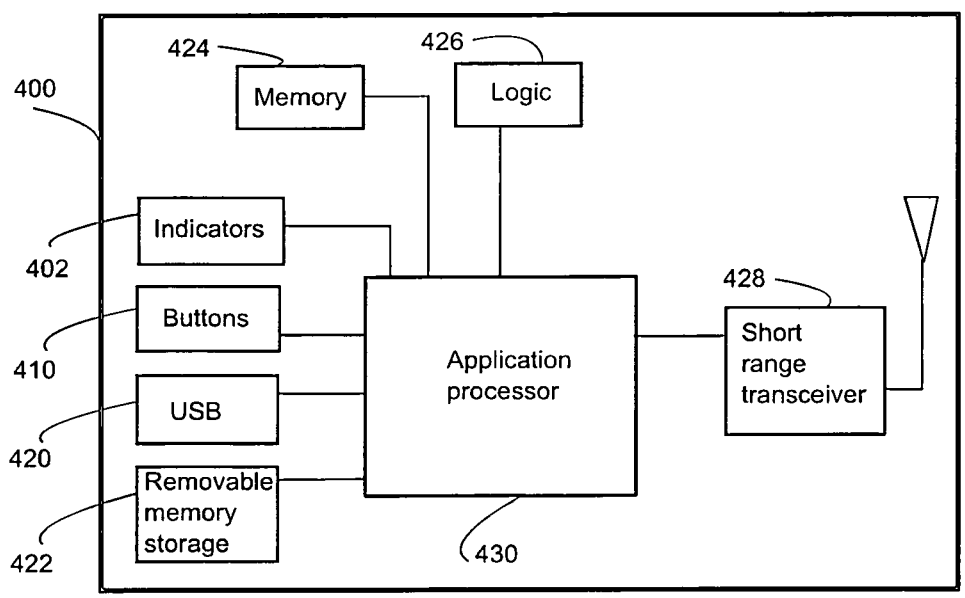
FIG. 20 Is a block diagram of the traffic logging unit 400.
Figure 32:
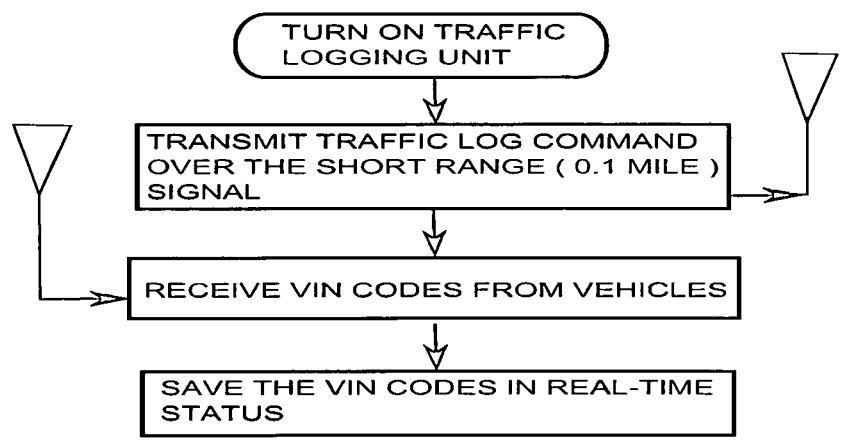
FIG. 32 Illustrates a flow chart example of a traffic logging process done by the traffic logging unit.

As illustrated in the block diagram of FIG. 20, the traffic logging unit 400 is a portable unit and includes similar circuit components as the spot logging unit 300. The unit 400 includes a short range (0.1 mile) transceiver module 428, a microprocessor 430, a memory 424, indicators 402, buttons 410, USB port 420, and removable memory storage 422. The traffic logging unit 400 is responsible for collecting the traffic data needed for the intersection design. By assigning a traffic logging unit 400 for each one of the intersection legs, the traffic logging unit 400 will periodically send a TRAFFIC LOG command via the short range (0.1 mile) frequency as shown in the flow chart of FIG. 32, all vehicles travelling on each leg will transmit their VIN codes. And by collecting the stored data from each one of the traffic logging unit 400, we can determine the volume of traffic and the size of the vehicles whose crossing and turning at an intersection, by simply decoding the VIN codes into vehicle model/type and body style form. When the traffic logging unit 400 sends the traffic log command, the yellow LED indicator 62 (one of the LCD unit 40 LED indicators 60) will start flashing and a (collecting traffic data) alert message will appear on the vehicle unit LCD display 46 as shown in FIG. 17.

RFID Tags in Close Proximity to Vehicles

Many kids and loved ones go missing every year, and this may cause a huge pain and severe long lasting psychological trauma for the parents, family members and friends. People go missing for a number of reasons, an old person with the Alzheimer's disease may wander around or get lost without the ability to contact his family or his care giver. Some of the teenagers runaway from their families is often a common problem. Children and adults may go missing when they become victims of a foul play.

Generally when a loved one goes missing, panic occurs, and his family's mind is in turmoil, his family accounts—in as much detail as possible where the person was and what he was doing before he went missing. This may urge calling friends, family members or going to places that the person frequents, and finally filing a missing person report with the local police.

Furthermore, robbery or burglary is a serious crime when a perpetrator commits an offence, usually that offence will be theft. Generally the perpetrator or perpetrators use a getaway car to escape the crime scene after committing the offence. There are some known ways the police use to fight robbery crimes such as bank robbery, these ways may include hiding a GPS device with cash stolen by the robbery suspect, and tracking him down then arresting him. Also banks may use RFID tags hidden with the cash to assist in tracking the stolen cash, which may lead to the arrest of a suspect robber.

Radio-frequency identification (RFID) are used for the purposes of automatically identifying and tracking tags attached to objects, such as personal possessions, clothing, cash, . . . etc. The tags contain electronically stored information. Some types of very short range (a few meters) active tags have an on-board tiny battery and periodically transmit their identification signal.

The present method utilizes the RFID technology to allow a very short range (few meters) read-only active RFID tags to be logged in the vehicle unit V10 at real-time status. When the tag is in close proximity to the vehicle unit V10 to make a real connection between the missing person or the stolen object that carries the RFID tag and a vehicle or vehicles to assist in a quick and efficient tracking search, also to use this connection as an evidence in criminal cases (similar to FIG. 28 example).

Generally, when an active RFID tag passes through the field of the scanning antenna, it detects the activation signal from the antenna. That "wakes up" the RFID chip, and it transmits the information on its microchip to be picked up by the scanning antenna of the tag reader (interrogator).

Whereas, radio-frequency identification (RFID) active tag of the present invention uses a very short range preferably (2 to 3 meter) radio frequency to communicate with the vehicle unit V10 over its short range frequency transceiver 24. The tag will automatically and periodically transmit its identification signal (once every one or few minutes to protect its on-board battery from wearing out in a short time, the user can remove the in-board battery every time the tag is not in use). Additionally, in another embodiment of the active RFID tag, the tag will start periodically transmit its identification signal every time the user activates it by pressing on a button integrated in it), and when the vehicle unit V10 comes in the range of the tag signal, it will store the tag ID in real-time status. Therefore, the vehicle unit V10 programmed to create a tag report which contains the tag ID, the VIN code of the vehicle, the date/time and period of time in which the tag was logged in the vehicle.

RFID tag command is used to allow the vehicles' units V10 to send a report about a particular tag number "target tag". The police unit P210 will transmit the RFID tag command or the clone command combined with the RFID tag command along with the cell-phone codes, the local dispatch center's phone number, the target tag number and a time window. Time window is a period of time in minutes, for example (60 or 120 minutes), to allow the vehicle unit V10 to randomly select a time within the time window to connect to the cellular network and send the RFID tag report. This way if the tag was logged in a number of vehicles, each one of these vehicles can connect and report in different times without any possible interference.

Children Safety in Hot-Cars

The statistics of Heat-stroke Deaths of Children in Vehicles in the untied states of America, indicated that. So far in 2014 there have been at least five heat-stroke deaths of children in vehicles; four confirmed as heatstroke and the other one still pending official findings by the medical examiner. Last year, 2013, there were at least forty-four deaths of children in vehicles; thirty-nine which has been confirmed as heatstroke and five which, based upon the known circumstances, are most likely heatstroke (2013 list). In 2012 there were 34 deaths of children due to hyperthermia (heatstroke) after being left in or having gained access to hot cars, trucks, vans and SUV's. Since 1998 there have been at least 606 documented cases of heatstroke deaths of children in vehicles. This data and study shows that these incidents can occur on days with relatively mild (i.e., ~70 degrees F.) temperatures and that vehicles can reach life-threatening temperatures very rapidly.

The atmosphere and the windows of a vehicle are relatively "transparent" to the sun's shortwave radiation and are warmed little. However this shortwave energy does heat objects that it strikes. For example, a dark dashboard or seat can easily reach temperatures in the range of 180 to over 200 degrees F. These objects (e.g., dashboard, steering wheel, childseat) heat the adjacent air by conduction and convection and also give off longwave radiation which is very efficient at warming the air trapped inside a vehicle. Heatstroke occurs when a person's temperature exceeds 104 degrees F. and their thermoregulatory mechanism is overwhelmed. Children's thermoregulatory systems are not as efficient as an adult's and their body temperatures warm at a rate 3 to 5 times faster than an adult's. Study of temperature rise in enclosed vehicles concluded that the temperature inside the enclosed vehicle may reach 115 deg F. in just 30 minutes in an average Ambient temperature of 80 degrees F.

Figure 28:
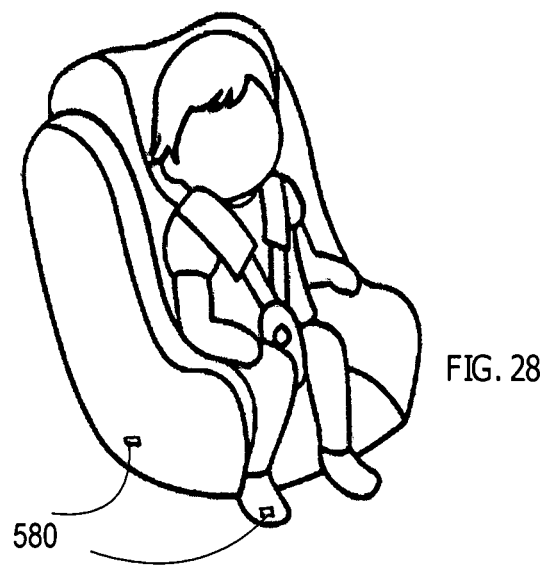
FIG. 28 Illustrates an example of RFID tags being attached to a baby car seat or attached to his shoe.

As illustrated in FIG. 28. The present method creates a new way of warning and alerting the parents or the caregivers when a child is being left in or having access to hot vehicles. The concept of this method is to attach a very short range an active RFID tag 580 to a child or to his portable baby car seat and if the tag is in close proximity to the unit V10 while the temperature rise in enclosed vehicle and reaches a critical degree such as 100 degrees F. for a predetermine period of time such as (5 to 10 minutes). The vehicle unit V10 will trigger the warning by either using the vehicle's siren, especially when there is a unique siren sound assigned only for this purpose to alert the public that a child is in danger inside the vehicle and also calling the parents or the caregivers programmed phone numbers (in case of the owner of the vehicle used his private SIM data). The thermal module 34 is used to determine the temperature inside the vehicle.

A subscriber identity module or subscriber identification module (SIM) is an integrated circuit that securely stores the international mobile subscriber identity (IMSI) and the related key used to identify and authenticate subscribers on mobile telephony devices (such as mobile phones and computers).

A SIM card contains its unique serial number (ICCID), international mobile subscriber identity (IMSI), security authentication and ciphering information, temporary information related to the local network, a list of the services the user has access to and two passwords: a personal identification number (PIN) for ordinary use and a personal unblocking code (PUK) for PIN unlocking. When these data and information are downloaded to the memory 20 of the vehicle unit V10, it will enable the owner of the vehicle to use the unit V10 as an in-car GPS tracker for self tracking his own vehicle in cases such as tracking his vehicle if it was stolen and also provides him with the same merits of the GPS trackers. The USB port 80 will be used to download the vehicle's owner private SIM data into the vehicle unit V10, the saved data will be secured against the control commands of the police vehicle unit P210. The unit V10 is programmed to provide a full security of the SIM data and be activated only by the vehicle owner since it will be a permanent subscribed service paid by the vehicle owner and also not to violate his privacy rights. And when a new owner of the same vehicle wants to download his own new SIM data, the unit V10 is programmed to delete the old SIM data after three days of downloading the new SIM data, to prevent an immediate access to delete the existing SIM data in case of the vehicle is stolen. The buttons 70 of the LCD unit 40 could also include a button for help assistance to work thru the SIM data connection.

Certain additional advantages and features of this invention may be apparent to those skilled in the art upon studying the disclosure, or may be experienced by persons employing the novel system and method of the present invention. Other advantages of the present invention include enhancing safety of law enforcement and increasing vehicles users convenience.

While the invention has been described with a limited number of embodiments, it will be appreciated that changes may be made without departing from the scope of the original claimed invention, and it is intended that all matter contained in the foregoing specification and drawings be taken as illustrative and not in an exclusive sense.

REFERENCES CITED

U.S. Patent Documents

U.S. Pat. No. 5,815,822 September 1998 Iu, U.S. Pat. No. 5,861,799 January 1999 Szwed. U.S. Pat. No. 5,937,065 August 1999 Simon et al. U.S. Pat. No. 5,939,975 August 1999 Tsuria et al. U.S. Pat. No. 5,983,156 November 1999 Andrews, U.S. Pat. No. 5,999,876 December 1999 Irons et al. U.S. Pat. No. 6,108,031 August 2000 King et al. U.S. Pat. No. 6,112,152 August 2000. U.S. Pat. No. 3,550,078 December 1970 Long, U.S. Pat. No. 3,831,039 August 1974 Henschel, U.S. Pat. No. 3,859,624 January 1975 Kriofsky et al. U.S. Pat. No. 3,881,169 April 1975 Malach. U.S. Pat. No. 3,886,515 May 1975 Cottin et al. U.S. Pat. No. 4,017,825 April 1977 Pichey. U.S. Pat. No. 4,162,477 July 1979 Munkberg. U.S. Pat. No. 4,223,295 September 1980 Bonner et al. U.S. Pat. No. 4,230,992 October 1980 Munkberg. U.S. Pat. No. 4,234,967 November 1980 Henschel. U.S. Pat. No. 4,296,400 October 1981 Becker Friedbert et al. U.S. Pat. No. 4,433,324 February 1984 Guillot. U.S. Pat. No. 4,443,783 April 1984 Mitchell. U.S. Pat. No. 4,573,049 February 1986 Obeck. U.S. Pat. No. 4,661,799 April 1987 Buttemer. U.S. Pat. No. 4,701,760 October 1987 Raoux. U.S. Pat. No. 4,704,610 November 1987 Smith et al. U.S. Pat. No. 4,713,661 December 1987 Boone et al. U.S. Pat. No. 4,734,863 March 1988 Honey et al. U.S. Pat. No. 4,734,881 March 1988 Klein et al. U.S. Pat. No. 4,775,865 October 1988 Smith et al. U.S. Pat. No. 4,791,571 December 1988 Takahashi et al. U.S. Pat. No. 4,799,162 January 1989 Shinkawa et al. U.S. Pat. No. 4,914,434 April 1990 Morgan et al. U.S. Pat. No. 4,963,889 October 1990 Hatch. U.S. Pat. No. 5,014,052 May 1991 Obeck. U.S. Pat. No. 5,043,736 August 1991 Darnell et al. U.S. Pat. No. 5,068,656 November 1991 Sutherland. U.S. Pat. No. 5,072,227 December 1991 Hatch. U.S. Pat. No. 5,083,125 January 1992 Brown et al. U.S. Pat. No. 5,089,815 February 1992 Potter et al. 511912 June 1992 Barnard. U.S. Pat. No. 5,172,113 December 1992 Hamer. U.S. Pat. No. 5,177,489 January 1993 Hatch. U.S. Pat. No. 5,187,373 February 1993 Gregori. U.S. Pat. No. 5,187,476 February 1993 Hamer. U.S. Pat. No. 5,204,675 April 1993 Sekine. U.S. Pat. No. 5,214,757 May 1993 Mauney et al. U.S. Pat. No. 5,334,974 August 1994 Simms et al. U.S. Pat. No. 5,345,232 September 1994 Robertson. U.S. Pat. No. 5,539,398 July 1996 Hall et al. U.S. Pat. No. 5,602,739 February 1997 Haagenstad et al. U.S. Pat. No. 5,710,555 January 1998 McConnell et al. U.S. Pat. No. 5,745,865 April 1998 Rostoker et al. U.S. Pat. No. 5,889,475 March 1999 Klosinski et al. U.S. Pat. No. 5,926,113 July 1999 Jones et al. U.S. Pat. No. 5,955,968 September 1999 Bentrott et al. U.S. Pat. No. 5,986,575 November 1999 Jones et al. U.S. Pat. No. 6,064,319 May 2000 Matta. U.S. Pat. No. 6,232,889 May 2001 Apitz et al. U.S. Pat. No. 6,243,026 June 2001 Jones et al. U.S. Pat. No. 6,326,903 December 2001 Gross et al. U.S. Pat. No. 6,603,975 August 2003 Inouchi et al. U.S. Pat. No. 6,617,981 September 2003 Basinger. U.S. Pat. No. 6,621,420 September 2003 Poursartip. U.S. Pat. No. 6,633,238 October 2003 Lemelson et al. U.S. Pat. No. 6,690,293 February 2004 Amita. U.S. Pat. No. 6,724,320 April 2004 Basson et al. U.S. Pat. No. 6,909,380 June 2005 Brooke. 2004/0196162 October 2004 Brooke. U.S. Pat. No. 4,914,434 April 1990 Morgan et al. U.S. Pat. No. 5,014,052 May 1991 Obeck. U.S. Pat. No. 5,172,113 December 1992 Hamer. U.S. Pat. No. 5,187,476 February 1993 Hamer. U.S. Pat. No. 5,202,683 April 1993 Hamer et al. U.S. Pat. No. 5,406,615 April 1995 Miller et al. U.S. Pat. No. 5,539,398 July 1996 Hall et al. U.S. Pat. No. 5,602,739 February 1997 Haagenstad et al. U.S. Pat. No. 5,955,968 September 1999 Bentrott et al. U.S. Pat. No. 5,973,616 October 1999 Grebe et al. U.S. Pat. No. 6,064,319 May 2000 Matta. U.S. Pat. No. 6,985,090 January 2006 Ebner et al. U.S. Pat. No. 7,307,547 December 2007 Schwartz. U.S. Pat. No. 7,333,028 February 2008 Schwartz. U.S. Pat. No. 7,417,560 August 2008 Schwartz. 2003/0128135 July 2003 Poltorak. 2005/0104745 May 2005 Bachelder et al. 2008/031655 December 2008 Bachelder et al.

Foreign Patent Documents 0 574 09 December 1993 EP, 2 670 02 June 1992 FR, 2 693 820 January 1994 FR, WO 2005/094544 October 2005 WO, WO 2006/115756 April 2006 WO, WO 2006/130633 December 2006 WO, WO 2006/138364 December 2006 WO.

Other References

Heatstroke Deaths of Children in Vehicles, by Jan Null, CCM, Department of Meteorology & Climate Science, San Jose State University.
"Manual on Uniform Traffic Control Devices (MUTCD), Part 1" (PDF). U.S. DOT, Federal Highway Administration. Dec. 11, 2009. Retrieved Nov. 28, 2011.
D. W. Harwood, et al., Safety Effectiveness of Intersection Left- and Right-Turn Lanes, Federal Highway Administration Office of Safety Research and Development, 2002, [1]. New York State Driver's Manual, Chapter 4.
Badger, Emily. "Could These Crazy Intersections Make Us Safer?". The Atlantic Cities. Atlantic Media Company. Retrieved 29 Jan. 2013.
Howstuffworks.com/ How cell phone works.
Howstuffworks.com/ How SIM card works.
Howstuffworks.com/ How GPS receiver works.
Howstuffworks.com/ How RFID works.
A b c Lyle, Douglas P. "Forensics for Dummies: Forensics: Assessing the Scene of the Crime". Retrieved Oct. 17, 2013.
A b El-Ghobashy, Tamer (Sep. 26, 2013). "Long Island Gunman's Alleged Getaway Vehicle Found". Wall Street Journal Metropolis blog. Retrieved Oct. 17, 2013.
Ragle, Larry (1995). Crime Scene. HarperCollins. pp. 16-17. ISBN 9780380773794.
Smith, Rosemary (Jun. 27, 2012). "Confession reveals third possible capital murder accomplice suspect". Nava-Sota Examiner. Retrieved Oct. 15, 2013.
Traffic lights on your windshield could get you home faster By Lisa Cohen, CNN Updated 2:20 PM ET, Wed Jan. 14, 2015.
Google Maps JavaScript API v3.
SQL Server Classes: SQL Server training classes from Webucator.
A Gentle Introductio to SQL: An excellent SQL tutorial site.
SQL.org: Includes links to SQL tutorials and resources for interacting with a SQL database.
Location-based service. From Wikipedia, the free encyclopedia.

The invention claimed is:

1. A high speed pursuit system to allow law enforcement vehicles to remotely connect a target vehicle to a wireless cellular network for a selected period of time to remotely manipulate the target vehicle and to communicate with it, wherein the target vehicle wirelessly receives a plurality of cellular network communication codes required to connect it to the wireless cellular network, the system comprising: a first in-vehicle apparatus on-board law enforcement vehicles coupled to a first visual display; a second in-vehicle apparatus on-board civilian vehicles coupled to a second visual display; wherein the first in-vehicle apparatus on-board the law enforcement vehicle comprising:
   a) wireless communication means to communicate with the target vehicle, a local dispatch center and law enforcement vehicles, and comprising, a cellular network communication module, a long and a short range transceiver module;
   b) at least one memory comprising computer program code for one or more programs, the memory further comprises: a plurality of control commands to remotely manipulate the target vehicle; the plurality of cellular network communication codes are required to remotely connect the target vehicle to the wireless cellular network and, a digital road map;
   c) a database comprising:
      i) position coordinates of track points along the center line of roads for determining geographic sections and road names, wherein the position coordinates of track points are arranged in database tables and one or more table represent one or more geographic section; and,
      ii) a plurality of make/model and body style category list of vehicles, and a set of vehicle's photos associated with each make/model, wherein each body style category comprises vehicles that have similar body style;
   d) at least one GPS receiver module to enable the law enforcement vehicle to determine its position coordinates, speed, course and date/time at real-time status; and,
   e) at least one processor being coupled to said wireless communication means, said memory and said database; wherein the first visual display coupled to said first in-vehicle apparatus, and able to input and present visual and audible information, wherein the visual information comprise, indicating control commands, indicating a plurality of parameters associated with the target vehicle, indicating information and photos associated with the target vehicle, indicating the location of the target vehicle on the digital road map, and indicating alerts; wherein the audible information comprise, indicating control commands, indicating a plurality of parameters associated with the target vehicle, indicating information associated with the target vehicle, indicating alerts, and indicating wireless communication with the target vehicle, the local dispatch center and law enforcement vehicles.

2. The system of claim 1, wherein the control commands comprise; a log command to be transmitted by the law enforcement vehicle over a long/short range frequency to the target vehicle and is combined with the plurality of parameters associated with the target vehicle to log its VIN code into the first in-vehicle apparatus of the law enforcement vehicle; a connect command to be transmitted by the law enforcement vehicle over the long/short range frequency to the target vehicle and is combined with the VIN code of the target vehicle, the plurality of cellular network communication codes, and a local dispatch center phone number to allow the target vehicle to temporarily connect to the wireless cellular network; a stop command to be transmitted by the local dispatch center, and the law enforcement vehicle, and is combined with the VIN code of the target vehicle to gradually slow down the target vehicle to fully stop it; and a release command to be transmitted by the local dispatch center, and the law enforcement vehicle, and is combined with the VIN code of the target vehicle to release the target vehicle from the control commands and to delete the plurality of cellular network communication codes from the second in-vehicle apparatus of the target vehicle.

3. The system of claim 2, wherein the plurality of parameters associated with a target vehicle are selected from a group consisting of a make/model, a body style, the VIN code, a reference speed, a road name, a heading, position coordinates of a target location, origin coordinates of the law enforcement vehicle, and a target vehicle position code.

4. The system of claim 1, wherein the second in-vehicle apparatus on-board the target vehicle comprising:
   a) wireless communication means to communicate with law enforcement vehicles and local dispatch centers, and comprising, a cellular network communication module, a long and a short range transceiver module;

b) at least one memory comprising computer program code for one or more programs, the memory further comprises a VIN code of the target vehicle and the target vehicle's position coordinates, speed, course and date/time of at least the last 30 minutes of the vehicle's movement;

c) a database comprising position coordinates of track points along the center line of roads for determining geographic sections and road names, wherein the position coordinates of track points are arranged in database tables and one or more table represent one or more geographic section;

d) at least one GPS receiver module to enable the target vehicle to determine its position coordinates, speed, course and date/time at real-time status; and, e) at least one processor being coupled to said wireless communication means, said memory and said database; wherein the second visual display coupled to said second in-vehicle apparatus, and able to input and present visual and audible information, wherein the visual information comprise indicating alerts and instructions, and indicating sending help request; wherein the audible information comprise indicating alerts and instructions, indicating wireless communication with local dispatch centers and law enforcement vehicles, and indicating sending help request.

5. The system of claim 4, wherein a stranded civilian vehicle is able to periodically transmit a help request signal combined with the vehicle's VIN code and its position coordinates over the long range frequency, wherein civilian vehicles that receive the transmitted help request signal are able to periodically re-send the same help request signal via a clone command over a long range frequency, wherein the stranded vehicle's location is displayed on the first visual display of law enforcement vehicles that receive the help request signal.

6. The system of claim 4, wherein civilian vehicles traveling on a specific road and on specific heading are able to receive alerts and instructions addressing an accident or a detour, wherein the alerts and instructions are transmitted by the first in-vehicle apparatus over the long range frequency and the civilian vehicles are able to re-send the same alerts and instructions via a clone command over a long range frequency.

7. The system of claim 1, further comprises the steps of:
a) each law enforcement vehicle is assigned the plurality of cellular network communication codes to remotely lend them to the target vehicle for a selected period of time to enable the target vehicle to connect to the wireless cellular network;

b) the law enforcement vehicle transmits the log command combined with the plurality of parameters associated with the target vehicle over a long/short range frequency;

c) all vehicles that receive the log command and matching the transmitted parameters will respond by transmitting their VIN codes over the long/short range frequency;

d) the law enforcement vehicle's officer determines the target vehicle's make/model and the VIN code from a body style category list that match the initial features obtained by eyewitnesses;

e) the law enforcement vehicle transmits the connect command combined with the VIN code of the target vehicle, the plurality of cellular network communication codes, and a local dispatch center phone number over the long/short range frequency;

f) the target vehicle receives the plurality of cellular network communication codes and temporarily connects to the wireless cellular network and communicates with the local dispatch center;

g) the local dispatch center monitors and tracks the target vehicle, forwards the details to law enforcement vehicles in the vicinity of the target vehicle, and supervises the entire process;

h) the law enforcement vehicles in the vicinity of the target vehicle communicate with the target vehicle and manipulate it to follow their instructions and the control commands via the wireless cellular network and the long/short range frequency; and, i) at the end of the entire process, the local dispatch center and law enforcement vehicles that involve in the process transmit a release command combined with the VIN code of the target vehicle to delete the plurality of cellular network communication codes from the second in-vehicle apparatus of the target vehicle and to release the target vehicle from the control commands.

8. The system of claim 7, wherein the law enforcement vehicle and the local dispatch center are fully controlling the target vehicle during a stop and check to enhance the safety of law enforcement officers and the safety of the target vehicle's occupants since the local dispatch center supervises the entire process.

9. The system of claim 7, wherein the law enforcement vehicle is able to issue a speeding citation against a vehicle traveling on a specific road and on a specific heading, and speeding above a selected reference speed, wherein the law enforcement vehicle transmits a radar command combined with a plurality of inquiry parameters associated with a road name, a heading, a reference speed, a vehicle position code, and an origin coordinates of the law enforcement vehicle over the long range frequency.

10. The system of claim 9, wherein all vehicles that receive the radar command and fit the inquiry parameters transmit their VIN codes combined with speed reports over the long range frequency, wherein a speed report comprises the number of times and the length of time in which a vehicle was speeding above a reference speed during at least the last few minutes of the vehicle's movement.

11. The system of claim 10, wherein the VIN codes, the speed reports and a body style category list are displayed on the first visual display of the law enforcement vehicle, wherein the heavier a vehicle in addition to the longer span of speeding time of the vehicle is the top of the citation list, wherein the cited vehicles receive connect command to temporarily connect them to the wireless cellular network and also receive alerts and instructions, wherein the local dispatch center supervises the entire process.

* * * * *